(12) United States Patent
Ogundipe

(10) Patent No.: US 8,762,253 B2
(45) Date of Patent: Jun. 24, 2014

(54) METHOD AND SYSTEM FOR POOLING, SECURITIZING, AND TRADING GLOBAL DIVIDEND AND INTEREST TAX RECLAIM ASSETS

(76) Inventor: Segun Ogundipe, Plymouth, MA (US)

( * ) Notice: Subject to any disclaimer, the term of this patent is extended or adjusted under 35 U.S.C. 154(b) by 216 days.

(21) Appl. No.: 13/545,196

(22) Filed: Jul. 10, 2012

(65) Prior Publication Data

US 2012/0330815 A1 Dec. 27, 2012

Related U.S. Application Data

(63) Continuation-in-part of application No. 12/538,089, filed on Aug. 7, 2009, now Pat. No. 8,234,206.

(60) Provisional application No. 61/087,112, filed on Aug. 7, 2008.

(51) Int. Cl.
*G06Q 40/00* (2012.01)

(52) U.S. Cl.
USPC .......................................................... 705/37

(58) Field of Classification Search
USPC .......................................................... 705/37
See application file for complete search history.

(56) References Cited

U.S. PATENT DOCUMENTS

| | | | |
|---|---|---|---|
| 2002/0055905 A1* | 5/2002 | Jannah et al. | 705/38 |
| 2006/0293985 A1* | 12/2006 | Lederman et al. | 705/35 |
| 2010/0293079 A1* | 11/2010 | Wilson et al. | 705/31 |

* cited by examiner

*Primary Examiner* — Jessica Lemieux
(74) *Attorney, Agent, or Firm* — Wolf, Greenfield & Sacks, P.C.

(57) ABSTRACT

Method and system for administering the pooling, securitizing, and trading of global dividend and interest tax reclaim assets during the reclamation process from concerned foreign government tax authorities, who are parties to a double taxation treaty.

1 Claim, 52 Drawing Sheets

(Prior Art) FIG. 1

METHOD AND SYSTEM FOR POOLING, SECURITIZING, AND TRADING GLOBAL DIVIDEND AND INTEREST TAX RECLAIM ASSETS

RELATED APPLICATIONS

This application is a continuation-in-part and claims the benefit under 35 U.S.C. §120 of U.S. application Ser. No. 12/538,089, entitled "METHOD AND SYSTEM FOR POOLING, SECURITIZING, AND TRADING GLOBAL DIVIDEND AND INTEREST TAX RECLAIM ASSETS," filed on Aug. 7, 2009, which is herein incorporated by reference in part.

FIELD OF THE INVENTION

The present invention relates generally to asset of securitization and, more specifically, to a platform (i.e., system) and method for administering the pooling, securitizing, and trading of global dividend and interest tax reclaim assets.

BACKGROUND

For the purpose of the embodiments of the present invention, a general term "beneficial person" may be defined as an individual, company, or any other body of persons. A company may be defined as any corporate body or entity, which is treated as a corporate body for tax purposes. Furthermore, for the purpose of the embodiments of the present invention, a general beneficial person may be categorized into two groups—an initial beneficial person and a current beneficial person:

Initial beneficial person—An initial beneficial person is defined as an entity (may be an individual, company, or any other body of persons) who received dividend and interest income paid on cross border investments; and is subject to a non-resident withholding tax in the sourced country of income. As a result of a double taxation treaty between an initial beneficial person's country of residence and a source income government, an initial beneficial person may qualify for a tax treaty benefit. The tax treaty benefit may reduce the source income withholding tax through relief at source or tax reclamation provisions.

Current beneficial person—A current beneficial person is defined as an entity (may be an individual, company, or any other body of persons), including a special purpose vehicle (SPV), who is legally assigned ownership of tax reclaim assets upon entering into a private purchase and sale agreement of the tax reclaim assets with an initial beneficial person.

Cross-border investments are commonplace in the business world. For example, a U.S. based company may have equity interests in suppliers, distributors and partially-owned subsidiaries in several other countries. The same is true for companies based outside the U.S.A. Further, mutual funds and institutional investors frequently invest in entities in other countries. Frequently, such a company or, more generically, an initial beneficial person who receives dividend and interest income paid on cross-border investments is subject to a non-resident withholding tax, which may be as high as 25%-35%, for example. A paying agent withholds the non-resident tax amount and pays it to the tax authority. However, an initial beneficial person may qualify for a tax treaty benefit under the provisions of a double taxation treaty between the government where the income arises (i.e., the must cope with source income government) and the initial beneficial person's country of residence.

There are two methods for obtaining the tax treaty benefit—relief at source, which provides tax relief at the time of the dividend and interest payment; or tax reclamation, which requires a documented filing for a refund of the over-withheld taxes.

With increasing cross border share ownership, an initial beneficial person knows the impact of taxation by foreign tax authorities. Relief at the source is the preferred tax reduction method for many initial beneficial persons, because it occurs at the point of dividend and interest payment. On the other hand, in practice, not all countries have "relief at source" tax provisions; and for these countries, the current tax relief infrastructure supports tax reclamation only.

Global custodian banks typically act as agents to file the required legal documents on behalf of their clients, as initial beneficial persons, in order to reclaim the over-withheld taxes from the foreign government tax authorities. The reclamation process is complex and presents market challenges, which stem from legal and administrative issues.

The legal issues primarily relate to the assembling of evidence to prove an initial beneficial person's entitlement to the tax reclamation assets, as defined by the double taxation treaty among the involved governments. As such, if the treaty's requirements are not fully met the treaty benefit may be denied to an initial beneficial person. Subsequently, this may lead to the double taxation of global income. This is of concern for the country of the source income and for an initial beneficial person's country of residence or domicile.

The administrative issues relate to compliance difficulties involved in ensuring that the tax treaty benefit is granted effectively to an initial beneficial person with respect to the country of residence. A source income government's jurisdictional tax law and applicable double taxation treaty dictate the method for the treaty benefit payment—relief at source or tax reclamation. In the absence of relief at source payment, an initial beneficial person obtains the treaty benefit through tax reclamation. One of the compliance and administrative difficulties surrounding tax reclamation is the statute of limitations, which limits the allowable time to file for the treaty benefit. Most typically, the statute of limitations is three years from the dividend and interest pay date. On the other hand, however, double taxation treaty law often does not delineate the time allowed for the foreign government tax authority to pay the treaty benefit to the claimant. As a result, it may take from 6 months to 7 years or more in some jurisdictional markets for an initial beneficial person to receive the treaty benefit from the respective foreign government tax authority.

The tax reclamation process has created several pain points for claimants, including but not limited to:

Zero use of tax reclaim assets and lost time value of money—While tax reclaim assets remain in the treasuries of foreign government tax authorities, global investors are unable to use those tax reclaim assets and their value is not adjusted for the time value of money. Otherwise, these assets could be used by global investors for many purposes, such as to fund current portfolio needs such as funding of pension benefits; reducing administrative costs; and pursuing portfolio reinvestment opportunities in order to keep pace with the rate of inflation.

Expensive tax reclamation and administrative costs—High fees are associated with tax reclamation filings, effectively reducing the value of the tax reclaim assets. Furthermore based on the lengthy tax reclamation period, it can be very expensive for global investors to support the administrative infrastructure necessary to manage the tax reclamation process.

Lengthy tax reclamation periods—Depending on the jurisdictional tax market, it could take anywhere from 6 months to 7 years or more for global investors to collect on their filed tax reclaim assets.

Sub par portfolio performance—Over-taxation of dividend and interest income effectively reduces the overall performance of portfolios as global investors do not receive the intended full benefit of their investments. Eventually when the tax reclaim assets are paid by foreign government tax authorities, the assets' values are greatly reduced as a result of inflation, administrative cuts, etc.

The time between the filing of a tax reclamation claim and the eventual payment is extremely important from a claimant's perspective. During this time, the dividend and interest tax reclaim asset has zero utility because it is not generating additional income. As recently as February 2006, the Centre for Tax Policy and Administration within the Organisation for Economic Co-Operation and Development (OECD) estimated the value of assets currently managed by investment funds is in excess of US$16 trillion, of which a substantial part of those assets represents cross border investments. According to the Centre for Tax Policy and Administration:

[I]t is therefore often unclear whether the benefits of tax treaties are available to the funds themselves. Where these benefits are not available at the level of the fund, they would normally be available to the [initial beneficial persons] themselves to the extent that these are residents of countries which have a concluded (sic) tax treaty with the country from which the fund derives income.

Organisation for Economic Co-Operation and Development, "Improving Tax Treaty Benefits for Collective Investment Funds". Organisation for Economic Co-Operation and Development. 21 Dec. 2006. <http://www.oecd.org/documentprint/0,2744,en_2649_33747_3605 1121_1_1_1_1,00.html>

It is estimated that there are over US$161 billion in global dividend and interest tax reclaim assets outstanding each year. Currently, there are no financial institutions or marketplaces providing liquidity for tax reclaim assets.

A need thus exists for systems and methods serving to reduce or eliminate the market challenges of an initial beneficial person's need to collect global dividend and interest tax reclaim assets.

Some embodiments of the present invention allow countries to retain their current tax relief infrastructure and do not require legislative or administrative changes in order to reform current tax reclamation procedures. ROSESeries ABS may be created through the private purchase and sale of global dividend and interest tax reclaim assets between an SPV and an initial beneficial person, for further sale to an SPV trust in order to constitute a true sale of assets. This affords the assets bankruptcy remote protection from an initial beneficial person's risk. The private purchase and sale of the tax reclaim assets to an SPV may be by assignment in the source income country, which is in accordance with the foreign government tax authority's procedures and market practices. Furthermore, the legal assignment of tax reclaim assets between an initial beneficial person and an SPV for the private purchase and sale (true sale) methodology does not infringe on the double taxation treaties among foreign governments.

The creation of ROSESeries ABS through the global pooling of dividend and interest tax reclaim assets may provide much-needed financial liquidity to an initial beneficial person for reinvestment opportunities and cash utilization, thereby increasing an initial beneficial person's return on investments. The creation of ROSESeries ABS may also contribute to global financial market efficiency and global capital market deepening through ROSESeries ABS' liquidity provisions.

Therefore, ROSESeries ABS may provide much-needed market liquidity and efficiency, thereby enhancing global capital market deepening. For example, if the expansion of money theory is employed, and the Federal Reserve Bank's reserve requirement is set at 10%, the expansion of money multiplier will be 1/10%=10. Using the expansion of money multiplier, a US$161 billion in outstanding global dividend and interest tax reclaim assets could theoretically expand to US$1.61 trillion within a very short period in the absence of leakage. It is very easy to see the liquidity value of ROSESeries ABS to an initial beneficial person and to the global capital market at large.

Asset securitization has produced tremendous financial liquidity for the global market since its inception in the US capital market in 1970. By mid-2004, it was estimated that the total rated global securitization market stood at US$1,240 billion. The first ABS were issued in 1985; and in that year, the market for publicly offered ABS issues was US$1.2 billion. (The Bond Market Association. "Types of Bonds: Asset Backed Securities Contents." The Bond Market Association. 5 Jan. 2007. http://www.investinginbonds.com/learnmore.asp?catid=5&subcatid=16&id=10.) The Bond Market Association estimates put the 2003 issuance of publicly traded ABS at US$479.4 billion. (The Bond Market Association. "Types of Bonds: Asset Backed Securities Contents." The Bond Market Association. 5 Jan. 2007.

http://www.investinginbonds.com/learnmore.asp?catid=5&subcatid=16&id=10.) Primarily ABS have been credit card receivables, auto loans, manufactured-housing contracts, and home equity loans. As the ABS market continues to grow and mature, new ABS asset classes are being introduced to the market (e.g. Royalty ABS). ROSESeries ABS represent a new ABS asset class. With the current global market estimate of US$161 billion in outstanding dividend and interest tax reclaim assets annually, ROSESeries ABS may inject much-needed liquidity into the global capital market.

SUMMARY

In some embodiments discussed below, securities are created and issued (sold) to finance purchase of a claim for tax reclaim assets, the purchase price (after deduction for expenses) providing liquidity through the capital market for an initial beneficial person on global dividend and interest tax reclaim assets. In some embodiments, a global custodian (e.g., bank) may send two types of payments to an initial beneficial person:

net dividend and interest from the foreign withholding agent proceed of the tax reclaim amount as a result of the purchase and sale agreement between an initial beneficial person and a buyer of the claim for tax reclamation assets The buyer of the claim may, for example, be a special purpose vehicle (SPV) formed for effecting the transactions.

It is estimated that over US$161 billion in global dividend and interest tax reclaim assets are currently outstanding with foreign government tax authorities annually. In some embodiments, securitization of the claim for tax reclamation assets can provide immediate cash liquidity through the capital markets in order to improve an initial beneficial person's return on investments and cash flow. For example, if the expansion of money theory is employed, and the Federal Reserve Bank's reserve requirement is set at 10% of assets, US$161 billion in outstanding global dividend and interest tax reclaim assets could theoretically expand to US$1.61 trillion within a very short period in the absence of leakage. ROSESeries ABS may provide real economic value to an initial beneficial person and contribute to capital market efficiency as a whole. Therefore, securitization of global dividend and interest tax reclaim assets into ROSESeries ABS may provide, but is not limited to, the below economic benefits:

For the Initial Beneficial Person; benefits include: (1) obtaining freedom from the market challenges of the global dividend and interest tax reclamation process; (2) providing immediate cash liquidity for an initial beneficial person's reinvestment opportunities and other cash needs; (3) providing a higher rate of return on investments due to an immediate utilization of dividend and interest tax reclaim assets; and (4) providing immediate cash to fund current actuarial pension benefits or other needs.

For the Capital Market Investor; benefits include: (1) providing access to a new source of investment grade securities; (2) providing access to rated diversified risk; (3) providing access to a diversified investment time horizon; Economic Benefit—Capital Market: (4) providing an increase in global capital market efficiency and liquidity; (5) providing an increase in cross border investments; and (6) providing an increase in capital markets.

The one benefit for foreign governments, also: (1) providing an increase in cross border investments through an initial beneficial person's reinvestment in the local markets; (2) providing an increase in local capital market liquidity; and (3) providing an increase in foreign government tax revenue through capital market reinvestments.

In addition to the economic benefits outlined above, some of the approaches discussed herein may provide innovative and operational benefits to the tax reclamation market as noted below:
1. Countries may not have to change their tax relief arrangements—Tax relief arrangements vary from country to country and reflect the uniqueness of each country's legislative and administrative needs. Some embodiments may not require countries to abandon their current tax relief arrangements, thereby preserving the double taxation treaties between foreign governments, as established.
2. Virtual pooling of assets—Some embodiments may not require any country to make legislative changes in order to allow asset pooling. Some embodiments pool assets virtually, which may not have any impact on legislative restrictions.
3. Use of existing financial intermediaries—Many countries use financial intermediaries to receive initial beneficial person declarations, provide tax rate information, and facilitate the tax relief process. Some embodiments may not involve legislative or administrative changes to tax relief provisions, financial intermediaries may not be required to adopt additional procedures to process global dividend and interest tax reclaim assets which are pooled, securitized, and traded. Countries of investment may continue the use of financial intermediaries who are knowledgeable of the tax relief provisions for a given country.
4. Compliance with legislative tax law—Embodiments taught herein remain in compliance with all legislative law and are open to periodic reviews as mandated in all markets of operation.
5. Immediate implementation—Some embodiments may not involve sweeping tax relief reform, which may ultimately require the approval of all countries that provide tax treaty benefits. Therefore, some embodiments may be implemented immediately.
6. Cost effective for all participants—Some embodiments are designed to offer cost effective benefits to an initial beneficial person. In addition, foreign tax authorities may not have to incur any additional costs for the implementation, because tax relief legislative or administrative changes may not be required.

Applying some embodiments to non-performing global dividend and interest tax reclamation assets presents a tremendous business opportunity with no immediate competition in the asset securitization market. With some embodiments, an initial beneficial person may receive a tax relief benefit upon the dividend and interest payment date. An initial beneficial person may not have to wait for countries to make dramatic legislative and administrative changes in order to reform current tax reclamation procedures. Implementation of some embodiments may be immediate, with cost-effective benefits for all participants.

It will be evident to those of ordinary skill in the art, that the above assertions and benefits of the present invention are not exhaustive.

BRIEF DESCRIPTION OF THE DRAWINGS

The above summary will be better understood when taken in conjunction with the following detailed descriptions and accompanying drawings. The accompanying drawings represent two types of exemplary diagrams/drawings: process flow and database models. Process flow drawings may include numbered steps and/or decisions which may be included in a particular process related to some embodiments. Database model drawings, depict some embodiments of the present invention which may require a relational database management system (e.g. IBM DB2, Microsoft SQL Server, Oracle 11g, etc.) to facilitate the collection and storage of data records. The accompanying drawings of database models may serve as a blueprint for an exemplary relational database. The database models, which may be commonly referred to as database tables, include the names of potential fields that represent various types of stored data. The fields may be commonly referred to as database columns. The accompanying database model drawings include potential database foreign key referential constraints, which may establish explicit relationships between two database models. These relationships may represent the requirement of a particular data record to exist in the referenced database model (commonly referred to as the parent database model) before it may exist in the referencing database model (commonly referred to as the child database model). Foreign key guides may appear on the database model diagrams to help understand the foreign keys related to some embodiments.

FIG. 2, is an exemplary block diagram illustrating relationships among an SPV, SPV trust, an initial beneficial person, and capital market investors once rated ROSESeries ABS are sold in the capital market, according to some embodiments of the present invention.

Model 3801, FIG. 38 is an exemplary database model that may be used to store the parameters for input and output data processes, according to some embodiments of the present invention.

Model 3802, FIG. 38 illustrates an exemplary interface definition database model, which identifies data files associated with a particular input or output data process, according to some aspects of the present invention.

Model 3803, FIG. 38 illustrates an exemplary transform handler database model, which is used for inbound data to transform disparate file formats from various third-party organizations into standard file formats; and for outbound data to transform standard file formats into the required unique file formats for the applicable third-party organizations, according to some embodiments of the present invention.

Model 3804, FIG. 38 illustrates an exemplary database model, which is used to store processing rules for technology solutions associated with embodiments of the present invention.

Model 3805, FIG. 38 illustrates an exemplary database model that stores key information regarding initial beneficial persons, according to some aspects of the present invention.

Figure 38:
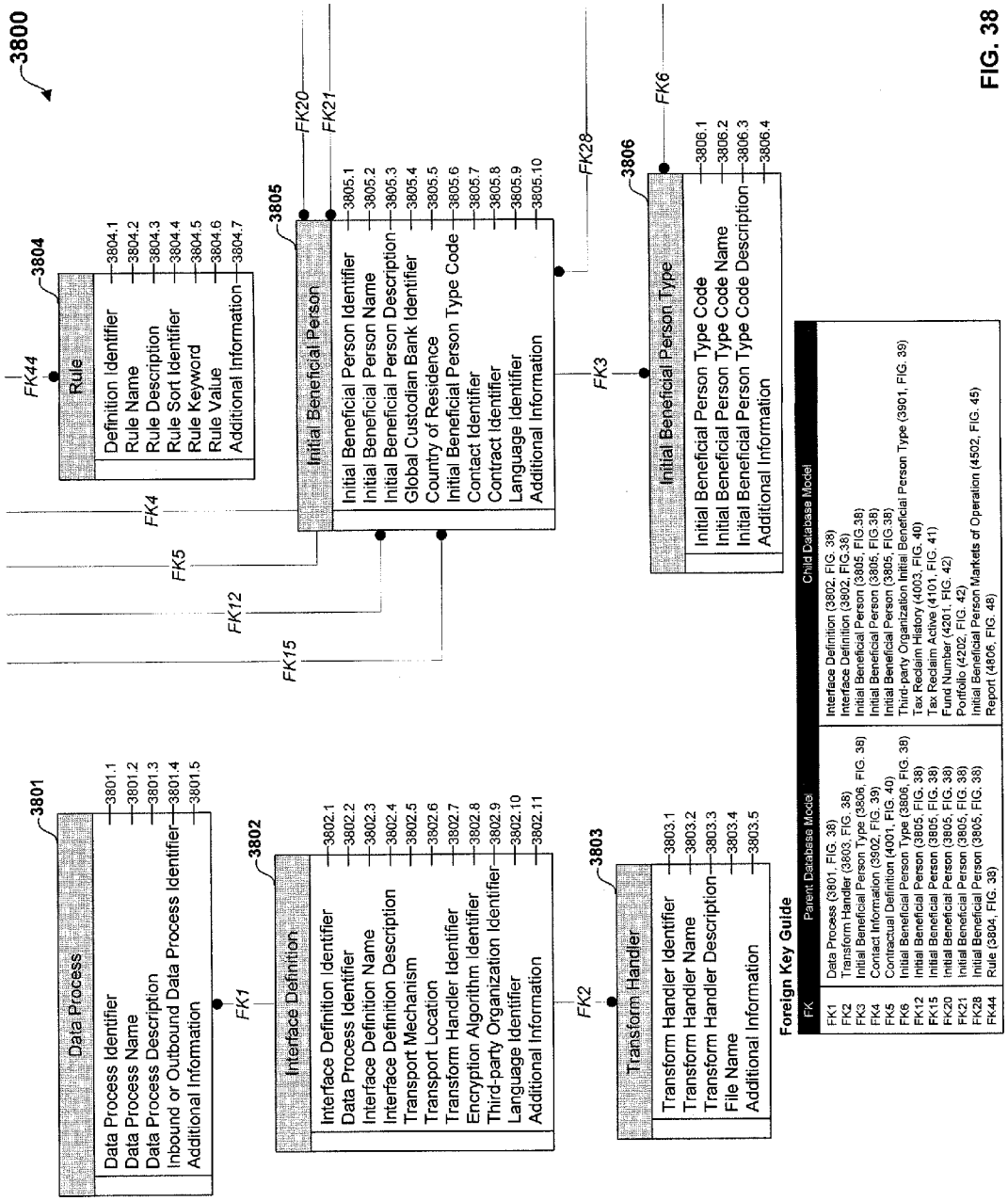
FIGS. 38-FIG. 52 are illustrative examples of database models used to store data records, in accordance with some embodiments of the present invention. As a collective, these database models may serve as a blueprint for the creation of a relational database. Multiple database models may be illustrated in a single figure. The following brief descriptions cover each database model.

Model 3806, FIG. 38 serves as an illustrative example of an initial beneficial person type database model, which may be used to categorize different types of initial beneficial person entities.

Figure 39:
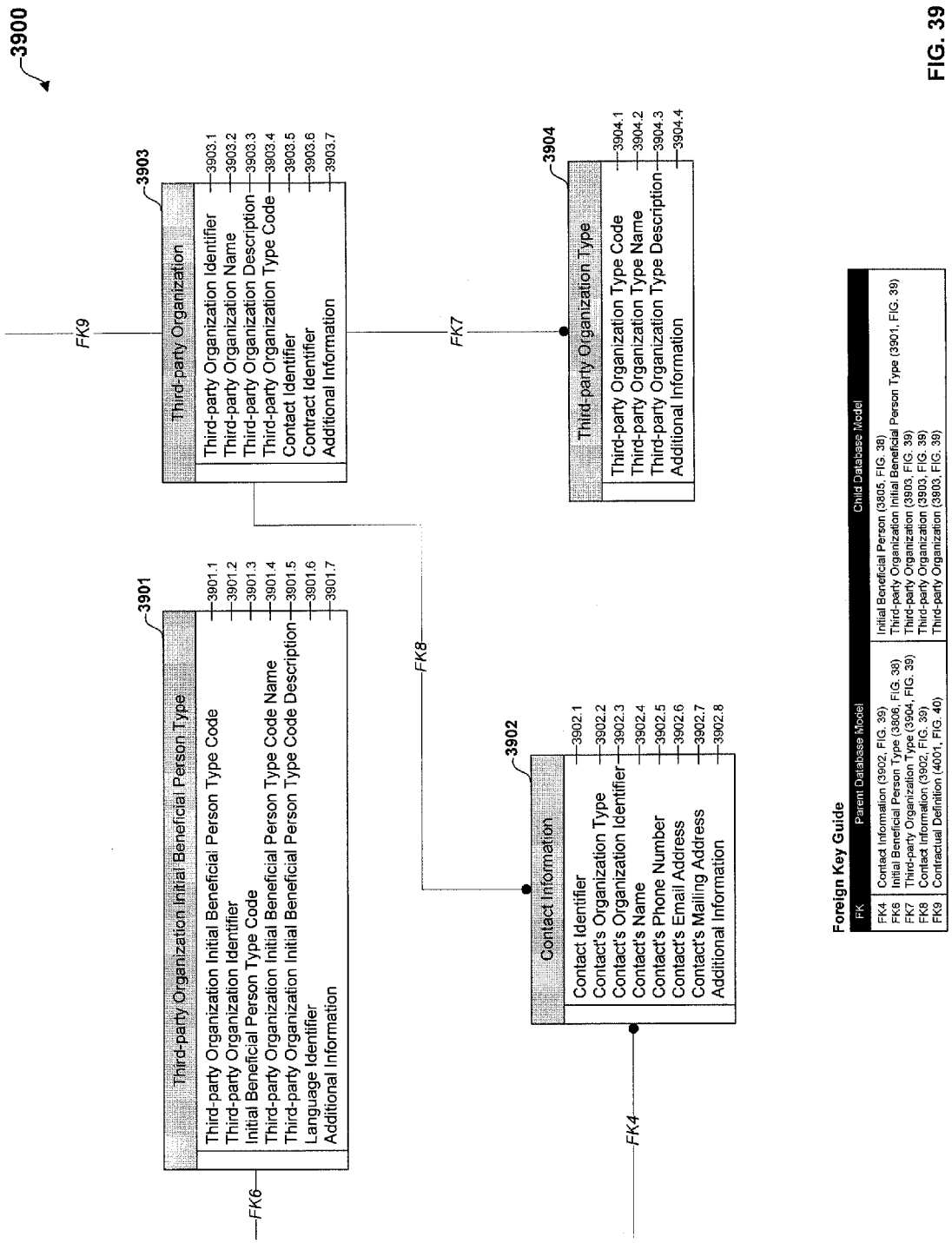

Model 3901, FIG. 39 is an illustrative example of a third-party organization initial beneficial person type database model. This database model may be used to store a data source provider's distinct categorizations for initial beneficial person entities, according to some aspects of the present invention.

Model 3902, FIG. 39 illustrates an exemplary contact information database model, which may store the contact details of organizations including, but not limited to initial beneficial persons, global custodian banks, and SPV originators, according to some embodiments of the present invention.

Model 3903, FIG. 39 is an illustrative example of a database model used to store information about various third-party organizations, according to embodiments of the present invention.

Model 3904, FIG. 39 is an illustrative example of a third-party organization type database model, which identifies a type of organization, such as but not limited to, global custodian bank, legal counsel, and capital market investor, according to some aspects of the present invention.

Figure 40:
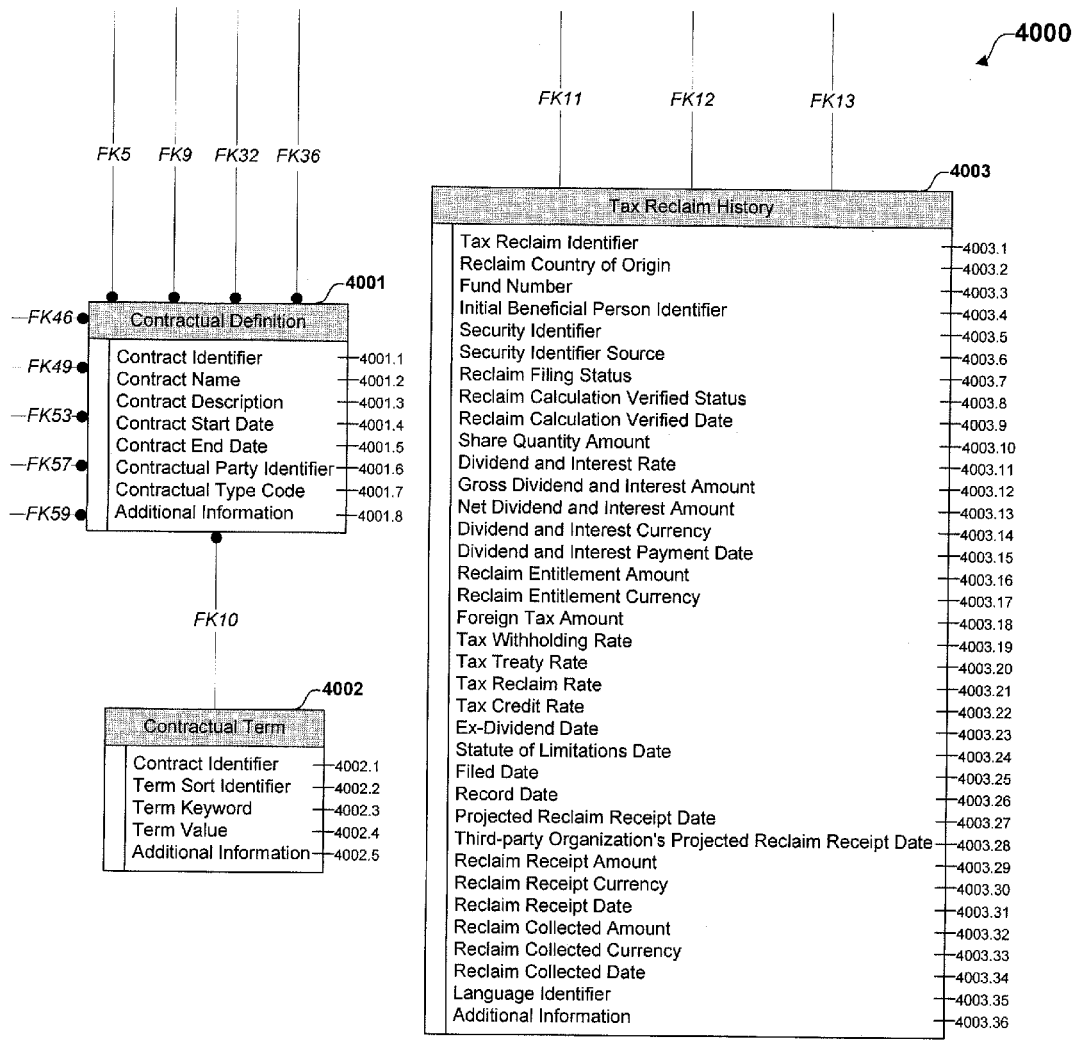

Model 4001, FIG. 40 is an illustrative example of a contractual definition database model used to store various negotiated contracts, according to some embodiments of the present invention.

Model 4002, FIG. 40 is an illustrative example of a contractual term database model used to store detailed terms and conditions of contractual definitions, according to some embodiments of the present invention.

Model 4003, FIG. 40 is an illustrative example of a database model used to store an initial beneficial person's historical tax reclaim assets, according to some embodiments of the present invention.

Figure 41:
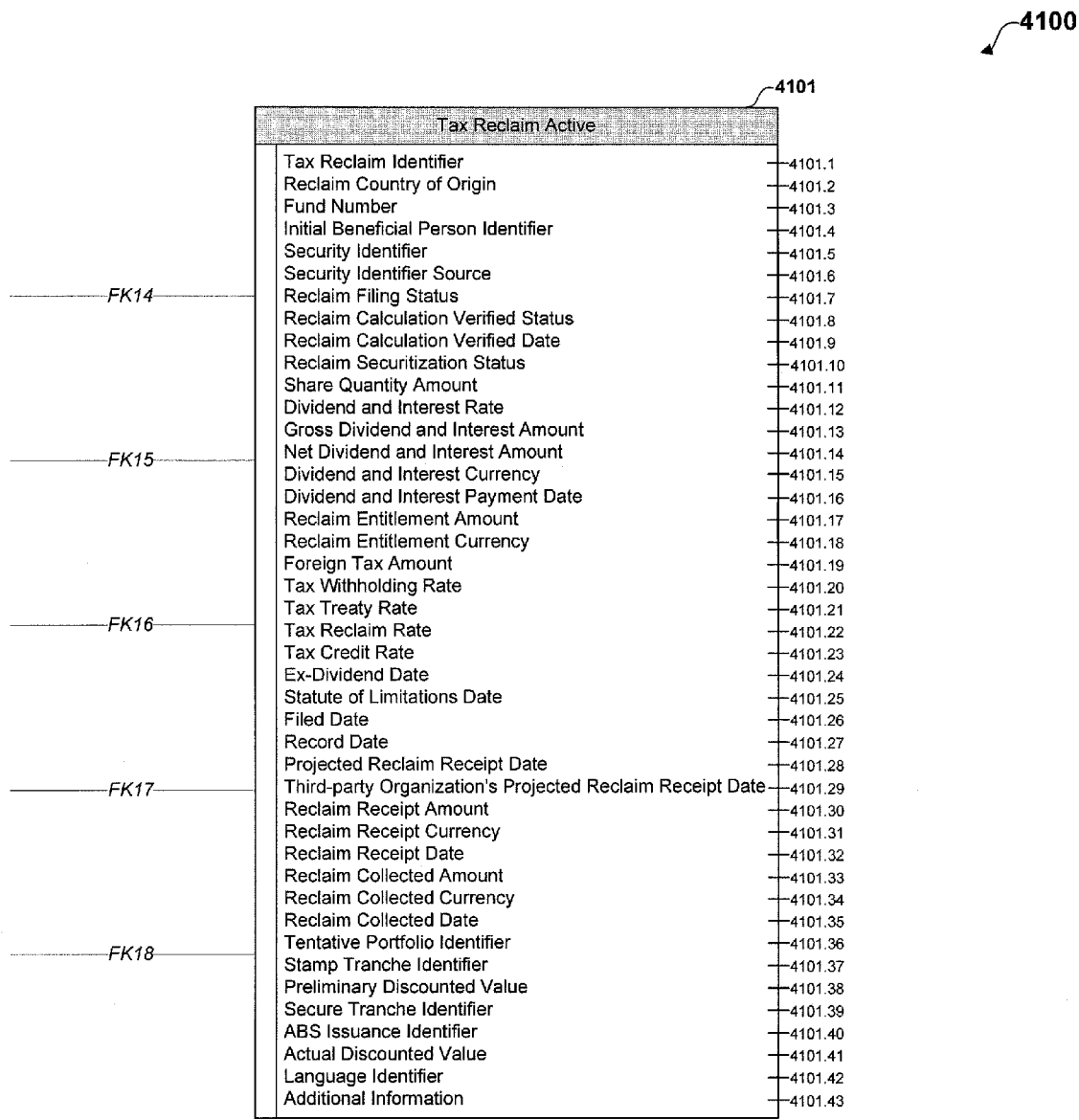

Model 4101, FIG. 41 is an illustrative example of a tax reclaim active database model that is used to store an initial beneficial person's tax reclaim assets that are candidates for securitization into ROSESeries ABS, according to some aspects of the present invention.

Figure 42:
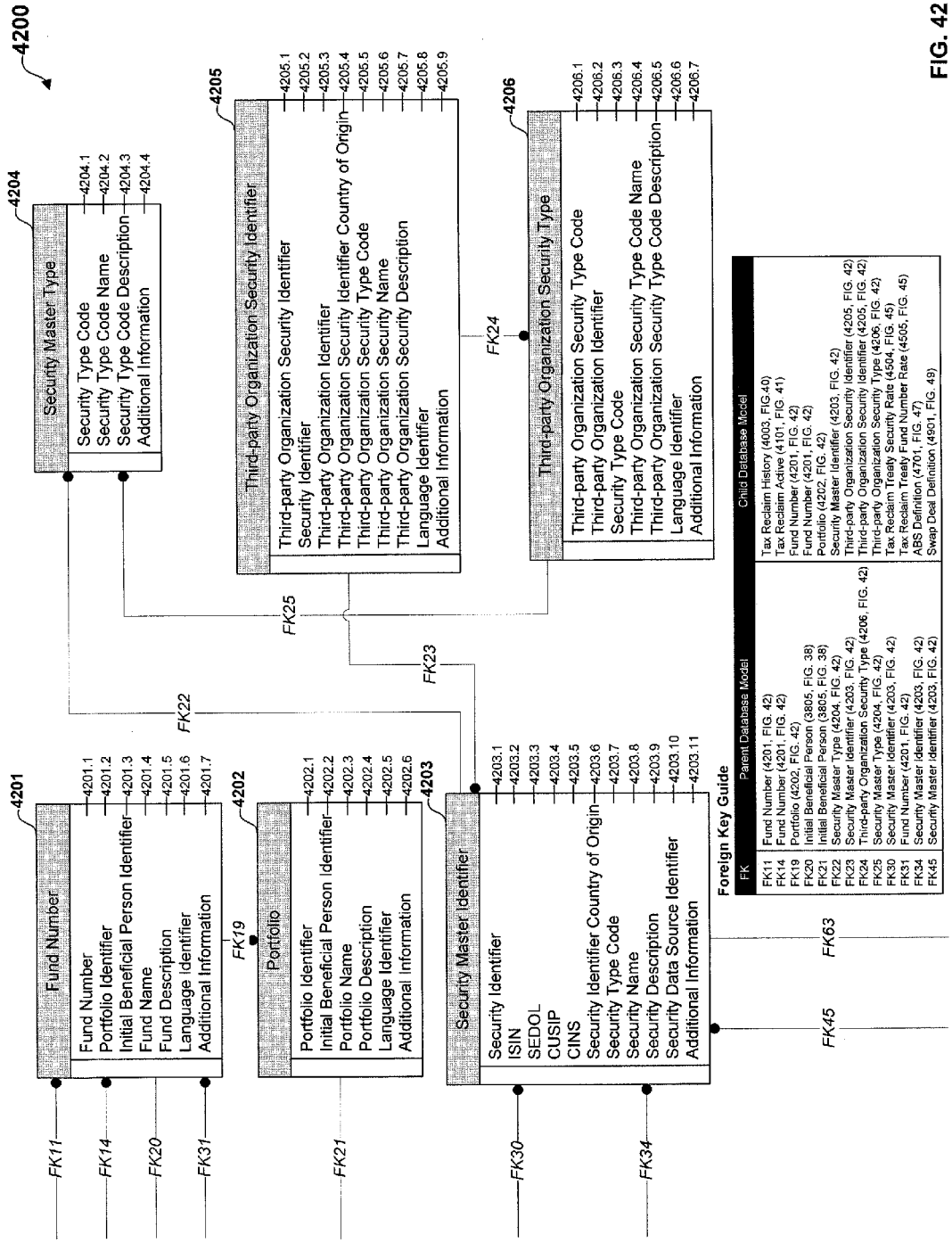

Model 4201, FIG. 42 is an exemplary fund number database model, according to embodiments of the present invention.

Model 4202, FIG. 42 illustrates an exemplary database model that is used to store portfolio names, according to embodiments of the present invention.

Model 4203, FIG. 42 is an exemplary database model that serves as a master repository of security identifiers, according to some embodiments of the present invention.

Model 4204, FIG. 42 illustrates an exemplary database model, which is used to store security identifier codes, according to embodiments of the present invention.

Model 4205, FIG. 42 is an exemplary database model that is used to store a third-party organization's unique security identifiers, according to some embodiments of the present invention.

Model 4206, FIG. 42 is an exemplary database model that is used to store a third-party organization's security type codes, according to some embodiments of the present invention.

Figure 43:
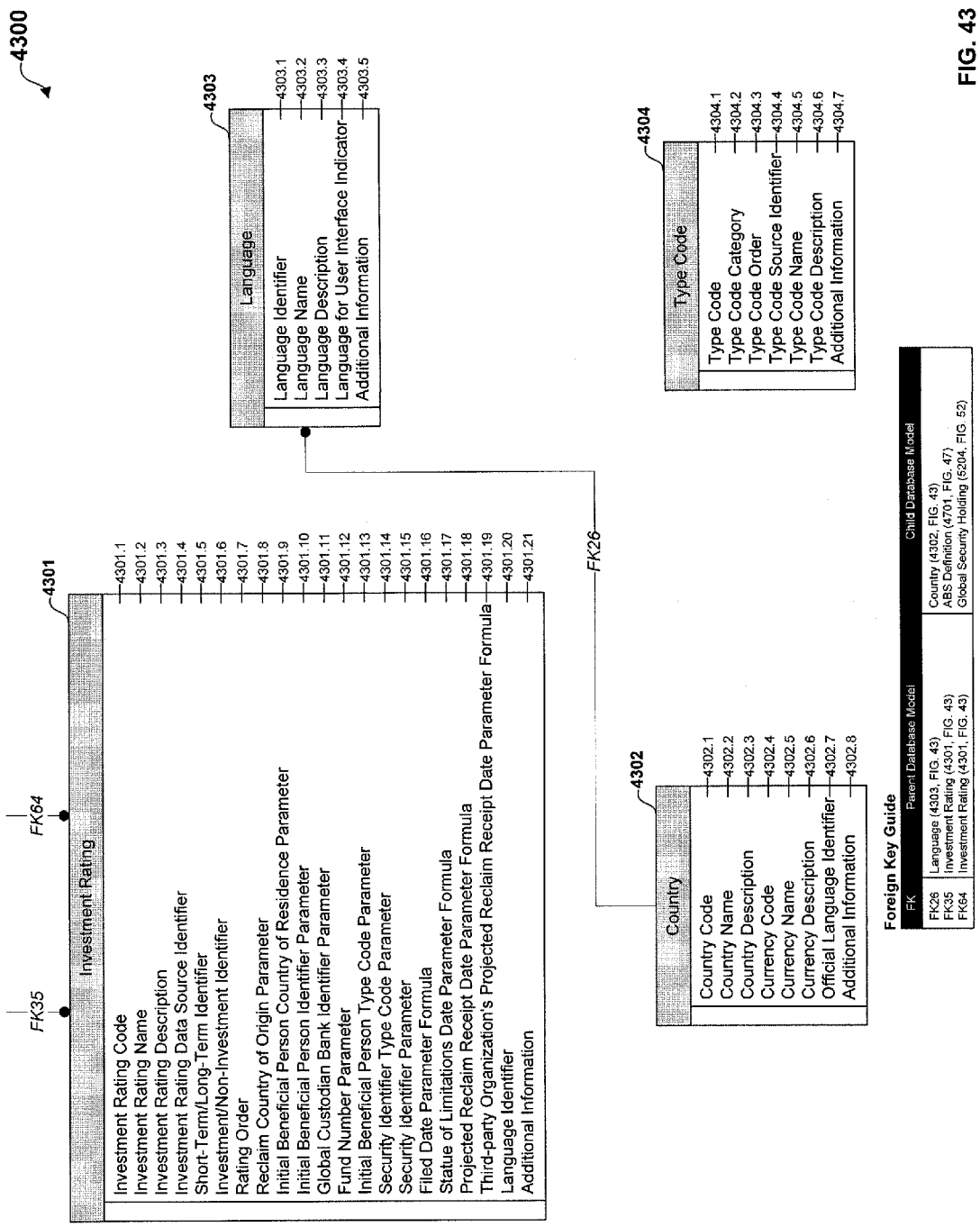

Model 4301, FIG. 43 illustrates an exemplary database model which stores the investment ratings of tax reclaim assets in accordance with embodiments of the present invention.

Model 4302, FIG. 43 illustrates an exemplary country database model, which stores country codes, currency codes, and country names, according to embodiments of the present invention.

Model 4302, FIG. 43 illustrates an exemplary language database model, which is used to identify languages for multilingual processing in accordance with some aspects of the present invention.

Model 4303, FIG. 43 illustrates an exemplary type code database model, which is used to store type code information in accordance with some aspects of the present invention.

Figure 44:
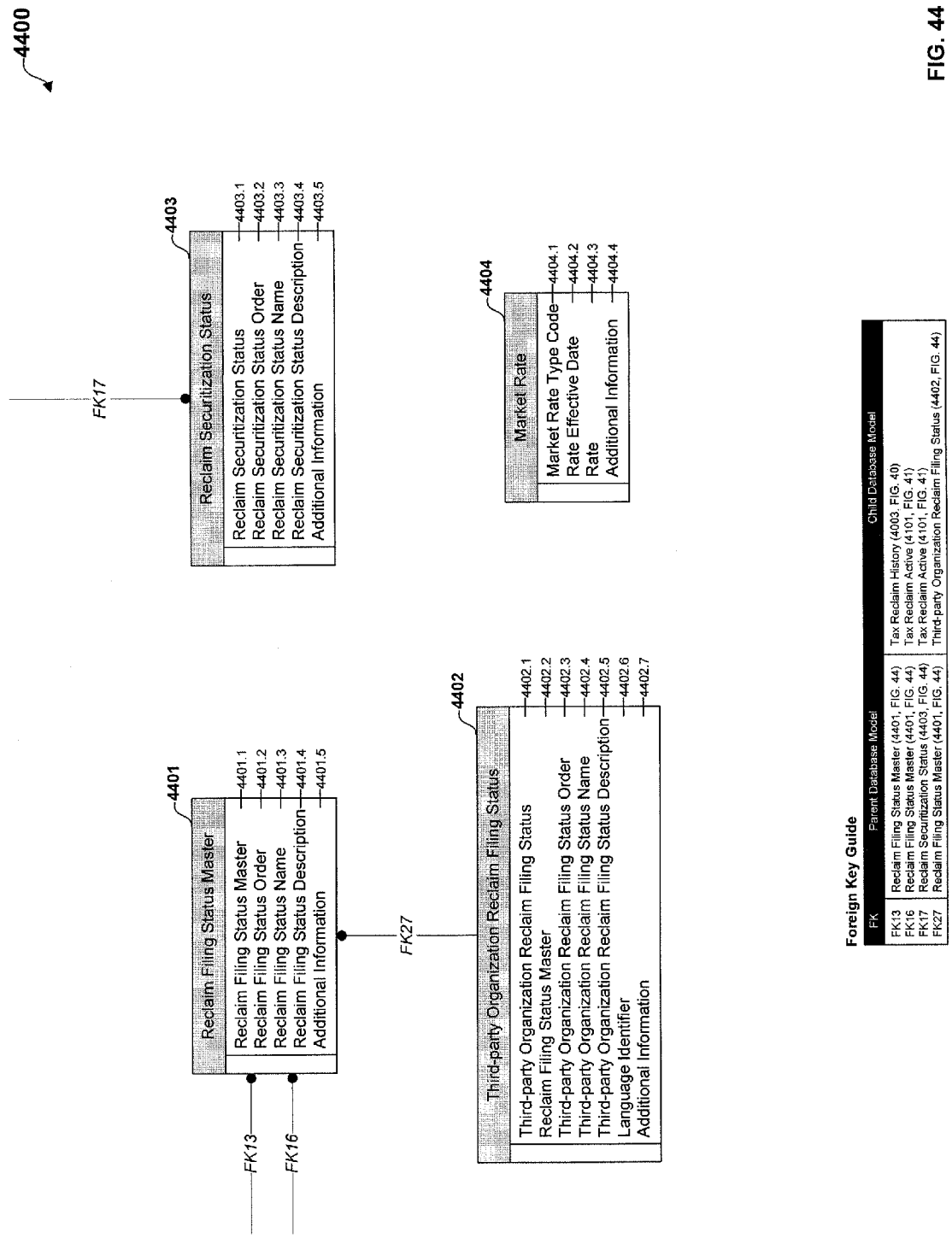

Model 4401, FIG. 44 is an illustrative example of a reclaim filing status master database model, which is used to store reclaim filing statuses, according to some embodiments of the present invention.

Model 4402, FIG. 44 is an illustrative example of third-party organization reclaim filing status model, which stores the reclaim filing statuses of third-party organizations, according to some embodiments of the present invention.

Model 4403, FIG. 44 illustrates an exemplary reclaim securitization status database model used to store the statuses of tax reclaim assets through various pooling and securitization phases, according to some embodiments of the present invention.

Model 4404, FIG. 44 illustrative an exemplary market rate database model which is used to store market rate data such as, but not limited to, libor rates, foreign exchange rates, and US Treasury rates, according to some aspects of the present invention.

Figure 45:
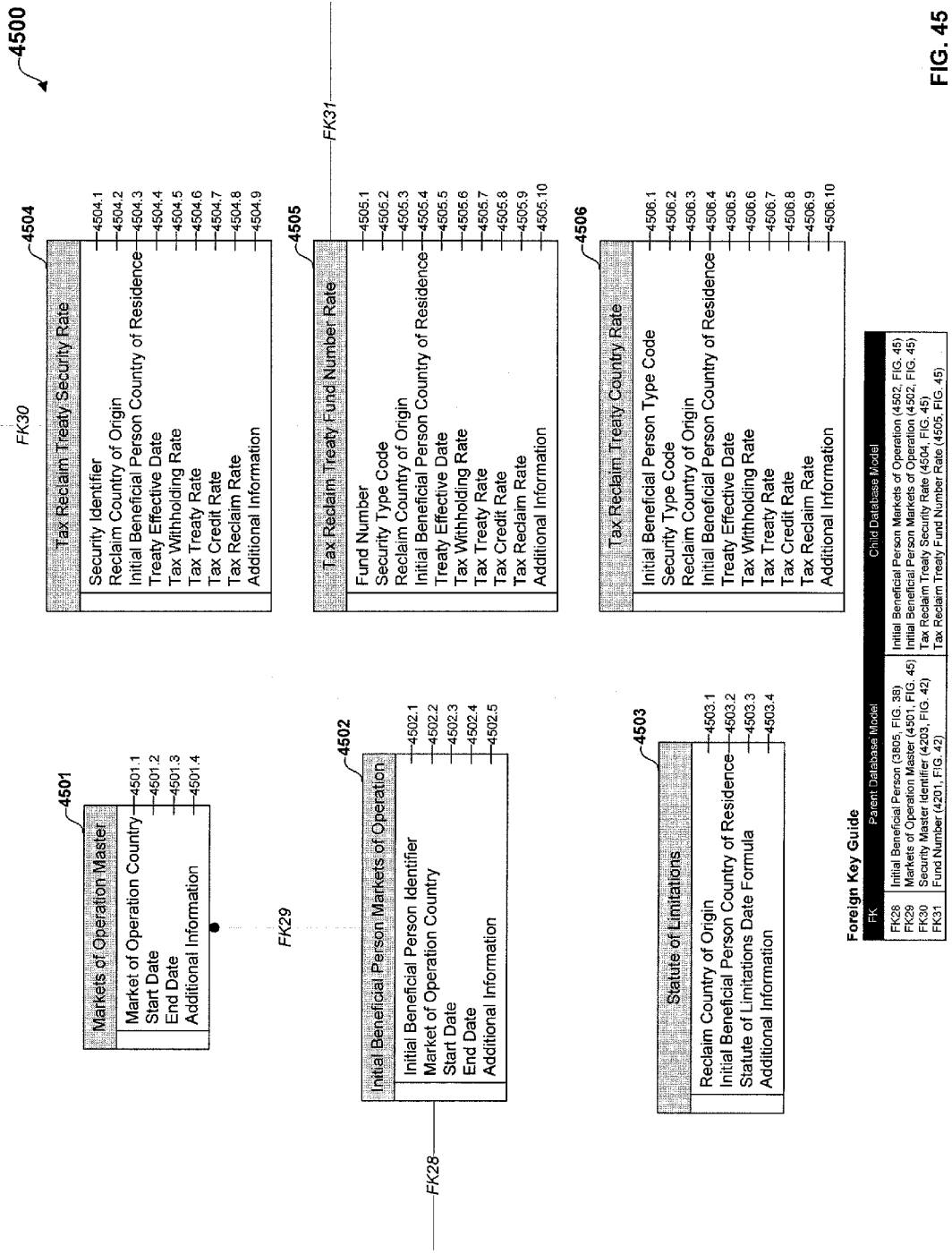

Model 4501, FIG. 45 is an illustrative example of a database model that indicates which tax reclaim markets of operation are eligible for securitization, according to some aspects of the present invention.

Model 4502, FIG. 45 is an illustrative example of a database model that indicates which tax reclaim markets of operation each initial beneficial person may sell to an SPV, according to some aspects of the present invention.

Model 4503, FIG. 45 is an illustrative example of a database model that is used to identify which countries have double taxation treaties and what are the corresponding statute of limitations between, according to some embodiments of the present invention.

Model 4504, FIG. 45 illustrates an exemplary tax reclaim treaty security rate database model, which stores tax treaty rates between foreign governments that are applied on the security identifier level, according to some embodiments of the present invention.

Model 4505, FIG. 45 illustrates an exemplary tax reclaim treaty fund number rate database model, which stores tax treaty rates between foreign governments that are applied on the fund number level, according to some embodiments of the present invention.

Model 4506, FIG. 45 illustrates an exemplary tax reclaim treaty country rate database model, which stores tax treaty rates between foreign governments that are applied on the country level, according to some embodiments of the present invention.

Figure 46:
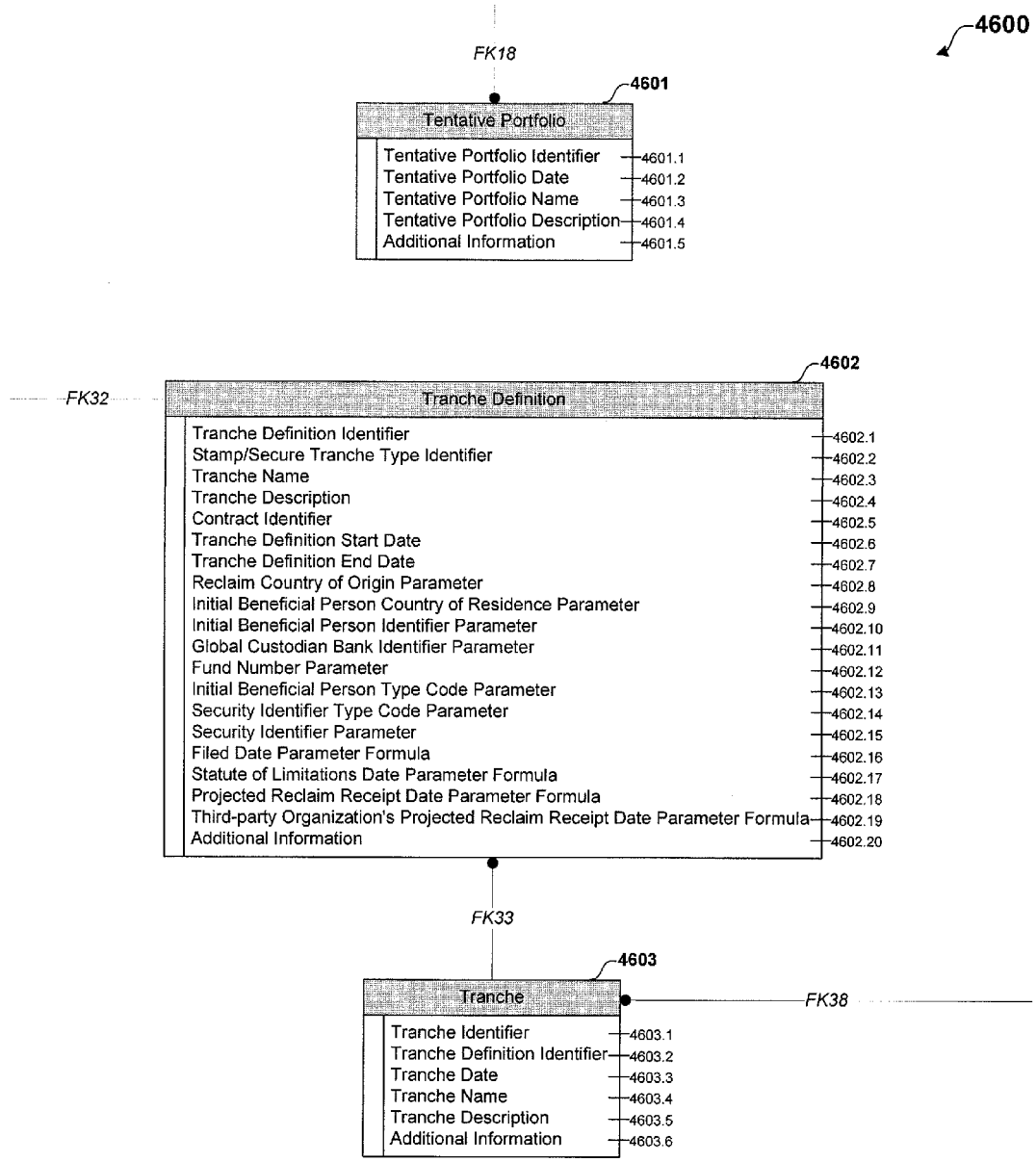

Model 4601, FIG. 46 is an illustrative example of a database model, which is used to store details about tentative portfolios, according to some embodiments of the present invention.

Model 4602, FIG. 46 illustrates an exemplary tranche definition database model, which is used to store the parameters of stamp and secure tranche definitions, according to some aspects of the present invention.

Model 4603, FIG. 46 illustrates an exemplary tranche database model, which is used to store the details of created stamp and secure tranches, according to some aspects of the present invention.

Figure 47:
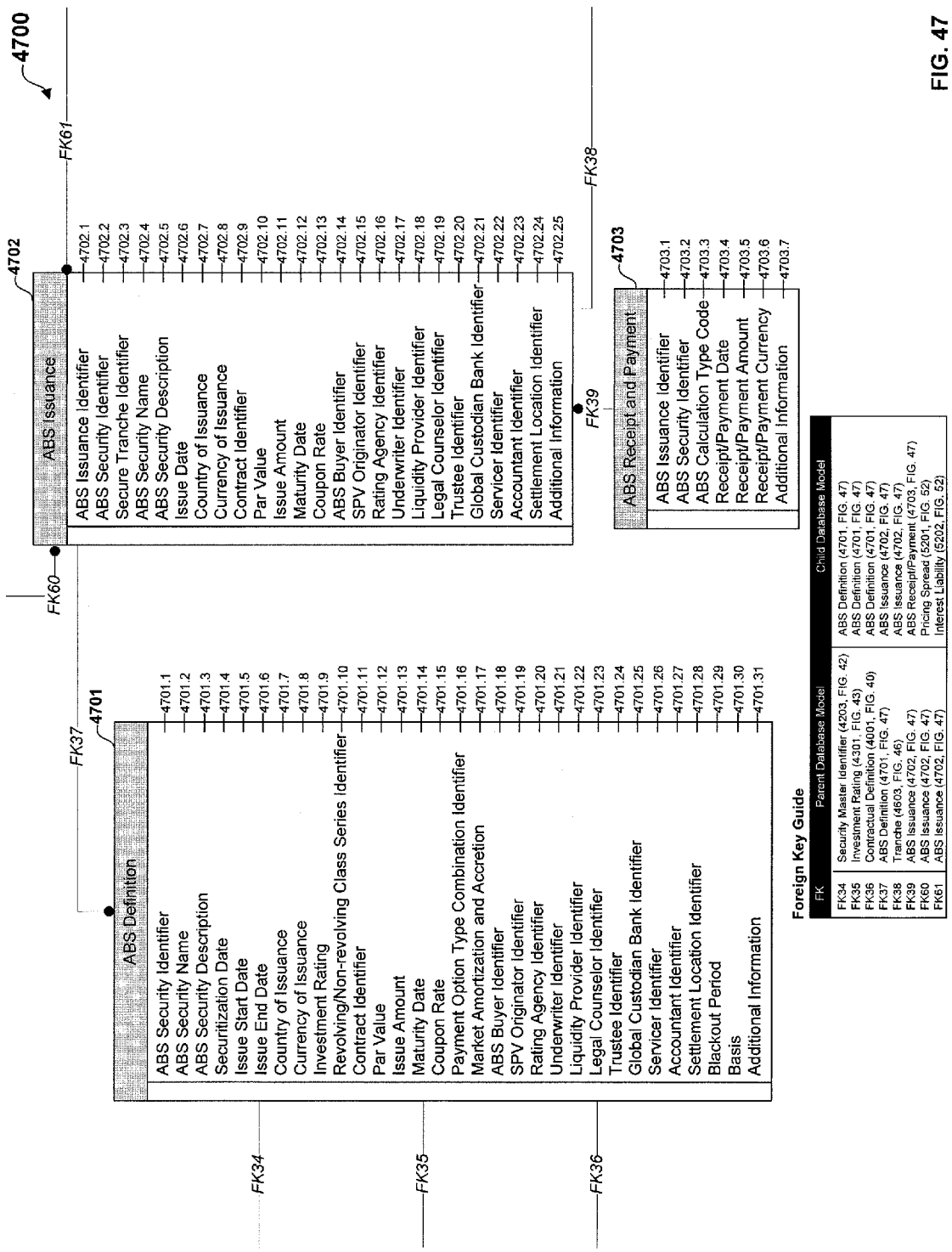

Model 4701, FIG. 47 is an illustrative example of an ABS definition database model, which is used to store key attributes of ROSESeries ABS, according to some aspects of the present invention.

Model 4702, FIG. 47 is an illustrative example of an ABS issuance database model used to store information related to issued ROSESeries ABS, according to embodiments of the present invention.

Model 4702, FIG. 47 illustrates an exemplary ABS receipt/payment database model, which is used to track cash receipts and payments between an SPV trust and capital market investors for maturing ROSESeries ABS, according to embodiments of the present invention.

Figure 48:
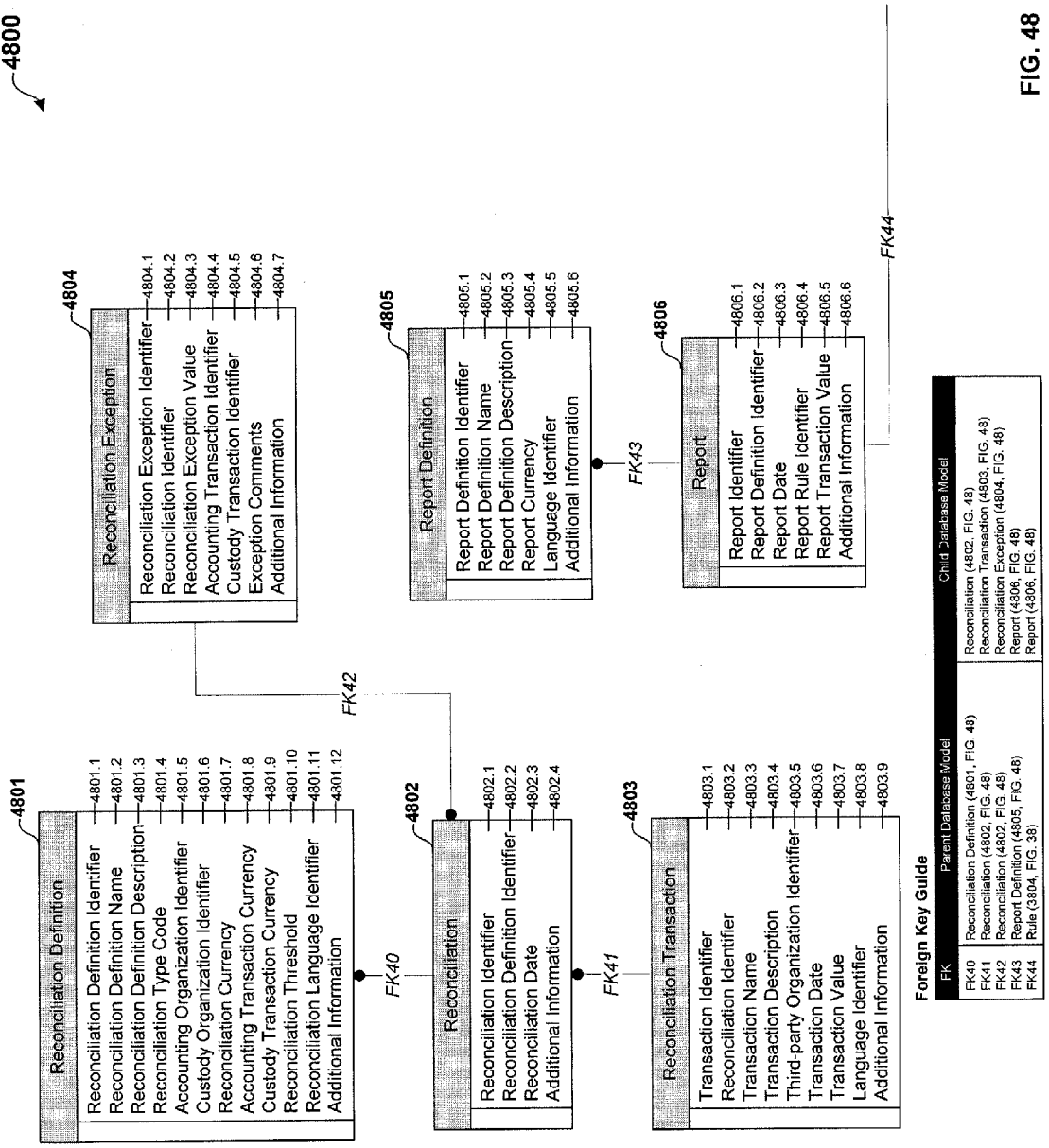

Model 4801, FIG. 48 illustrates an exemplary database model, which is used to store the definition for reconciling accounting and custody transactions, according to some embodiments of the present invention.

Model 4802, FIG. 48 is an illustrative example of a reconciliation database model, which is used to track reconciliation events, according to some aspects of the present invention.

Model 4803, FIG. 48 is an illustrative example of a reconciliation transaction database model that is used to store the accounting and custody transactions for reconciliations, according to embodiments of the present inventions.

Model 4804, FIG. 48 illustrates an exemplary reconciliation exception database model, according to embodiments of the present invention.

Model 4805, FIG. 48 is an illustrative example of a report definition database model, according to some aspects of the present invention.

Model 4806, FIG. 48 is an illustrative example of a database model, which is used to store reporting information, according to some embodiments of the present invention.

Figure 49:
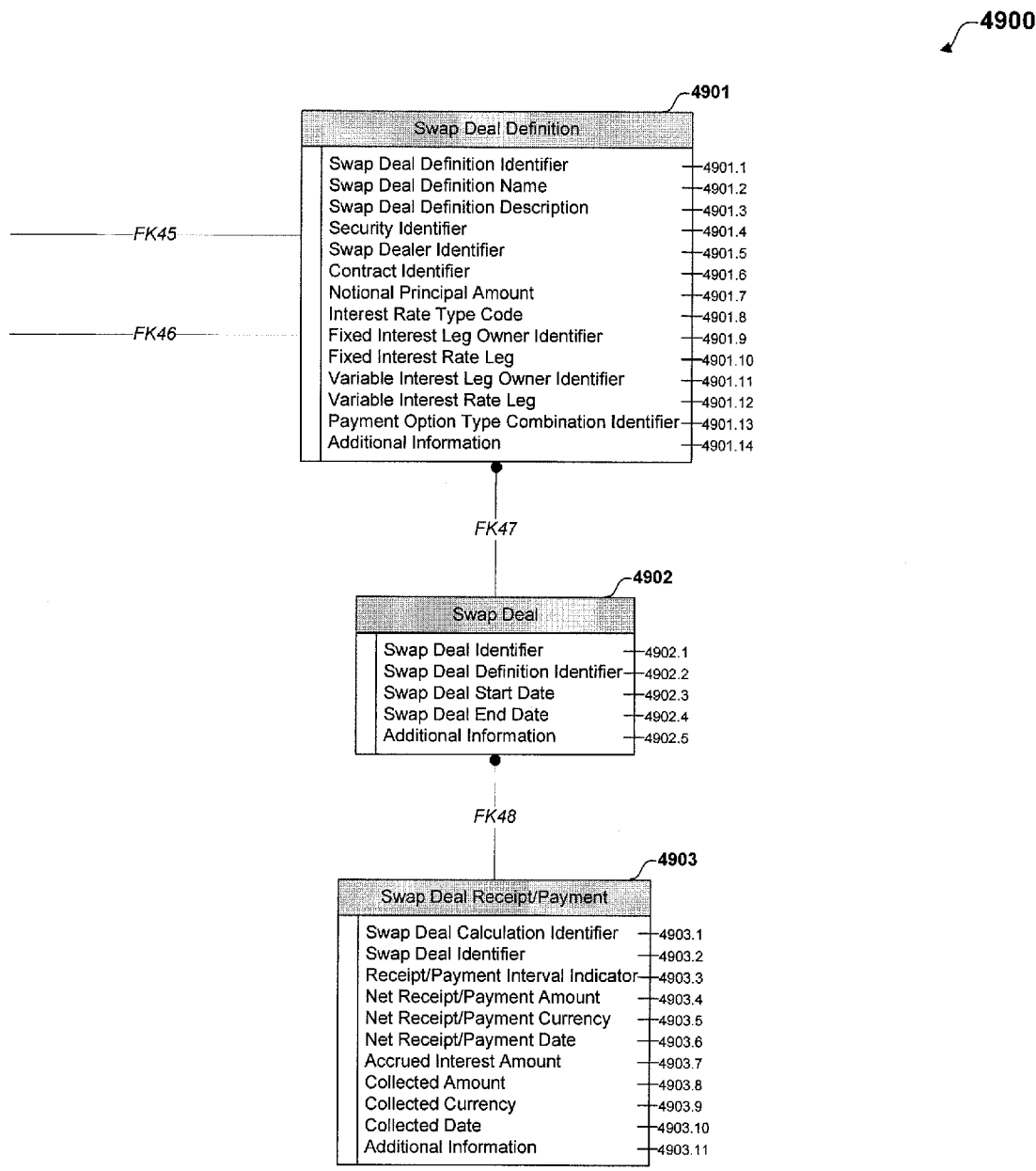

Model 4901, FIG. 49 is an illustrative example of a swap deal definition database model, which is used to store the terms and conditions of interest rate swap deals, according to some embodiments of the present invention.

Model 4902, FIG. 49 is an illustrative example of a swap deal database model, according to some aspects of the present invention.

Model 4903, FIG. 49 illustrates an exemplary swap deal receipt/payment database model, which is used to store the net payment decisions for various swap deals, according to some embodiments of the present invention.

Figure 50:
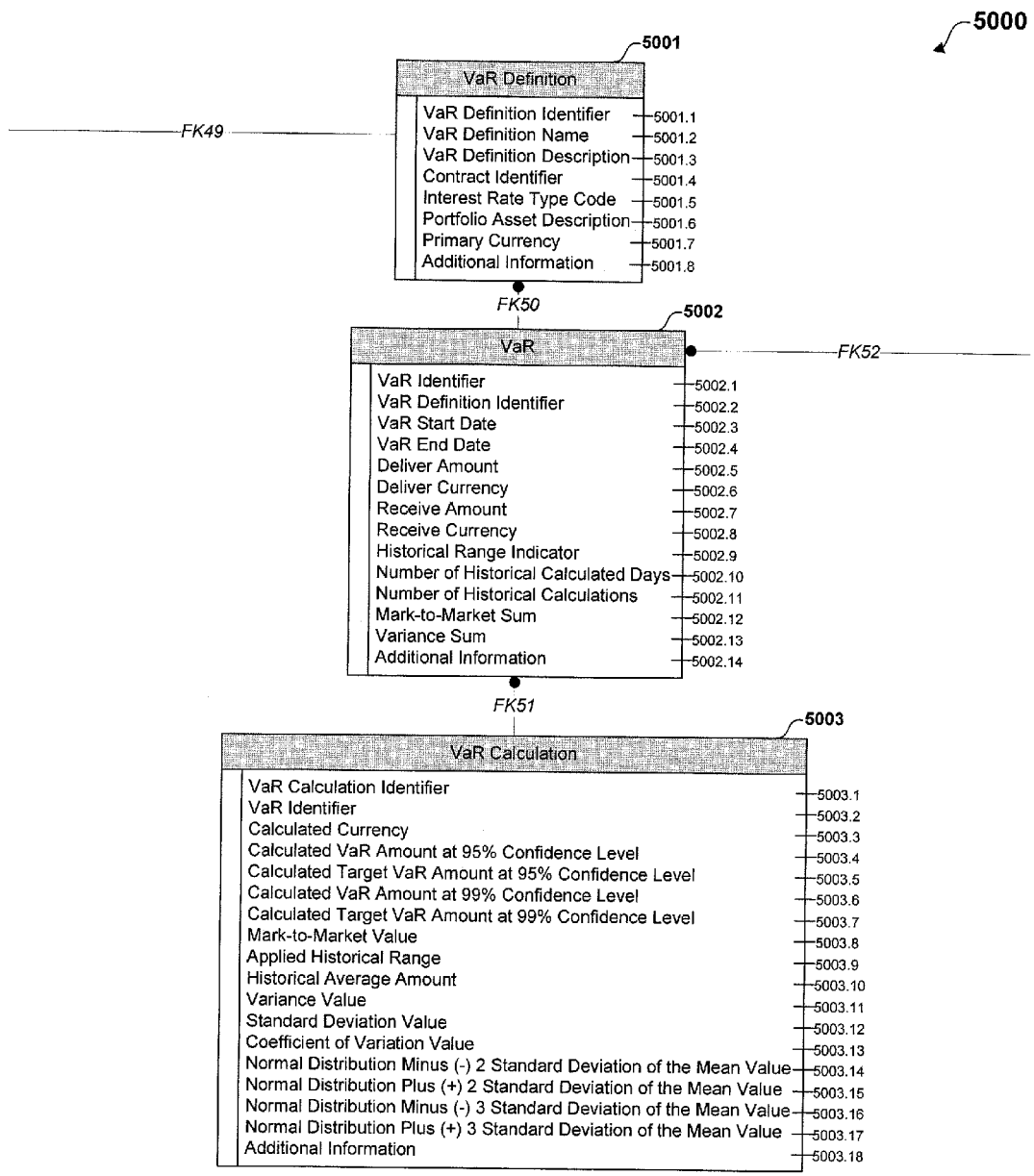

Model 5001, FIG. 50 is an illustrative example of a VaR definition database model, according to some aspects of the present invention.

Model 5002, FIG. 50 is an illustrative example of a VaR database model, which is used to store attributes of VaR instances, according to embodiments of the present invention.

Model 5003, FIG. 50 is an exemplary database model that is used to store VaR calculations, according to some embodiments of the present invention.

Figure 51:
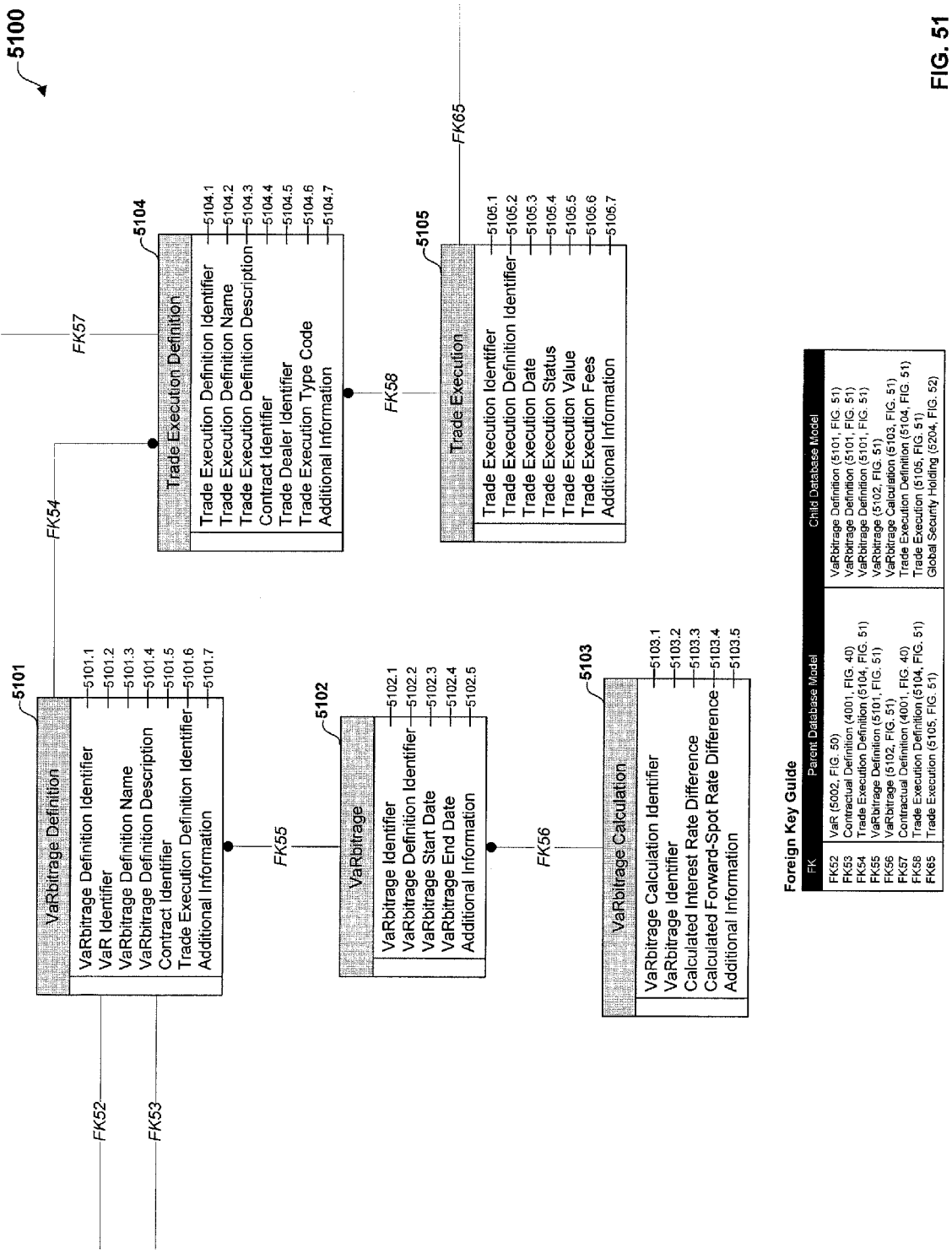

Model 5101, FIG. 51 is an illustrative example of a VaRbitrage definition database model, according to some aspects of the present invention.

Model 5102, FIG. 51 is an illustrative example of a VaRbitrage database model, which is used to store details about VaRbitrage opportunities, according to embodiments of the present invention.

Model 5103, FIG. 51 is an exemplary database model that is used to store VaRbitrage calculations, according to embodiments of the present invention.

Model 5104, FIG. 51 is an illustrative example of a trade execution definition database model, which is used to identify the parameters for booking a trade, according to some embodiments of the present invention.

Model 5105, FIG. 51 is an illustrative example of a trade execution database model, which is used to store the attributes of executed trades, according to some aspects of the present invention.

Figure 52:
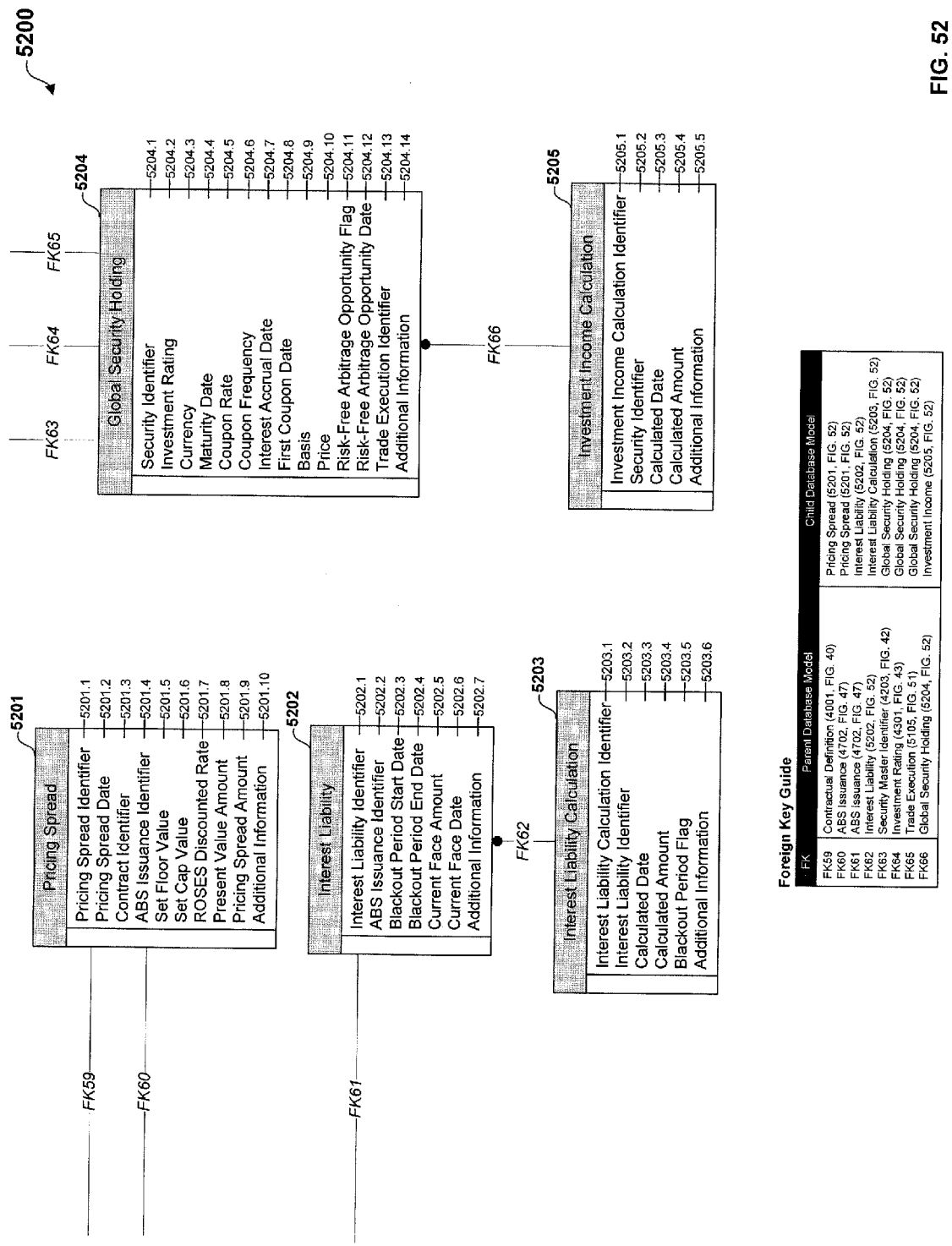

Model 5201, FIG. 52 is an illustrative example of a pricing spread database model, which is used to store a pricing spread calculation on a purchase and sale agreement, according to some embodiments of the present invention.

Model 5202, FIG. 52 illustrates an exemplary interest liability database model, which is used to store the details of interest liability calculation events, according to some aspects of the present invention.

Model 5203, FIG. 52 is an illustrative example of an interest calculation database model, which is used to store various interest calculations in accordance with some embodiments of the present invention.

Model 5204, FIG. 52 illustrates an exemplary global security holdings database model, which is used to store the details of selected securities, according to some aspects of the present invention.

Model 5205, FIG. 52 illustrates an exemplary investment income calculation database model, which is used to store the investment income calculations of global security holdings, according to some aspects of the present invention.

DETAILED DESCRIPTION

Process Flow—Prior Art Tax Reclamation

Figure 1:
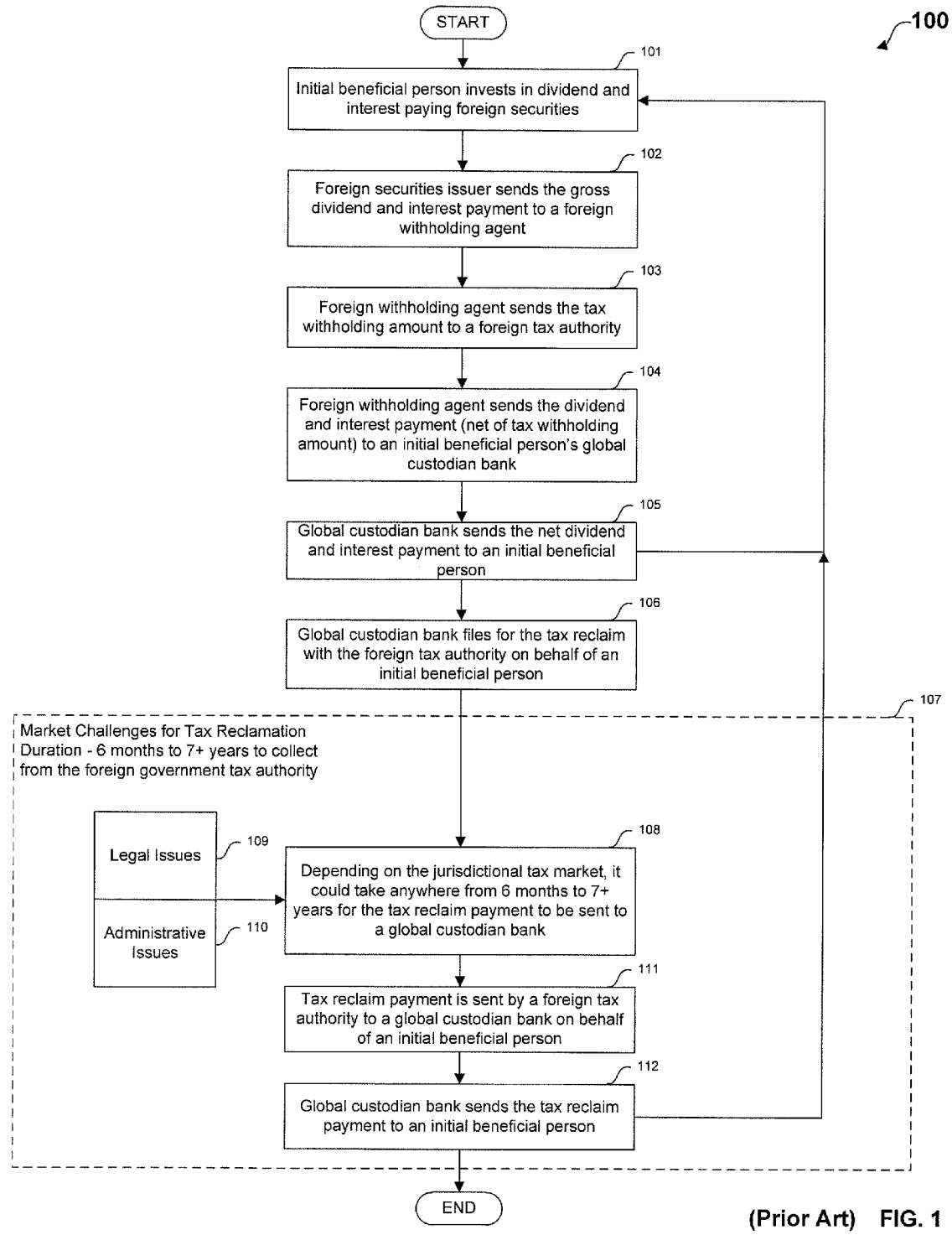
FIG. 1 is an exemplary block diagram of a prior art reclamation process and the current market challenges associated with global dividend and interest tax reclaim assets.

FIG. 1 illustrates from a high level the customary prior art tax reclamation process and the current market challenges associated with tax reclaim assets. Initially, in step 101, an initial beneficial person invests in foreign securities. These investment activities may take place in any local market. Next in step 102, a foreign securities issuer sends a gross dividend and interest payment to a foreign withholding agent to initiate the tax withholding process. In step 103, the foreign withholding agent sends the tax withholding amount to a foreign tax authority; and in step 104, the dividend and interest payment, net of the tax withholding amount from step 103, is sent to an initial beneficial person's global custodian bank. A global custodian bank, which is responsible for safeguarding an initial beneficial person's financial assets, sends the net dividend and interest payment to an initial beneficial person in step 105. The arrow from step 105 to step 101 is an illustrative example of the net dividend and interest payment sent to an initial beneficial person.

Steps 101-105 represent how the gross and net dividend and interest payment is produced during the tax withholding process. In step 106, a global custodian bank files a claim for tax reclamation with a foreign tax authority on behalf of an initial beneficial person. The tax reclaim filing is in reference to a double taxation treaty between the source income (i.e., foreign) government and the government of an initial beneficial person's country of residence.

Step 107 illustrates from a high level the current market challenges involved with tax reclamation. These market challenges, which stem from legal and administrative issues as described earlier, lengthen the time it takes an initial beneficial person to receive the tax reclaim payment. Depending on the jurisdiction, on average it may take 6 months to 7 or more years for a foreign tax authority to pay the claim for tax reclamation.

Step 108 represents the 6 month to 7+ year potential waiting period for the tax reclaim payment to be sent to a global custodian bank by a foreign tax authority. This period has a significant impact to an initial beneficial person, because the tax reclaim assets do not earn interest while remaining in the coffers of a foreign tax authority. Two major influences on the length of time it takes to collect the tax reclaim assets are legal (step 109) and administrative (step 110) issues.

At the conclusion of the year waiting period, typically a foreign tax authority sends the tax reclaim payment to a global custodian bank on behalf of an initial beneficial person, step 111. In step 112, a global custodian bank sends the tax reclaim payment to the initial beneficial person.

Process Flow—Tax Reclamation and Securitization

Figure 2:
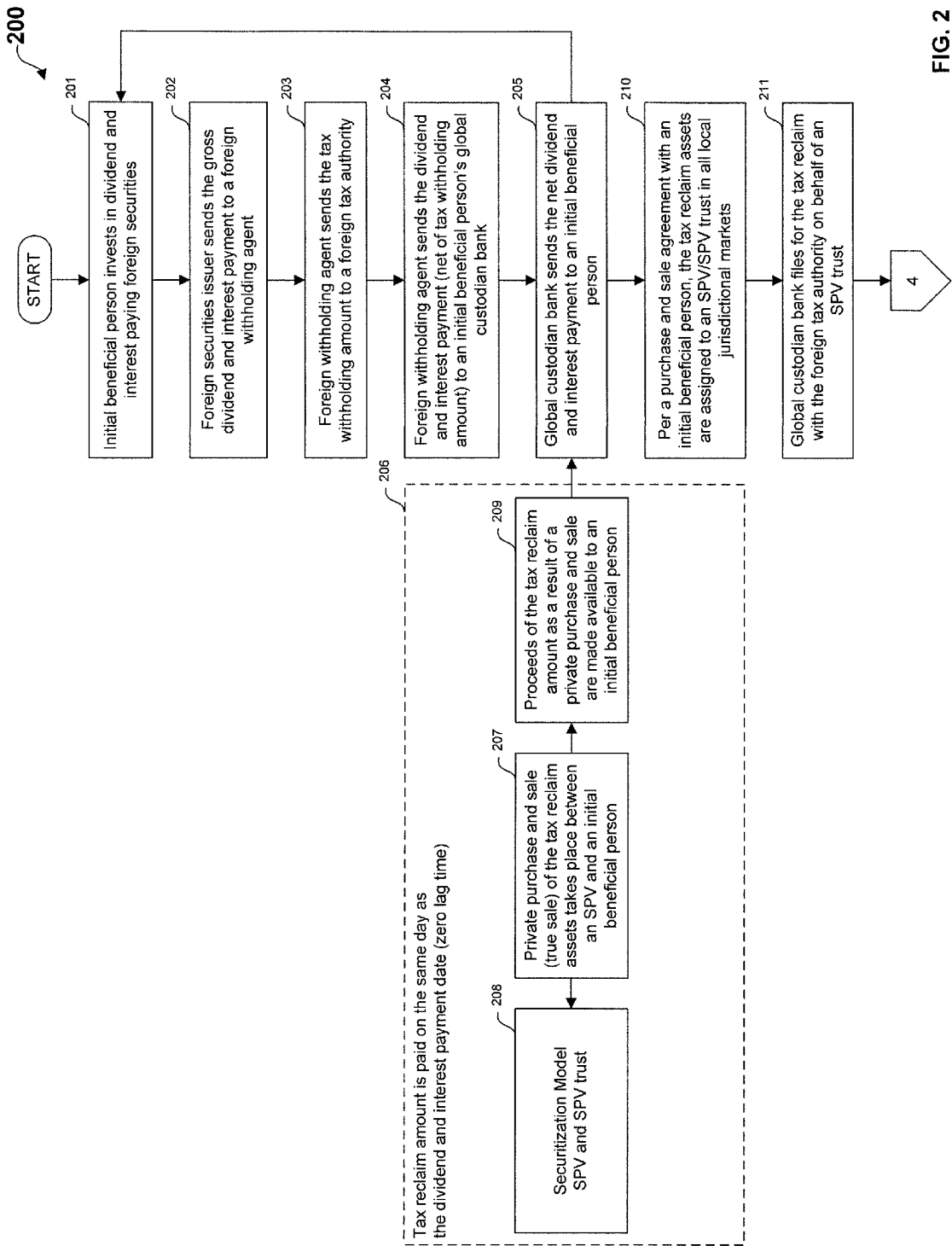
FIG. 2 is an exemplary block diagram of the reclamation process and the advantage of embodiments of the present invention for pooling, securitizing, and trading global dividend and interest tax reclaim assets.

Some embodiments of the system taught here reduce and/or eliminate the lengthy waiting period for the collection of the tax reclaim payment experienced by an initial beneficial person. FIG. 2 illustrates how some embodiments eliminate this lengthy waiting period for an initial beneficial person by pooling, securitizing, and trading global dividend and interest tax reclaim assets. Steps 201-205 represent the dividend and interest payment process, which was discussed previously in steps 101-105, FIG. 1. In accordance with some embodiments, steps 205 and 206-209 occur concurrently in order to provide the tax reclaim payment to an initial beneficial person at the same time the net dividend and interest payment is paid to an initial beneficial person by a global custodian bank. This concurrent payment represents an advantage to an initial beneficial person by eliminating an initial beneficial person's long waiting period to collect the tax reclaim asset.

In step 207, an entity formed for this purpose (typically called a special purpose vehicle, or SPV) and an initial beneficial person enter into a private purchase and sale of the tax reclaim assets. Such a purchase and sale agreement may be a revolving agreement, and may be renegotiated from time to time, e.g., with a rate trigger (i.e. a rate floor and rate cap). A pricing spread associated with a private purchase and sale agreement may be based on a Pricing Model, as detailed in subsequent illustrations. With a purchase of the tax reclaim assets by an SPV, the tax reclaim assets are securitized in step 208, in accordance with some embodiments. Subsequent illustrations cover example intricacies of a Securitization Model's SPV and an SPV trust in more detail. In step 209, an initial beneficial person receives the proceeds of the tax reclaim amount as a result of such a private purchase and sale. This payment to an initial beneficial person may occur as early as upon the dividend and interest payment date, representing minimal-even zero-lag time for an initial beneficial person; and a striking contrast to the 6 month to 7+ year waiting period previously discussed with respect to the prior art tax reclaim process in FIG. 1. In step 210, per a purchase and sale agreement with an initial beneficial person, the tax reclaim assets are assigned to an SPV/SPV trust in a local jurisdictional market. In step 211, a global custodian bank files a claim for the tax reclaim asset with a foreign tax authority, on behalf of an SPV trust.

Figure 3:
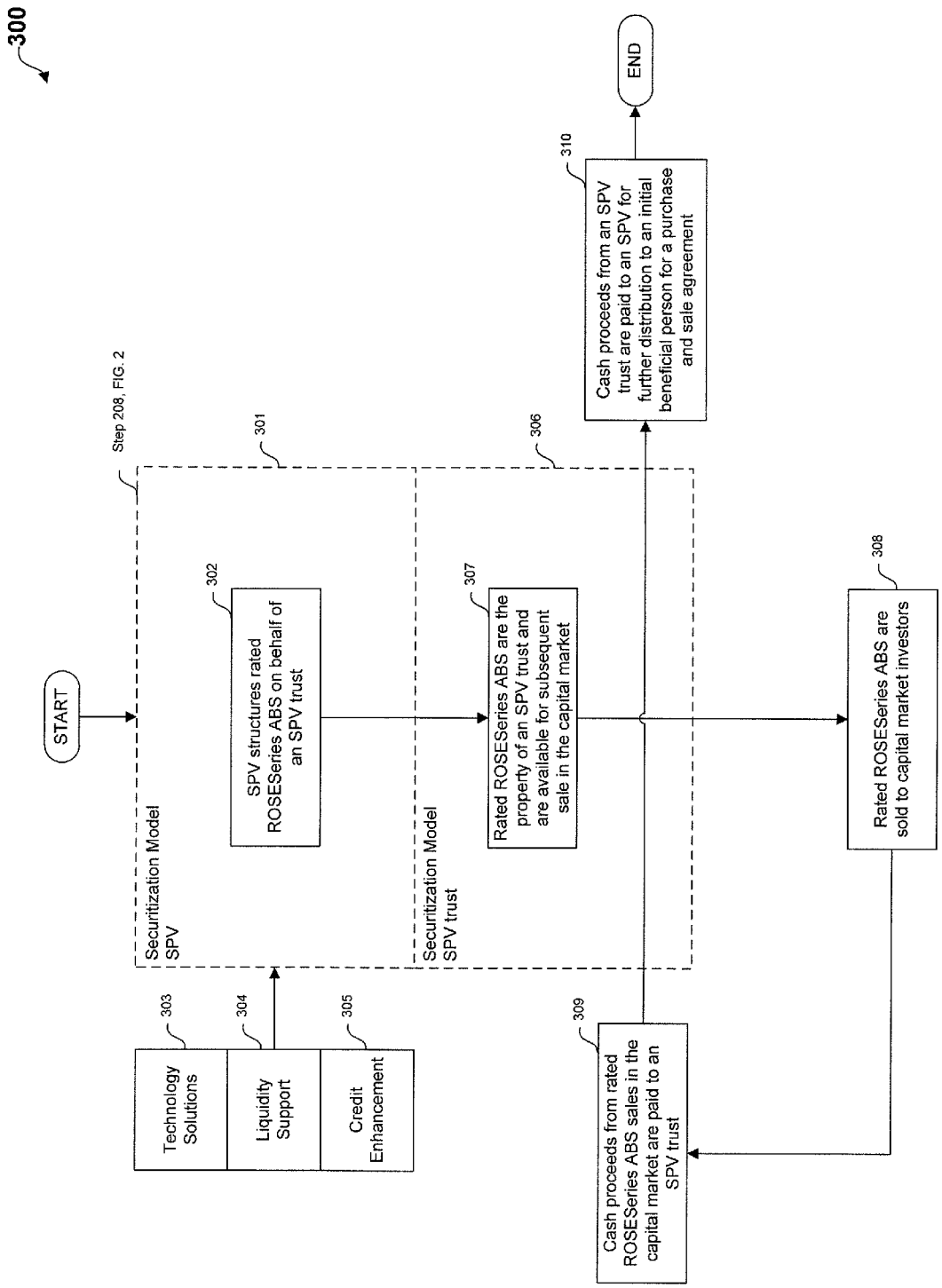
FIG. 3, a continuation of the Securitization Model in step 208.

As mentioned earlier, the details of one example Securitization Model's SPV and SPV trust are illustrated in additional figures. In particular, FIG. 3 illustrates what occurs once securities are structured and ready for sale in the capital markets (step 208, FIG. 2), according to some aspects and embodiments. We refer to these securities by the name ROSESeries ABS (asset backed sercurites).

FIG. 3 illustrates some embodiments of an example Securitization Model's SPV and SPV trust in more detail. Steps 301 and 306 represent an exemplary Securitization Model SPV and SPV trust, respectively, from step 208, FIG. 2. A Securitization Model's SPV may structure rated ROSESeries ABS on behalf of an SPV trust, as noted in step 302. ABS structuring by an SPV may depend on components including, but not limited to, technology solutions (step 303), liquidity support (step 304), and credit enhancement (step 305). These components are discussed in more detail below. An SPV trust, as noted in step 306, may receive structured and rated ROSESeries ABS from an SPV in step 302. Next, an SPV trust's assets in step 307 may be made available for sale in the capital market. Issued ROSESeries ABS may be sold to capital market investors in step 308. The cash proceeds from the sale of ROSESeries ABS in the capital market, as noted in step 309, may then be received by an SPV trust of step 306. Subsequently, in step 310, these cash proceeds may become a source of funds for an SPV to distribute to an initial beneficial person as consideration for a purchase and sale agreement and asset transfer.

Figure 4:
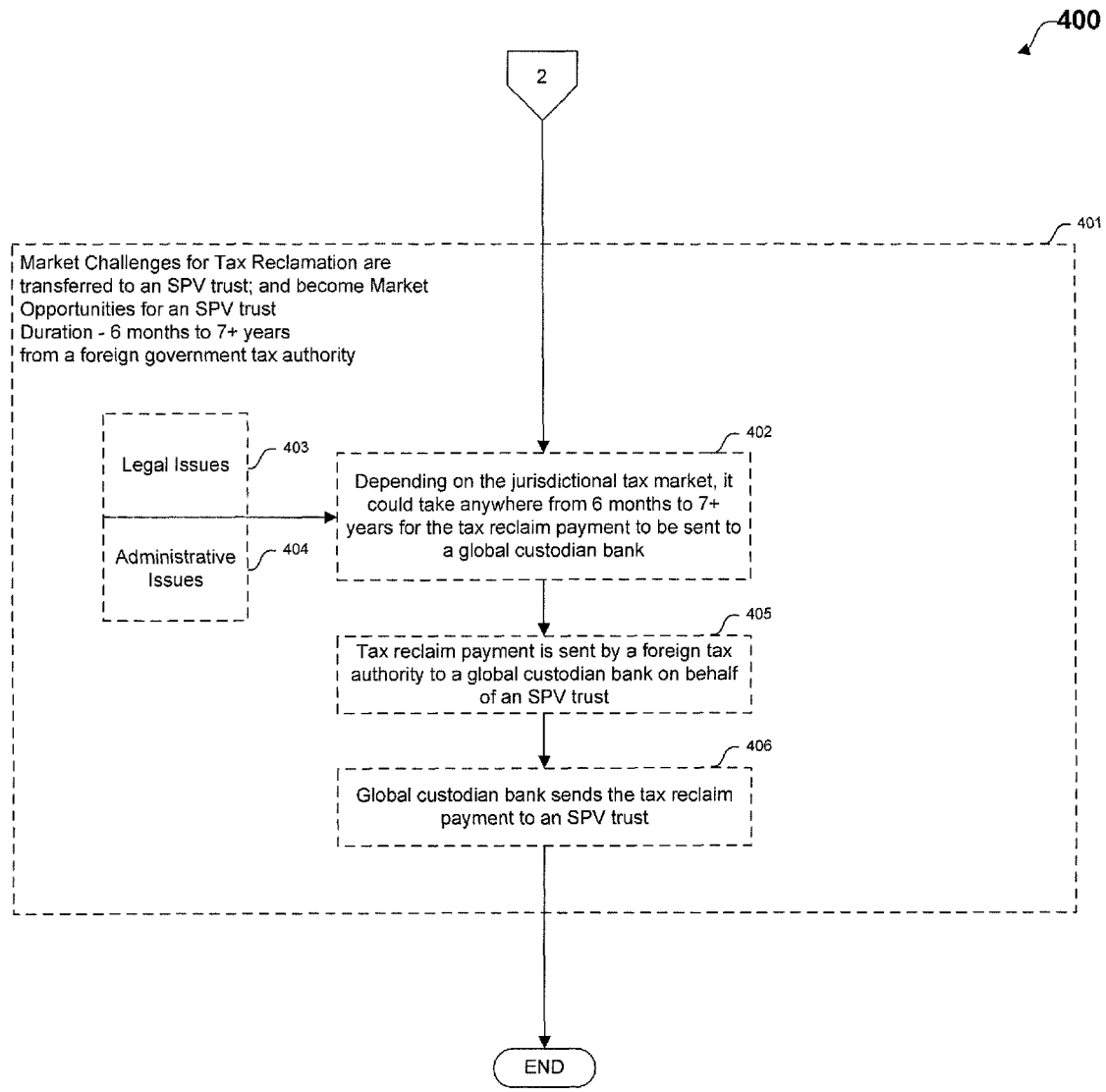
FIG. 4 is an illustrative example of how market challenges for tax reclamation once faced by an initial beneficial person (as noted in step 107, FIG. 1), are transferred to an SPV as a result of some aspects of the present invention.

FIG. 4 represents how market challenges of the tax reclamation process, previously discussed in step 107, FIG. 1, may be transferred to an SPV trust according to some embodiments. The major difference between step 401 and step 107, FIG. 1 is that an initial beneficial person does not have to wait 6 months to 7+ years to collect the tax reclaim payment. Instead, with some embodiments, an initial beneficial person receives the tax reclaim amount as a result of a purchase and sale agreement as early as the dividend and interest payment date. In turn, the market challenges of the tax reclamation process become market opportunities for an SPV trust.

With step 402, legal (step 403) and administrative (step 404) issues for the jurisdictional tax market determine the length of time it takes for a foreign tax authority to make the tax reclaim payment. However, these legal and administrative issues are of no immediate concern to an initial beneficial person that employs the herein-described tax reclamation process due to the assignment of tax reclaim ownership to an SPV trust in all jurisdictional tax markets. In step 405, a foreign tax authority sends the tax reclaim payment to a global custodian bank on behalf of an SPV trust. For step 406, the SPV trust receives the tax reclaim payment.

Process Flow—Technology Solutions Overview

As illustrated in step 303, FIG. 3, technology solutions preferably are employed to support the methods. These computer technology solutions are required to handle the unique complexities of pooling, securitizing, and trading global dividend and interest tax reclaim assets in local markets and in the base market, especially for any entity that would provide them services as a business, conducting numerous tax reclaim projects for multiple clients with multiple assets in multiple jurisdictions, etc. Consequently, this document contains several illustrations and detailed descriptions of exemplary technology solutions.

A relational database management system may be used to facilitate the collection and storage of data records. The exemplary technology solutions and their supporting database models with respect to the method and system of pooling, securitizing, and trading tax reclaim assets are discussed in greater detail below.

Figure 5:
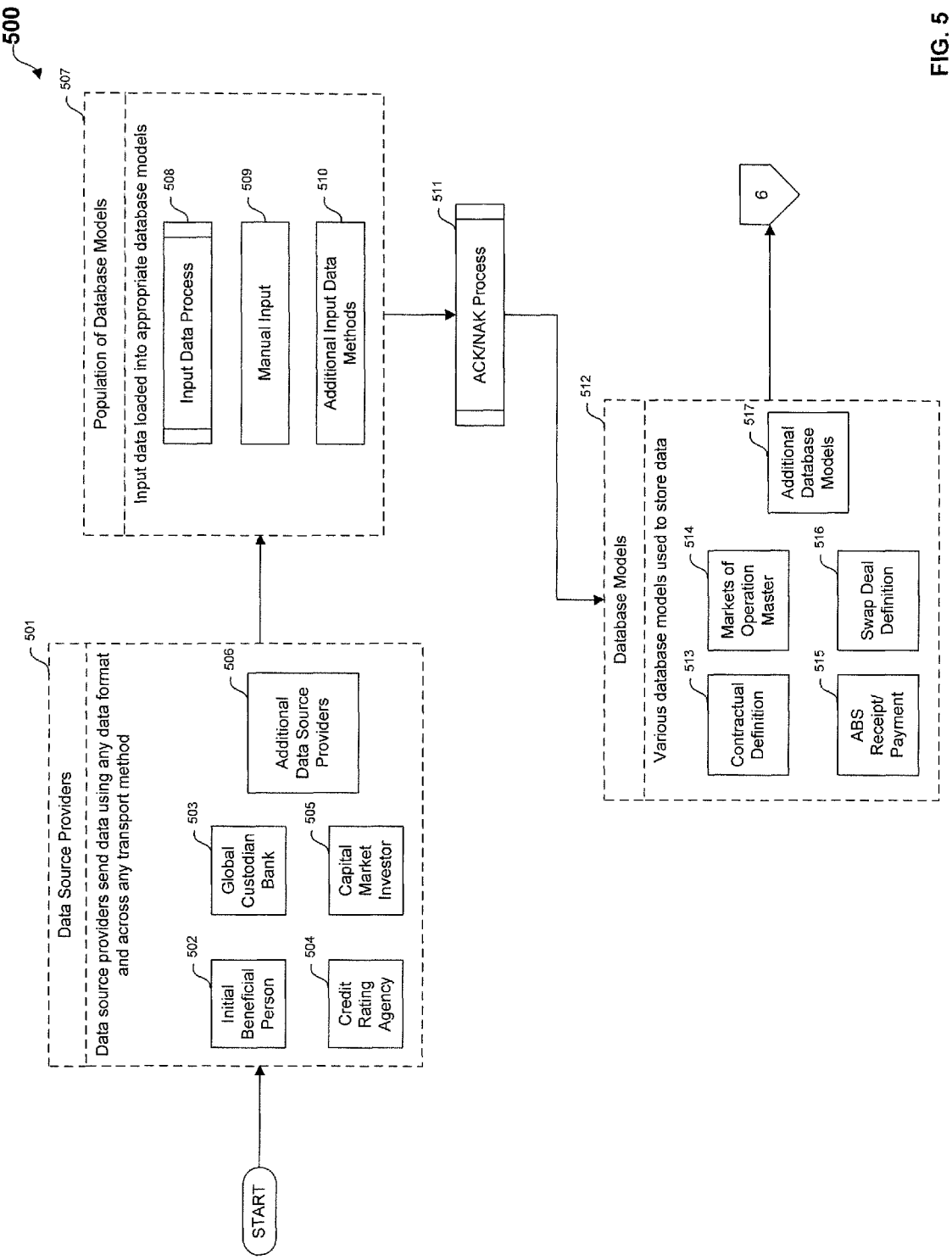
FIG. 5-FIG. 7 are illustrative examples from a high level of the technology solutions that comprise of the system and methodology for pooling, securitizing, and trading global dividend and interest tax reclaim assets in accordance with embodiments.
Figure 6:
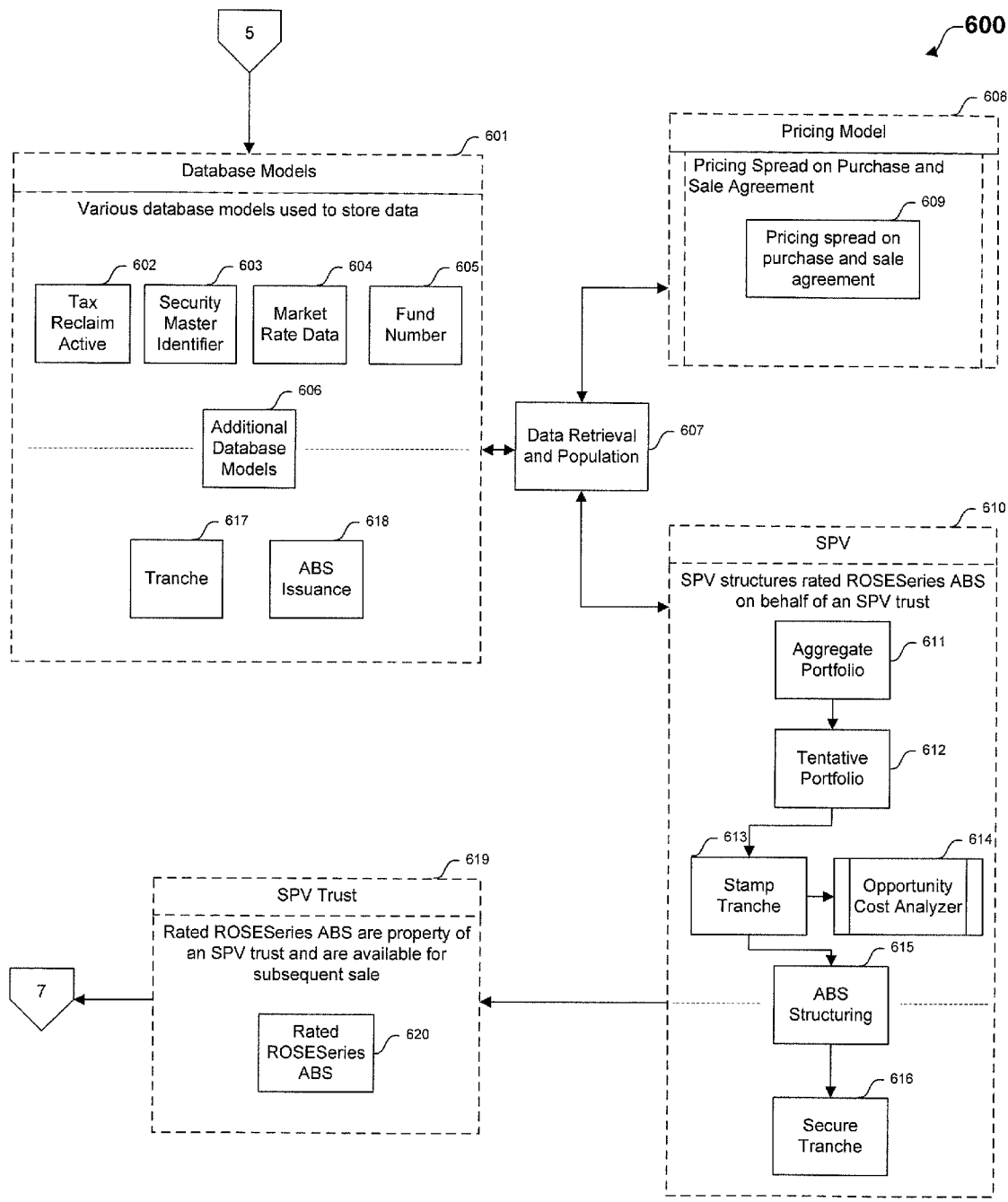
Figure 7:
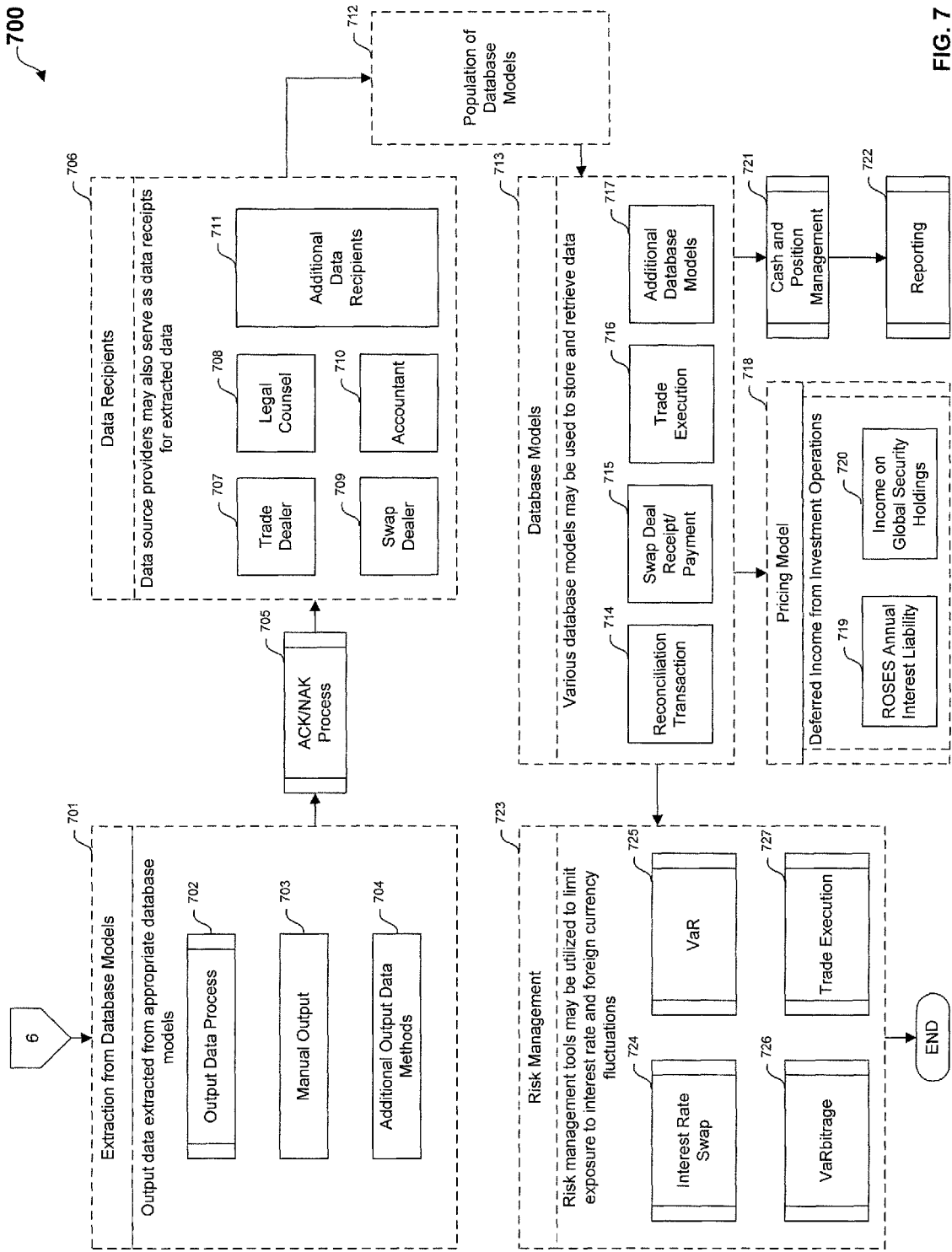

There are a number of exemplary technology solutions that may be used for pooling, securitizing, and trading tax reclaim assets in accordance with some embodiments. The interplay of these exemplary technology solutions not only is efficient, but also reduces redundancy and manages the distinct and complex pooling, securitizing, and trading requirements for global dividend and interest tax reclaim assets. FIG. 5-FIG. 7 are illustrative examples of these technology solutions and how they may work as a unit in accordance with some embodiments.

In step 501, FIG. 5, data source providers send data in support of a claim for tax reclamation. Data source providers may include initial beneficial persons and third-party organizations, such as but not limited to, global custodian banks, capital market investors, and underwriters. Data from data source providers may include, but is not limited to, tax reclaim asset details, market rates (e.g. LIBOR rates, US Treasury rates, etc.), and custody data for cash and position reconciliations. By way of example and not limitation, data from these organizations may be in any data format(s) such as comma-separated value (CSV) file, text (TXT) file, Extensible Markup Language (XML) file, and SWIFT MT message. The data may also be sent across any transport method including, but not limited to, IBM WebSphere MQ, Connect: Direct, Transfer Protocol over Secure Socket Layer (FTP/SSL), and the SWIFT Network. Steps 502-505 are illustrative examples of the types of data source providers that may send data in support of embodiments. These data source providers may include, but are not limited to, an initial beneficial person (step 502); global custodian bank (step 503); credit rating agency (step 504); and capital market investor (step 505). Step 506 represents additional data source providers that may send data in support of some embodiments.

Figure 8:
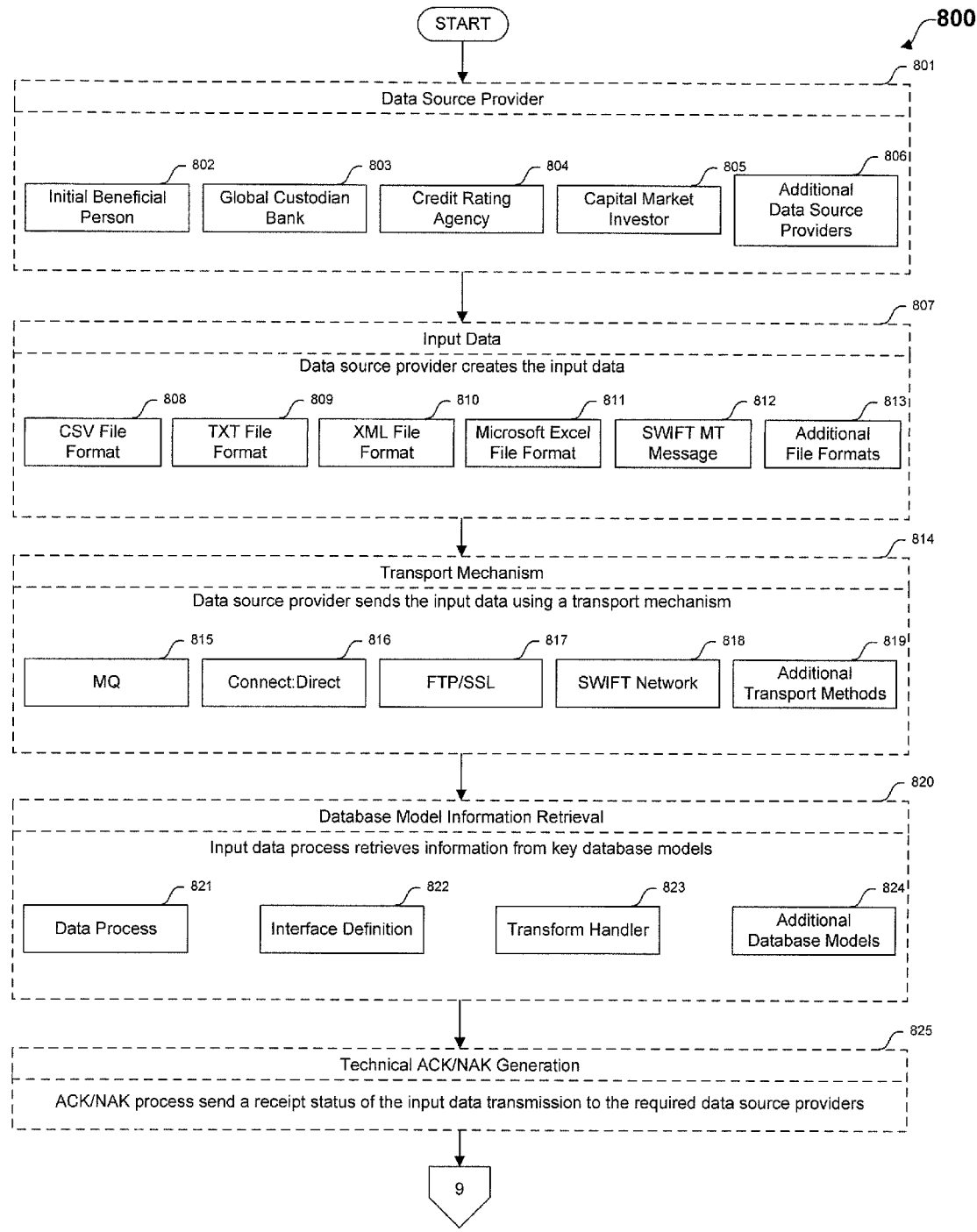
FIG. 8 and FIG. 9 are exemplary flow diagrams that illustrate how an input data process is used to populate database models associated with embodiments.
Figure 9:
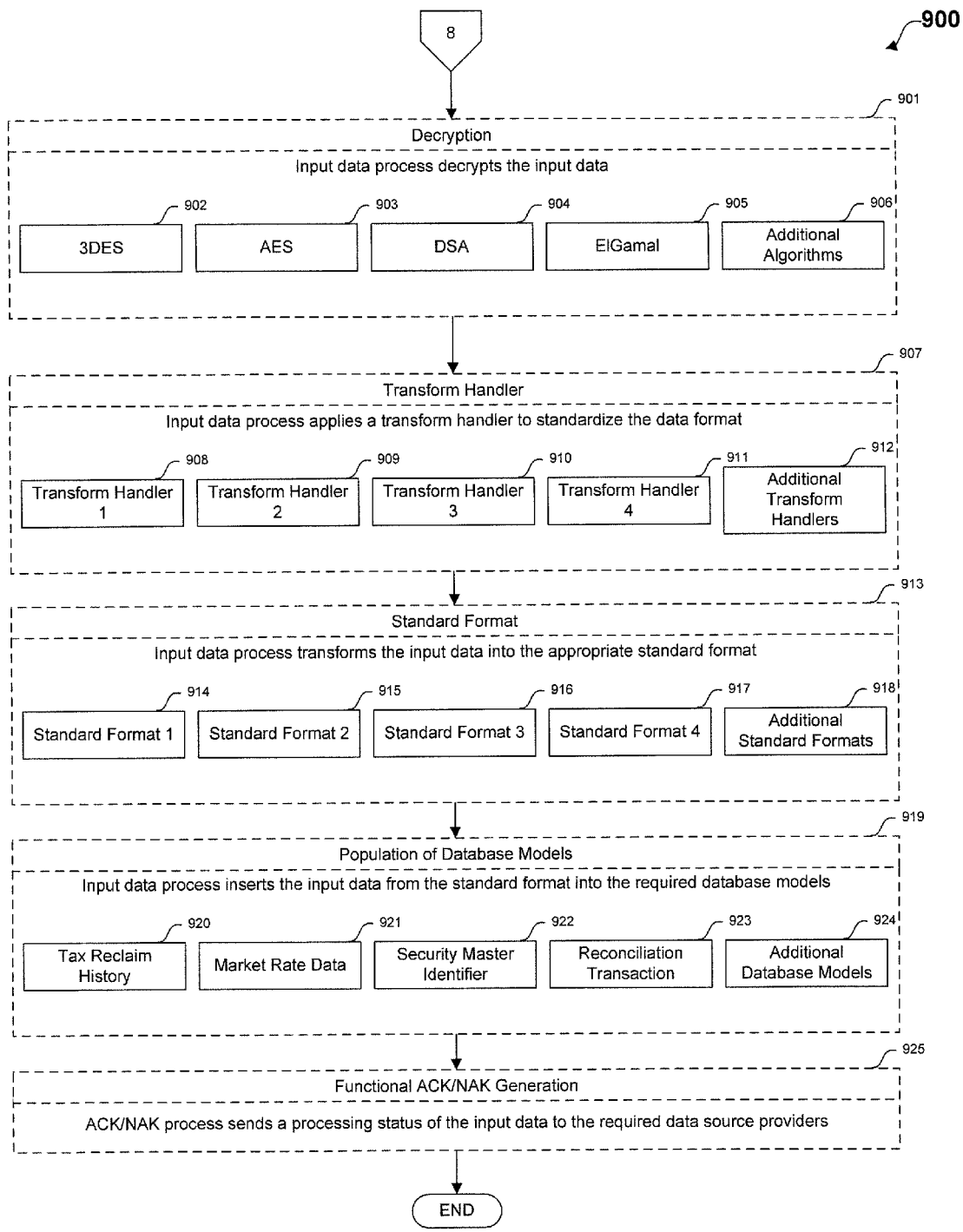

Once the input data is received from a data source provider, as illustrated in step 501, the data may be loaded into appropriate database models. Step 507 illustrates how exemplary database models may be populated. One such method is an input data process, as noted in step 508. For this step, some embodiments of the input data process technology solution may be used to load data into database models automatically. FIG. 8 and FIG. 9 illustrate an input data process in more detail. Another method for populating database models is manual input, as noted in step 509. Step 510 represents additional input data methods that may be used in conjunction with some embodiments.

Once the input data is loaded into the respective database models, an ACK/NAK (i.e., acknowledgement of success/non-acknowledgement of success or notice of failure) technology solution in step 511 may send a processing status of the input data to the required data source providers. By way of example and not limitation, a technical ACK/NAK message may be sent to let the required data source providers know if the input data was received successfully or not. A "functional" ACK/NAK message may also be sent to let the required data source providers know the processing status of the input data.

Numerous database models may be associated with some embodiments. Such database models are designed to store specific sets of data in order to facilitate the system and method of pooling, securitizing, and trading tax reclaim assets. Step 512 is an illustrative example of some of the database models, which may be used to store data. The database models may include, but are not limited to, contractual definition (step 513), markets of operation master (step 514), ABS receipt/payment (step 515), and swap deal definition (step 516). Additional database models may be included, as noted in step 517.

Step 601, FIG. 6, a continuation of step 512, FIG. 5, showcases more database models which may be used to store data in support of some embodiments, such as, but not limited to, a tax reclaim active model 602, security master identifier model 603, market rate data model 604, and fund number model 605. Additional database models 606 also may be utilized. In step 607, pertinent information from database models may be retrieved for, but not limited to, a pricing spread component of a Pricing Model 608. As noted, a pricing spread model 609 may be based on a private purchase and sale agreement of tax reclaim assets between an SPV and an initial beneficial person. Subsequent illustrations detail components of a Pricing Model.

Data retrieval from various database models may also be used for ROSESeries ABS structuring by an SPV (step 610). At a high-level, a structuring process may pool an initial beneficial person's aggregate portfolio of tax reclaim assets (step 611) into a tentative portfolio of tax reclaim assets (step 612). A second pooling occurs from a tentative portfolio to a stamp tranche of tax reclaim assets (step 613). Some embodiments may use different types of tranches to pool tax reclaim assets. Subsequently, an opportunity cost analyzer may use a stamp tranche's assets to compare the effect of inflation on tax reclaim assets to a ROSESeries ABS advantage when an initial beneficial person sells its tax reclaim assets to an SPV (step 614). The term "ROSESeries ABS advantage" may be used to refer to benefits of some embodiments. An opportunity cost analyzer is discussed in more detail in connection with FIG. 13, element 1311. For step 615, pooled tax reclaim assets may be structured into rated ROSESeries ABS and reflect the assets of a secure tranche (step 616).

Throughout an ABS structuring process, information about pooled and securitized tax reclaim assets may be used to populate more database models, as noted in step 607. These database models may include, but are not limited to, tranche model 617 and ABS issuance model 618. In step 619, rated ROSESeries ABS 620, the byproducts of step 610, become the property of an SPV trust and are made available for subsequent sale to capital market investors.

Some embodiments not only receive data to load into database models, but also extract data from database models to send information to the required data recipients. Data recipients may include, but are not limited to initial beneficial persons, global custodian banks, legal counsels, and accountants Step 701, FIG. 7 is an illustrative example of how data may be extracted from appropriate database models. There are multiple methods for extracting data that may include, but are not limited to, an output data process technology solution (step 702) and manual output (step 703). An output data process technology solution is illustrated in more detail in FIG. 20 and FIG. 21. Step 704 represents additional output data methods that may be used in conjunction with some embodiments. Step 705 illustrates how technical and functional ACK/NAK processing messages may be sent to the required third-party organizations to report a processing status of the outbound data.

Output data may be of any file format and may be sent through any suitable transport method. Once the output data is prepared, it may be sent to the required third-party organizations, as noted in step 706. By way of example and not limitation, such third-party organizations may include a trade dealer (707), legal counsel (708), swap dealer (709), and accountant (710). Additional third-party organizations may also receive output data, as noted in step 711.

Data source providers and data recipients typically will be constantly (i.e., frequently) sending and receiving data, respectively, in order to communicate information. Alternative, step 712, shows how data source providers may send input data for population into various database models. The database models which may be populated, as noted in step 713, may include but are not limited to, reconciliation transaction (714), swap deal receipt/payment (715), trade execution (716), and any additional database models (717).

For some embodiments, data from database models may be retrieved for a Pricing Model (step 718), a cash and position management technology solution (step 721) and risk management tools (step 723). A Pricing Model may include, but is not limited to a deferred income from investment operations component, which may calculate ROSES' annual interest liability (step 719) and income on global security holdings (step 720). A technology solution illustrated in step 721 may be used to reconcile cash and position transactions between accounting records and custody records. An exemplary cash and position management technology solution is illustrated in more detail in FIG. 22. Data may also be retrieved from database models for a reporting technology solution (step 722) which may be used to generate reports for third-party organizations. An exemplary reporting technology solution is illustrated in more detail in FIG. 23.

Some embodiments may include several risk management tools in order to mitigate risk. These tools may include an interest rate swap technology solution (step 724; illustrated in more detail in FIGS. 24 and 25) to limit exposure to interest rate fluctuations; VaR technology solution (step 725; illustrated in more detail in FIGS. 26 and 27) to determine market exposure to foreign currency fluctuations; and VaRbitrage technology solution (step 726; illustrated in more detail in FIGS. 28 and 29) to identify arbitrage opportunities based on VaR calculations. A trade execution technology solution (step 727; illustrated in more detail in FIG. 30) may be used to execute trades based on trade decisions made in accordance with some embodiments.

Process Flow—Input Data Process and Population of Database Models

As noted above, several database models may play an integral part in the method and system of pooling, securitizing, and trading tax reclaim assets in accordance with some embodiments. To populate various database models associated with some embodiments, a specialized input data process has been designed to address data loading requirements. This example input data process is dynamic enough to process all input data types and file formats that may be used in conjunction with a variety of embodiment. An exemplary input data process is also flexible to receive these varied input types from a multitude of organizations that serve as data source providers. Data source providers may include initial beneficial persons and third-party organizations, such as but not limited to, global custodian banks, capital market investors, and underwriters. In addition, input data may come from these varied data source providers over several transport mechanisms. Some embodiments also may have the functionality to process input data in multiple languages, including but not limited to English, German, Spanish, French, and Italian. Depending on the number of input files, some embodiments may allow multiple instances (commonly referred to as multitasking) of an input data process to run at the same time. In addition, utilization of multithreading capability in connection with exemplary input data processes allows for optimized data loading. FIG. 8 and FIG. 9 illustrate an exemplary input data process in more detail.

The trigger for an input data process may be a data source provider, as noted in step 801, FIG. 8. Various data source providers may send data in conjunction with some embodiments. Such organizations may include, but are not limited to, an initial beneficial person (802), global custodian bank (803), credit rating agency (804), capital market investor (805), and any additional data source providers (806).

In step 807, a data source provider may create input data. Input data may be of any data file format including, but not limited to CSV file (808), TXT file (809), XML file (810), and Microsoft Excel document (811). An input data process also accepts SWIFT MTx messages (812), such as, but not limited to, MT450 cash letter credit advice, MT535 statement of holdings, and MT940 customer statement. Additional file formats (813) may be accepted in accordance with some embodiments of the present invention. Contents of an input data file may vary, depending on a data source provider who sent the input data. By way of example and not limitation, input data may contain tax reclaim data from an initial beneficial person or a global custodian bank representing an initial beneficial person; rates from a market vendor including libor rates and foreign exchange rates; and investment ratings from a credit rating agency.

A data source provider may send input data across any transport mechanism, as noted in step 814. Eligible transport mechanisms may include, but are not limited to, IBM WebSphere MQ (815), Connect:Direct (816), FTP/SSL (817), SWIFT Network (818), and any additional transport methods (819).

Once input data has been received by an input data process through a transport mechanism step 814, an input data process may query several key database models in order to know how the input data may be processed. Step 820 illustrates a database model information retrieval function. In step 821, information may be retrieved from a data process database model. In step 822, an interface definition database model may be queried; and in step 823, a transform handler database model may be queried for subsequent use in accordance with some embodiments. Step 824 illustrates how additional database models, beyond the three in steps 821-823, may be included in a database model information retrieval function. Database models, may be queried in step 820, contain pertinent reference information regarding input data—this may include, but is not limited to, the name of a data source provider responsible for sending input data, the type of data contained in the file, and which transport mechanism may be used to send the input data. Subsequent drawings detail some of the database models included in step 820.

Figure 10:
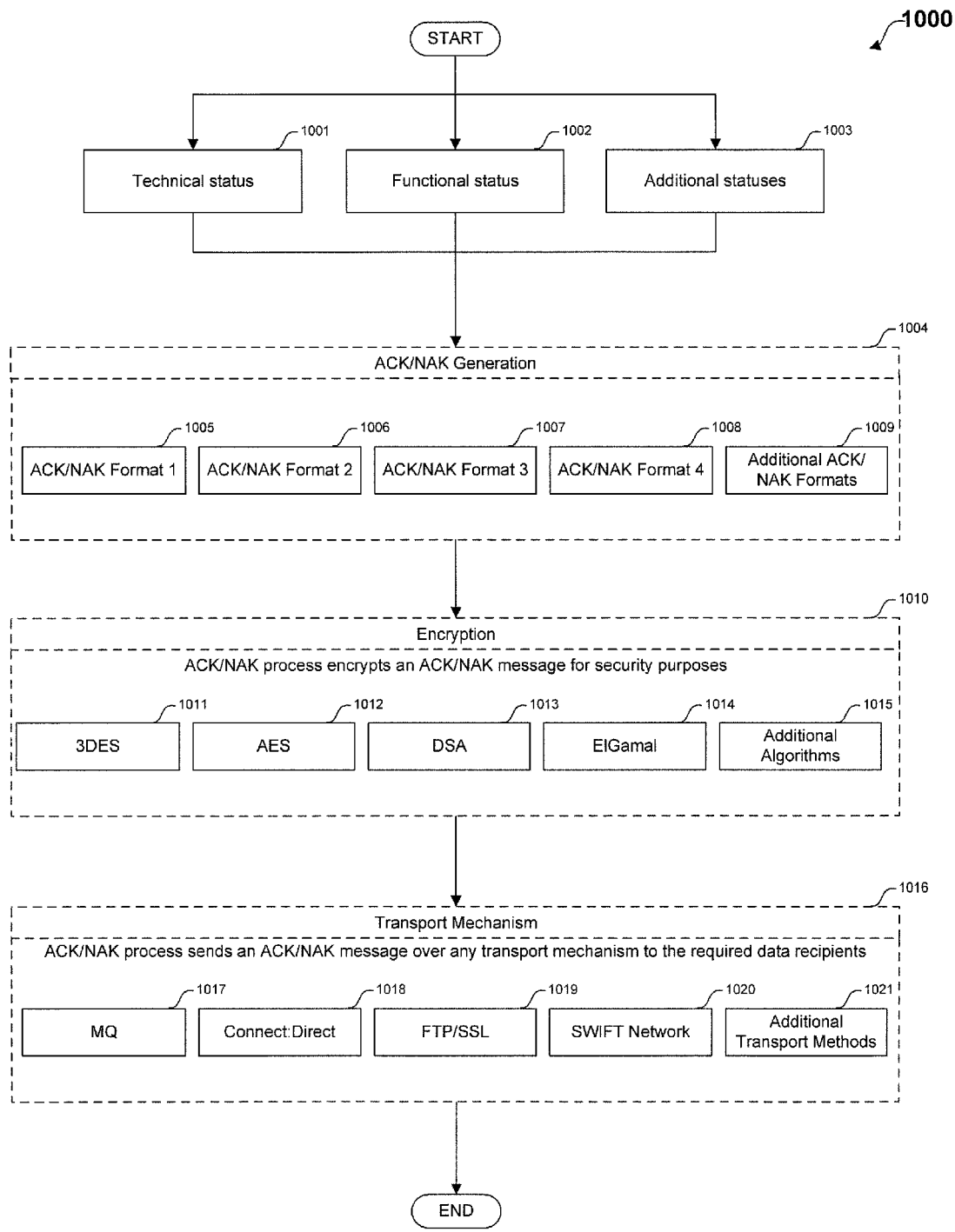
FIG. 10 is an exemplary block diagram that illustrates how an acknowledgement (ACK)/negative acknowledgement (NAK) process used by embodiments of the present invention as a technology solution to report the status of input and output data to third-party organizations.

In step 825, a technical ACK/NAK message may be sent to a data source provider to report a receipt status of input data. This step lets a data source provider from step 801 know if input data was successfully or unsuccessfully received. If the latter scenario occurs, it means an input data process encountered corrupt input data and a technical NAK message may be sent back to the respective data source provider to report this status. Otherwise, an input data process proceeds to generate a technical ACK message and subsequently process the input file in step 901, FIG. 9. FIG. 10 illustrates an exemplary ACK/NAK process in detail.

For security, input data may be encrypted by a data source provider in order to safeguard confidential data and to guarantee data integrity during transport over various transport mechanisms. Accordingly, step 901, FIG. 9 applies an algorithm to decrypt the data and to make it available to subsequent steps involved in an input data process. Some embodiments accommodate numerous file encryption technologies including, but not limited to, symmetric file encryptions such as Triple Data Encryption Standard (3DES), Advanced Encryption Standard (AES), International Data Encryption Algorithm (IDEA), and RC6 Block Cipher; and asymmetric file encryptions and signings such as Digital Signature Algorithm (DSA), ElGamal, and RSA. As noted in step 901, an input data process may use encryption algorithms including 3DES (902), AES (903), DSA (904), ElGamal (905), and any additional encryption algorithms (906) to decrypt the input data, in accordance with some embodiments of the present invention.

An input data process continues with a transform handler in step 907. During this step, a specific transform handler may be applied to transform the input data into a standard data format, which may be loaded into database models. Since there is flexibility for input data types and formats, each transform handler is developed for the specific and unique requirements of each input data type and format combination, which may manifest in light of multiple data source providers. Steps 908-911 illustrate how various types of transform handlers may be utilized to process input data. Step 912 represents additional transform handlers that may be created in accordance with some embodiments.

In step 913, input data may be transformed into the appropriate standard format. Just as there may be multiple transform handlers, may be multiple standard formats for input data to correspond to various database models and to expedite data loading. Steps 914-917 represent multiple standard formats that may be used. Step 918 represents additional standard formats that may be utilized by an input data process for subsequent population of database models in step 919.

Once an input data is in a standard data format, an input data process inserts the data into the required database models, as noted in step 919. For step 919, the database models may include, but are not limited to, tax reclaim history (step 920), market rate data (step 921), security master identifier (step 922), and reconciliation transaction (step 923). Step 924 represents additional database models that comprise some embodiments.

Input data may be stored in its original language character format within a database model with an optional language identifier to denote which language the input data represents. This language identifier may be used by some embodiments where a data source provider chooses to send data in a language that is not default for some embodiments.

After input data is loaded into the required database models, an input data process may conclude by sending a functional ACK/NAK message in step 925 to report a processing status of input data to the required data source providers. The creation of technical and functional ACK/NAKs is illustrated in more detail in FIG. 10.

ACK/NAK messages may be used by various exemplary technology solutions to communicate technical and functional statuses of inbound and outbound data to data source providers and recipients. Such statuses may include, but are not limited to, a receipt status of input data and a sending status of output data. Step 1001, FIG. 10 covers possible technical statuses; step 1002 covers various functional statuses; and step 1003 represents additional statuses in accordance with some embodiments.

Step 1004 produces an ACK/NAK message. Blocks 1005-1008 represent various ACK/NAK formats that are handled by an ACK/NAK process, including additional ACK/NAK formats in accordance with some embodiments. An ACK/NAK process supports several ACK/NAK message formats in order to accommodate the unique requirements of each data source provider. Block 1009 represents additional ACK/NAK formats that may be supported by some embodiments of the present invention.

An ACK/NAK message may be encrypted to meet the security requirements of a data recipient. Step 1010 may represent the encryption of an ACK/NAK message using various encryption algorithms including, but not restricted to, 3DES (1011), AES (1012), DSA (1013), and ElGamal (1014). Additional encryption algorithms (1015) may be incorporated, in accordance with some aspects.

In step 1016, an ACK/NAK message may be sent to the required data recipients. An ACK/NAK process may send a message through various transport mechanisms including, but not limited to, MQ (1017), Connect:Direct (1018), FTP/SSL (1019), the SWIFT Network (1020), and any other additional transport methods (1021) as noted by a data source provider's requirements and in accordance with some embodiments.

Process Flow—Statistical Analysis of Historical Tax Reclaim Assets

To calculate the statistical predictability of cash flows associated with tax reclaim assets for an initial beneficial person, historical tax reclaim assets are evaluated by two establishments—credit rating agencies and the system and methodology outlined in some embodiments of the present invention. With some embodiments of the present invention, all of an initial beneficial person's historical tax reclaim assets, regardless of the assets' reclamation statuses, are sent. Some embodiments of the present invention may require this historical information to understand the risk profile of an initial beneficial person's tax reclamation activity and to assign a risk level to the probability of receiving tax reclaims from foreign governments.

Figure 11:
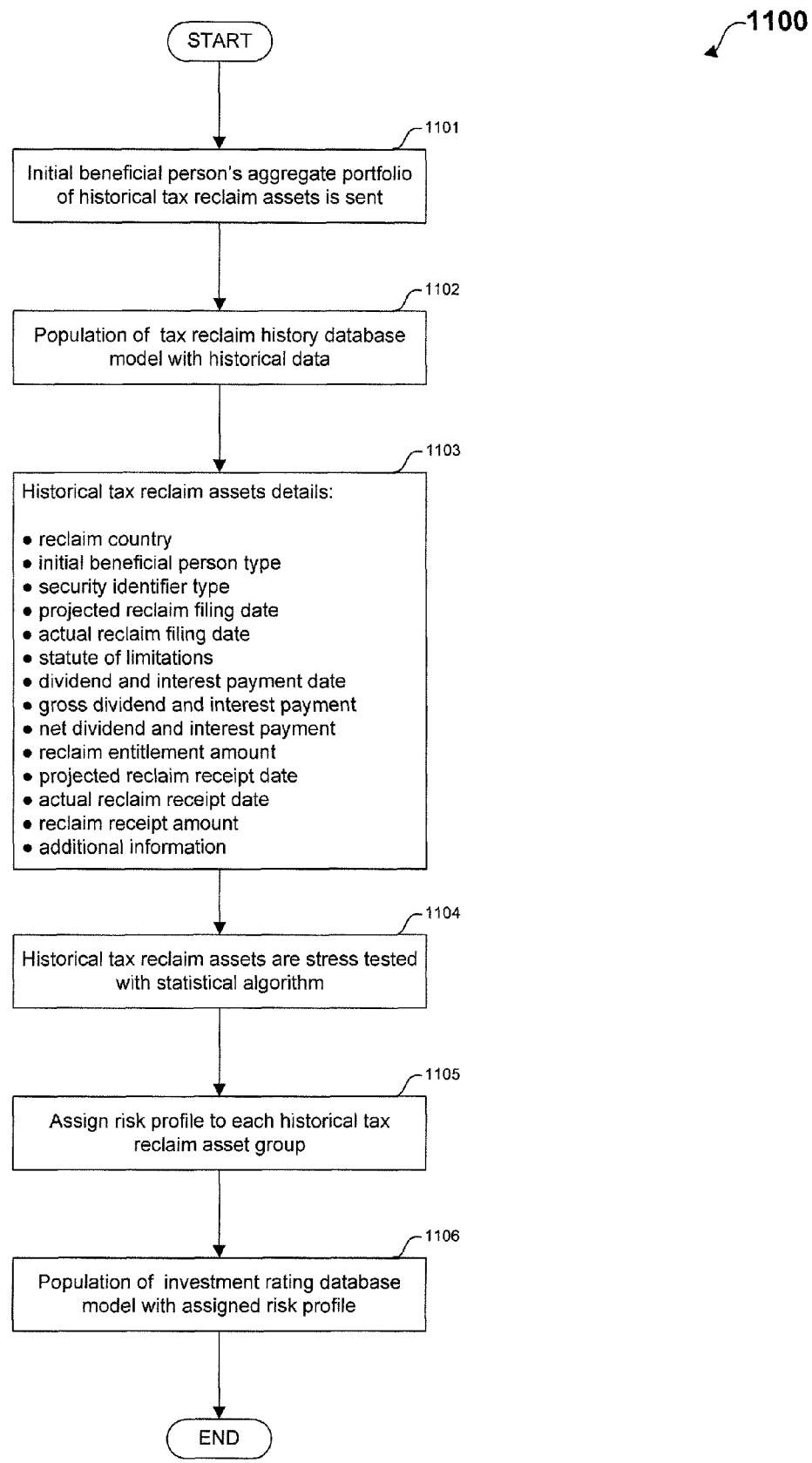
FIG. 11 is a block diagram illustrating an exemplary statistical analysis, which may be applied to an initial beneficial person's historical tax reclaim assets in order to understand the risk profile of an initial beneficial person's tax reclamation activity, according to some embodiments of the present invention.

FIG. 11 illustrates how historical tax reclaim assets may be evaluated in accordance with some embodiments. First, in step 1101, an initial beneficial person's aggregate portfolio of historical tax reclaim assets is sent by a data source provider. This data source provider may include, but is not limited to, an initial beneficial person or a global custodian bank representing an initial beneficial person. This aggregate data may be used to populate a tax reclaim history database model (4003, FIG. 40) in step 1102. Next, in step 1103, particular attributes of the historical tax reclaim assets may be used for subsequent statistical analysis and risk profiling. These attributes may include, but are not limited to, reclaim country; initial beneficial person type; security identifier type; projected reclaim filing date; actual reclaim filing date; statute of limitations; dividend and interest payment date; gross dividend and interest payment; net dividend and interest payment; reclaim entitlement amount; projected reclaim receipt date; actual reclaim receipt date; reclaim receipt amount; and any other additional information.

In step 1104 historical tax reclaim assets may be stress tested with a statistical algorithm (e.g. sample variance version 2, standard deviation, coefficient of variation, etc.) to determine reclaim historical volatility. The risk profile for each distinct tax reclaim asset group is assigned in step 1105. Calculated risk profiles may be used to populate an investment rating database model (4301, FIG. 43) in step 1106.

Process Flow—Selection of Tax Reclaims from Aggregate Portfolio to Tentative Portfolio For some embodiments, there may be three pooling phases for global dividend and interest tax reclaim assets. These three pooling phases may be required to ensure the tax reclaim assets are thoroughly evaluated and the resulting structured ROSESeries ABS obtain the highest investment grade qualifications.

Figure 12:
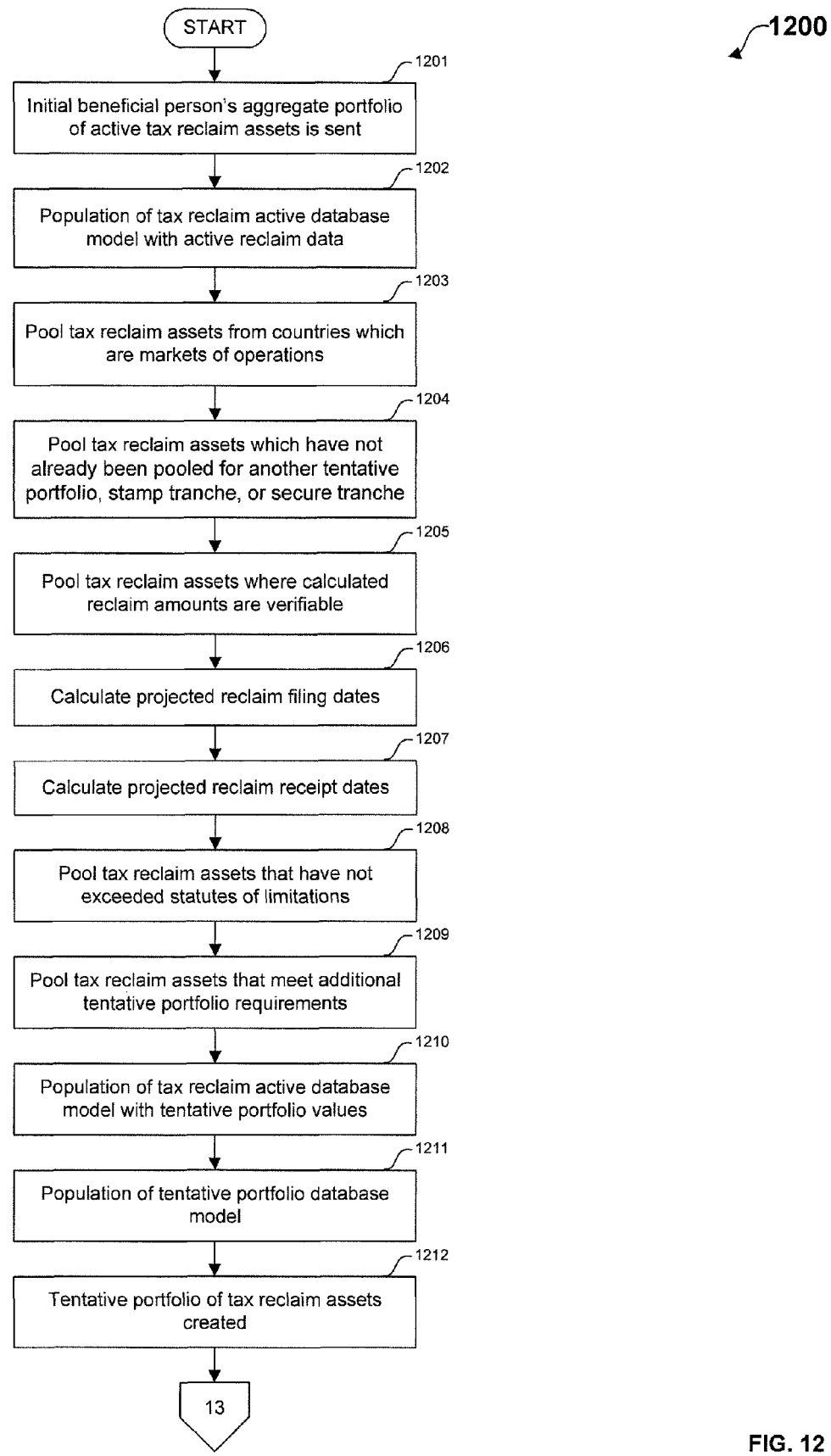
FIG. 12 is an exemplary block diagram that illustrates the process of selecting global dividend and interest tax reclaim assets from an initial beneficial person's aggregate portfolio to create a tentative portfolio of tax reclaims for subsequent securitization in accordance with embodiments of the present invention.
Figure 13:
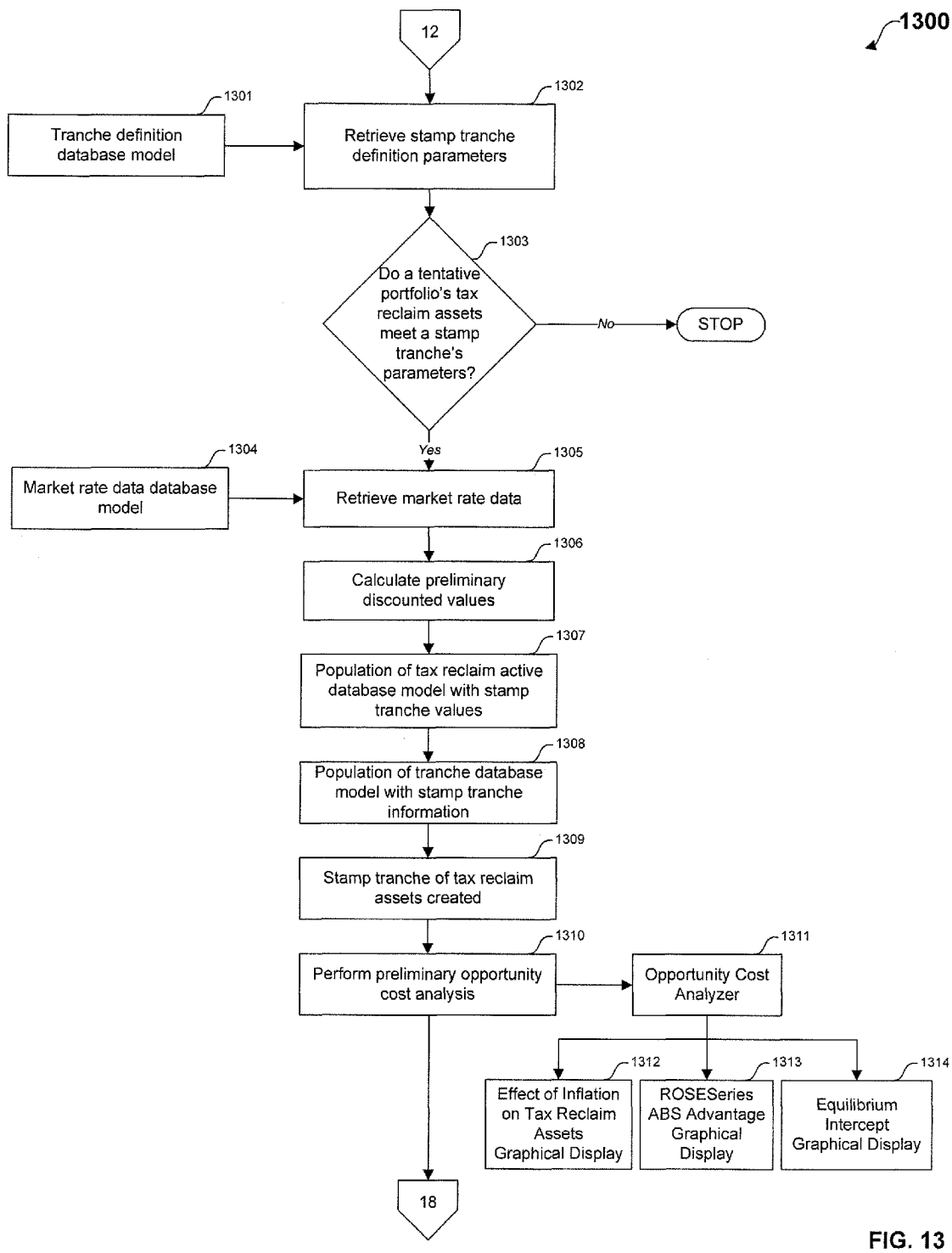
FIG. 13 is an exemplary block diagram that illustrates the process of selecting global dividend and interest tax reclaims from an initial beneficial person's tentative portfolio based on a stamp tranche parameters, according to some embodiments of the present invention. These parameters pool tax reclaim assets in order to formulate a stamp tranche of tax reclaim assets and to calculate preliminary discounted values associated with the potential investment ratings for tax reclaim assets.
Figure 14:
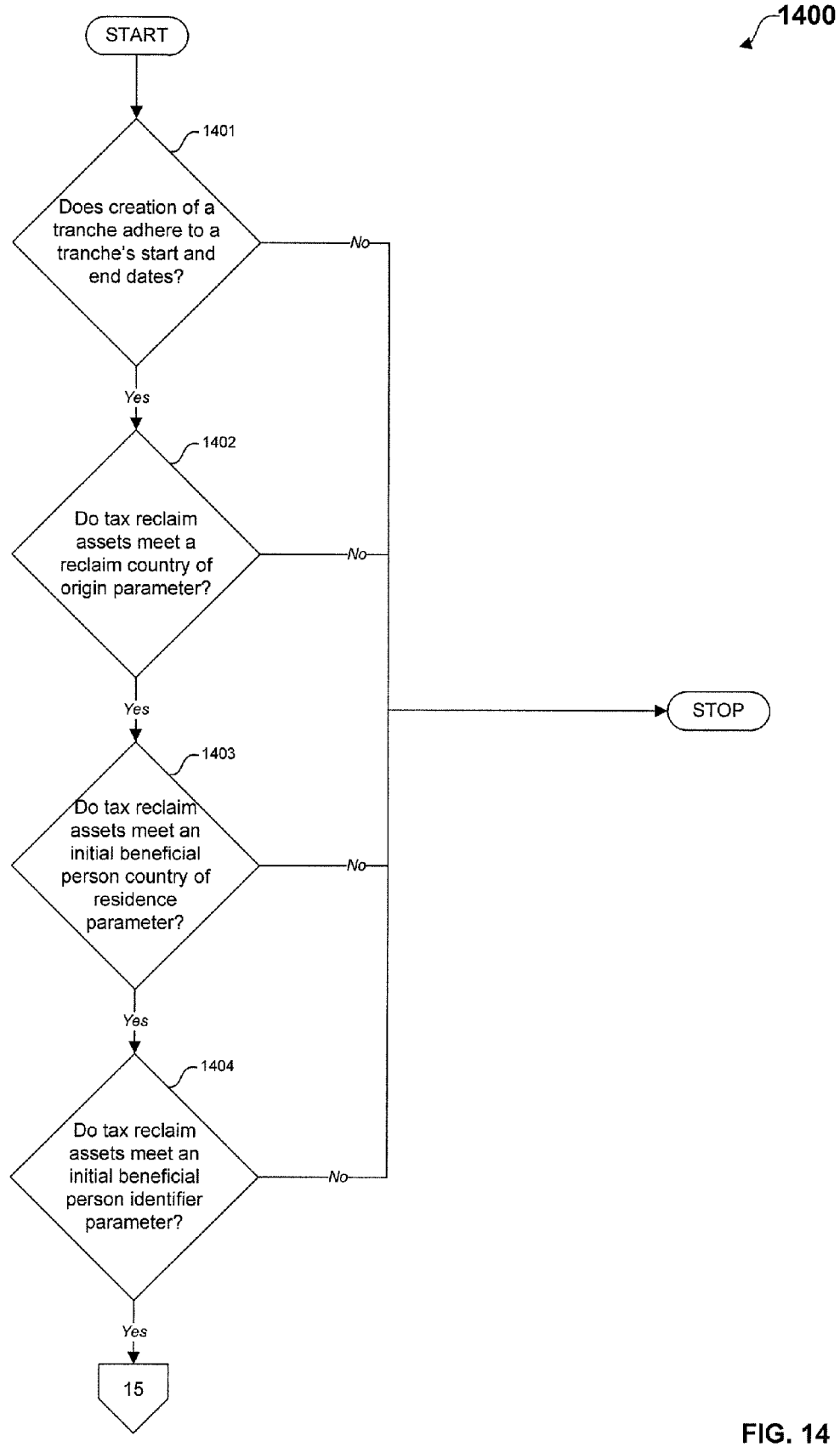
FIG. 14-FIG. 17 are exemplary block diagrams illustrating tranche checks for tax reclaim assets utilized by a stamp tranche process (FIG. 13) and a secure tranche process (FIG. 18 and FIG. 19), according to some embodiments of the present invention.
Figure 18:
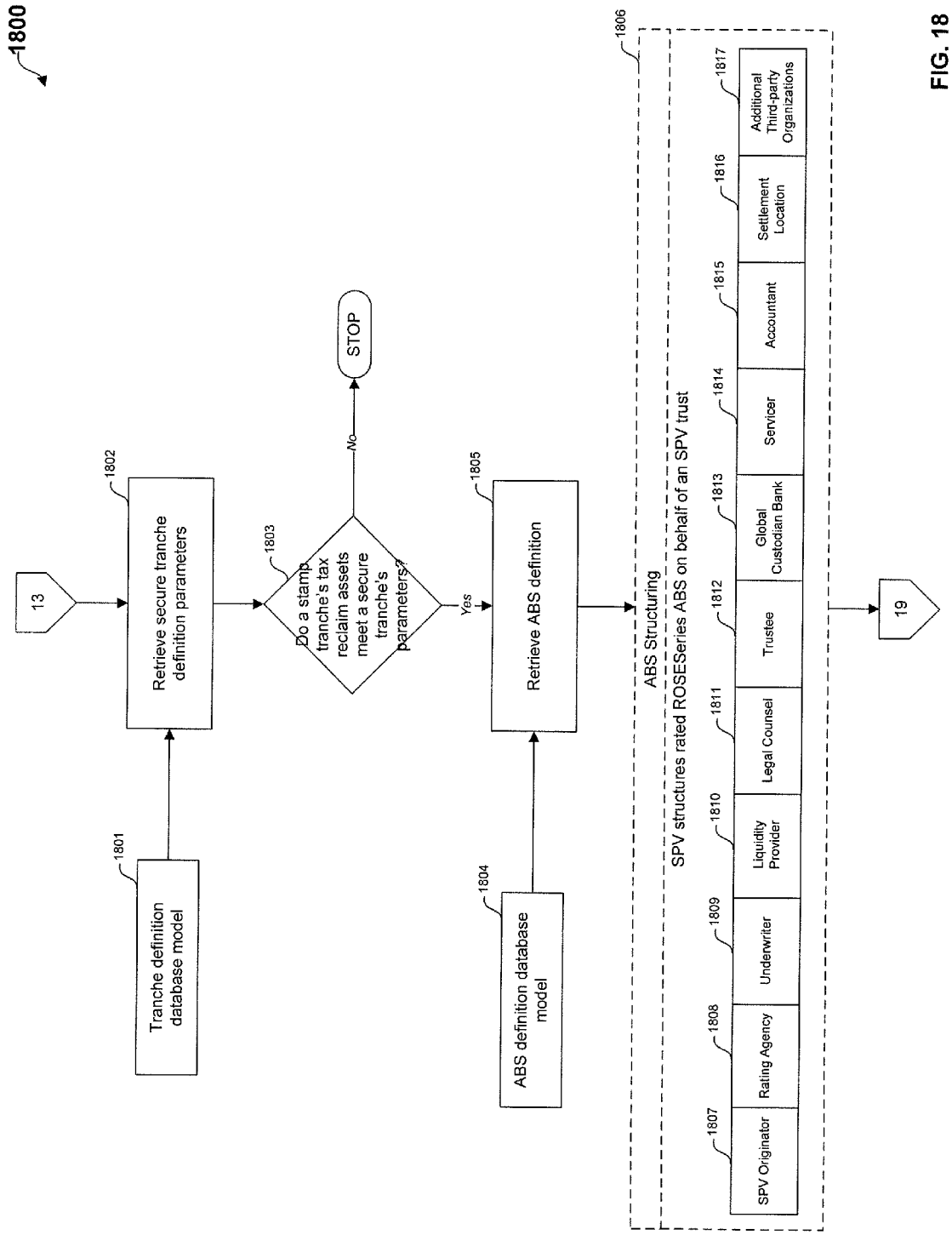
FIG. 18 and FIG. 19 are exemplary block diagrams that illustrate how, according to some embodiments of the present invention, ROSESeries ABS may be structured from a stamp tranche to a secure tranche of tax reclaim assets.
Figure 19:
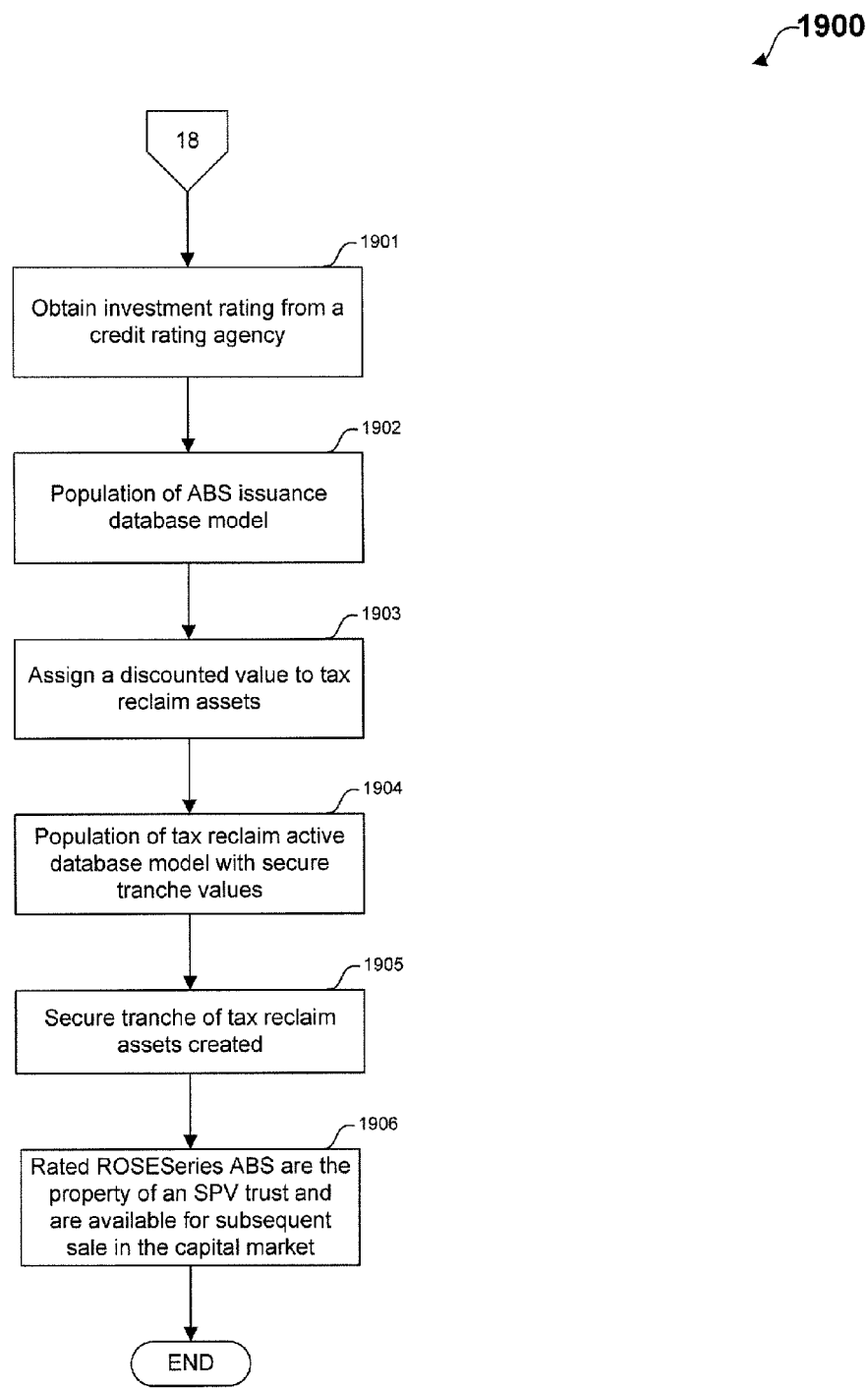

An initial pooling phase, as illustrated in FIG. 12, may pool tax reclaim assets from an initial beneficial person's aggregate portfolio to a tentative portfolio. An aggregate portfolio may simply represent the original tax reclaim assets received from a data source provider. A tentative portfolio, on the other hand, may take a discriminatory look at aggregate tax reclaim assets. Such an evaluation may include, but is not limited to, confirmed markets of operation for securitization, unique tax reclaim assets (to avoid duplicate data), and verifiable calculated reclaim amounts. In a second pooling phase, selected tax reclaim assets from a tentative portfolio may be pooled into a stamp tranche, as illustrated in FIG. 13. A stamp tranche may evaluate tax reclaim assets against an assigned risk profile from FIG. 11 in order to understand preliminary discounted values for assets. For a third pooling phase, as illustrated in FIG. 18 and FIG. 19, a secure tranche may be created after pooling selected tax reclaim assets from a stamp tranche. This final pooling phase may represent tax reclaim assets that are securitized into ROSESeries ABS during ABS structuring.

Throughout various pooling phases, multiple database models may be populated to record pooled values. One such database model may be tax reclaim active, which is illustrated in 4101, FIG. 41. In fact, this database model may be populated multiple times throughout various pooling phases. Since a tax reclaim active database model stores original tax reclaim asset information from a data source provider, the same database model may be updated with additional information to record calculated/verified values and changed statuses as assets traverse through multiple pooling phases.

An initial pooling process may begin with step 1201, FIG. 12 when a data source provider sends an initial beneficial person's aggregate portfolio of tax reclaim assets. Next in step 1202, a tax reclaim active database model may be populated with active tax reclaim assets.

Steps 1203-1212 cover an exemplary pooling process of an aggregate portfolio into a tentative portfolio. In step 1203, reclaim countries that are markets of operations may be pooled from an aggregate portfolio. As noted, some embodiments of the present invention cover the pooling, securitization, and trading of tax reclaim assets in all local markets. While some embodiments may process tax reclaims from all local markets, certain reclaim markets may be identified as candidates for securitization, because of their known and accepted risk profiles, as calculated in FIG. 11.

For step 1204, tax reclaim assets that have not already been pooled for another tentative portfolio, stamp tranche, or secure tranche are identified to avoid multiple securitizations of a single tax reclaim asset. Step 1205 checks to make sure calculated reclaim amounts for tax reclaims from a data source provider are verifiable when recalculated. To do this, some embodiments of the present invention use information from database models such as, but not limited to a statute of limitations (4503, FIG. 45) and tax reclaim treaty rates (4504-4506, FIG. 45). If calculated reclaim values do not match the reclaim amounts received by a data source provider, the tax reclaim assets may no longer be considered for pooling at this time, but may be included in future pools upon review.

In step 1206, projected reclaim filing dates may be calculated for tax reclaims which have not been filed by an initial beneficial person's global custodian. Some embodiments may accept tax reclaim data of varying reclaim filing statuses, included but not limited to, non-filed and filed. Key aspects for accepting varying reclaim filing statues may include, but are not restricted to, a purchase and sale agreement; and statute of limitations dates as denoted in double taxation treaties. A purchase and sale agreement between an initial beneficial person and an SPV may stipulate which reclaim filing statuses are acceptable per contractual terms and conditions. Tax reclaims' filing dates (projected per step 1206 or actual) may be compared against statutes of limitations dates to ensure tax reclaim amounts may be claimed during eligibility periods.

Projected reclaim receipt dates for tax reclaim assets may be calculated in step 1207 based on reclaim filing dates and a statistical analysis of reclaim receipt dates for respective local markets, as previously illustrated in FIG. 11. In step 1208, tax reclaims that have not exceeded their statutes of limitations may be pooled. This step may be used to ensure tax reclaims are still eligible for reclamation from the respective foreign government tax authorities.

Step 1209 may be used to ensure tax reclaim assets from an initial beneficial person's aggregate portfolio meet any additional tentative portfolio requirements. Steps 1210 and 1211 may populate certain database models to store values related to the creation of a tentative portfolio. In step 1210 a tax reclaim active database model may be populated with tentative portfolio values, such as but not limited to, verified statuses of calculated reclaim amounts from step 1205; projected filing dates from step 1206; and projected reclaim receipt dates from step 1207. Step 1211 may populate a tentative portfolio database model (4601, FIG. 46) to record the creation of a tentative portfolio.

Step 1212 represents the created tentative portfolio of tax reclaim assets. It is this group of verified tax reclaim assets that may be eligible for another round of pooling into the stamp tranche, in accordance with some embodiments of the present invention.

Process Flow—Preliminary Discounted Values for a Stamp Tranche

A stamp tranche may be used to pool certain tax reclaim assets in order to assign preliminary discounted values for opportunity cost analysis and to prepare tax reclaim assets for subsequent securitization. Multiple stamp tranches may be supported by some embodiments of the present invention to pool various tax reclaim assets into specific pools for securitization. In fact, if a particular tax reclaim asset does not meet the requirements of the first stamp tranche, that tax reclaim asset may be reserved for subsequent pooling through another stamp tranche. FIG. 13 is an illustrative example of how a stamp tranche may be created and how a preliminary opportunity cost analysis may be performed to compare the effect of inflation on tax reclaim assets to a ROSESeries ABS advantage when an initial beneficial person sells its tax reclaim assets to an SPV, according to some aspects of the present invention.

A tranche definition from step 1301 may be referenced to formulate a stamp tranche of tax reclaim assets. Step 1302 may retrieve parameters from a stamp tranche definition in order to make sure the tax reclaim assets from a tentative portfolio meet a stamp tranche's pooling requirements. In step 1303, tax reclaim assets from a tentative portfolio may be checked to see if they meet a stamp tranche's parameter requirements. Exemplary checks from step 1303 are illustrated in more detail in FIG. 14-FIG. 17. If tax reclaim assets do not meet a stamp tranche's parameter requirements, tax reclaim assets may be reserved for pooling by another stamp tranche definition at a later date and time. If tax reclaim assets pass a stamp tranche's parameter requirements, the pooling of assets may proceed to step 1304 where market rate data may be retrieved in step 1305 to help support preliminary discounted value calculations.

Assigning preliminary discounted values may allow an initial beneficial person to review potential opportunity costs that may arise because of a ROSESeries ABS advantage, according to aspects of the present invention. In step 1306, these preliminary discounted values may be calculated to give an initial beneficial person preliminary estimates of how much it could receive as a result of selling its tax reclaim assets to an SPV. In step 1307, calculated values for a stamp tranche may be stored in a tax reclaim active database model as updates to the respective tax reclaim assets, which are a part of a stamp tranche. Additional information pertaining to a stamp tranche may be stored in a tranche database model (4603, FIG. 46), as noted in step 1308.

Step 1309 may mark the creation of a stamp tranche of tax reclaim assets. These tax reclaim assets may continue to a subsequent pooling process, in accordance with some embodiments of the present invention. Before then, in step 1310, a preliminary opportunity cost analysis may be performed so an initial beneficial person may compare estimated cash benefits of utilizing the securitization system and methodology of some embodiments of the present invention with the effect of inflation on tax reclaim assets if some embodiments of the present invention are not utilized. Step 1311 illustrates an exemplary opportunity cost analyzer—yet another technology solution that may be built into some embodiments of the present invention. In step 1312, the effect of inflation on tax reclaim assets may be presented to an initial beneficial person. This step may represent the time value of money effect when an initial beneficial person's tax reclaim assets remain in the coffers of a foreign tax authority and do not earn interest. In step 1313, preliminary discounted values from step 1306 may be used to calculate a ROSESeries ABS advantage, which may estimate the cash benefits if an initial beneficial person sells its tax reclaim assets to an SPV in accordance with some embodiments of the present invention. In step 1314, results from the two previous steps may be presented together in an equilibrium intercept graph. This graph may compare the inflationary effect of waiting for a foreign tax authority to pay the tax reclaims with the estimated reinvestment opportunity that is introduced to an initial beneficial person on behalf of some embodiments of the present invention. Results of the opportunity cost analyzer may be displayed graphically using any graphical software such as, but not limited to, Microsoft Excel.

Process Flow—Tranche Definition Parameter Checks

As mentioned earlier, FIGS. 14-17 illustrate exemplary tranche checks in detail. A number of parameters may be configured to define a tranche including, but not limited to, specific lists of reclaim countries, fund numbers, initial beneficial persons, and projected tax reclaim receipt dates. Various combinations of tranche checks may allow flexibility in the way tax reclaim assets are pooled in accordance with some embodiments of the present invention. Not all parameter checks may be set for a particular tranche. Structuring requirements of ROSESeries ABS may determine which parameters of stamp and secure tranches are configured, according to some embodiments.

Tranche checks may be stored in a tranche definition database model, as illustrated in 4602, FIG. 46. Steps 1303, FIGS. 13 and 1803, FIG. 18 may represent the retrieval of stamp and secure tranche parameters from a tranche definition database model, respectively. For step 1401, FIG. 14, an initial tranche check may determine if creation of a tranche adheres to a tranche's start and end dates. This step may ensure stamp and secure tranches are created during established date intervals. In step 1402, a pooling process checks if tax reclaim assets meet the reclaim country parameter of a tranche definition. A reclaim country parameter is flexible enough to handle all local markets. Step 1403 checks if tax reclaim assets meet an initial beneficial person country of residence requirement. In step 1404, a pooling process determines if a tranche may be established based on an initial beneficial person identifier. This step allows for the assets of a particular initial beneficial person, or group of initial beneficial persons, to be pooled, in accordance with some embodiments.

Figure 15:
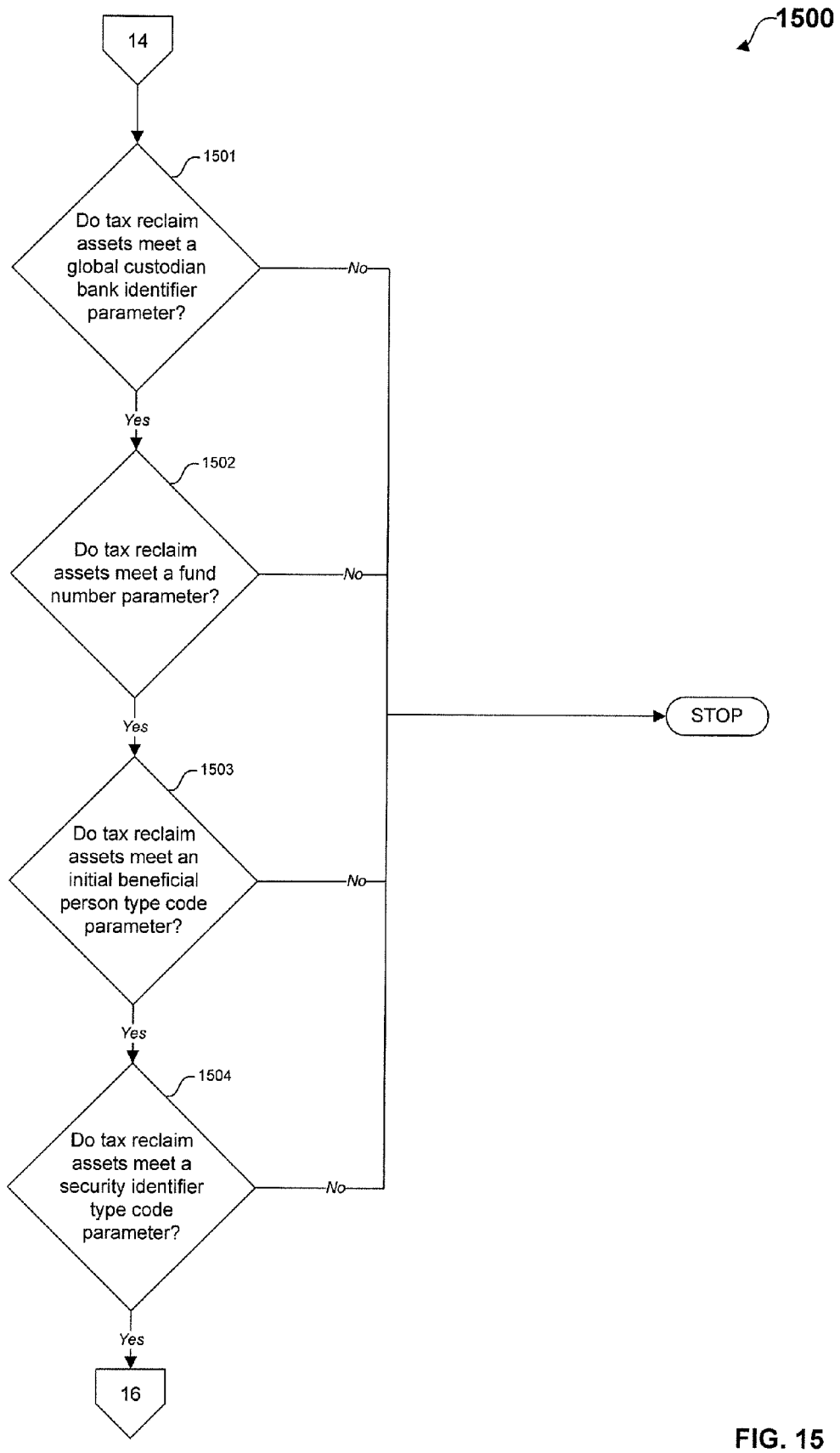

FIG. 15 is a continuation of exemplary tranche parameter checks. Step 1501, FIG. 15 may identify which global custodian bank or banks may be pooled for a tranche. In step 1502, a list of fund numbers from a tranche definition may be applied to make sure a tranche's associated tax reclaim assets adhere to fund number stipulations. Step 1503 may pool a tranche definition's initial beneficial person type code parameter. Step 1504 is an example of how a tranche may include a pooling parameter for select security identifier type codes.

Figure 16:
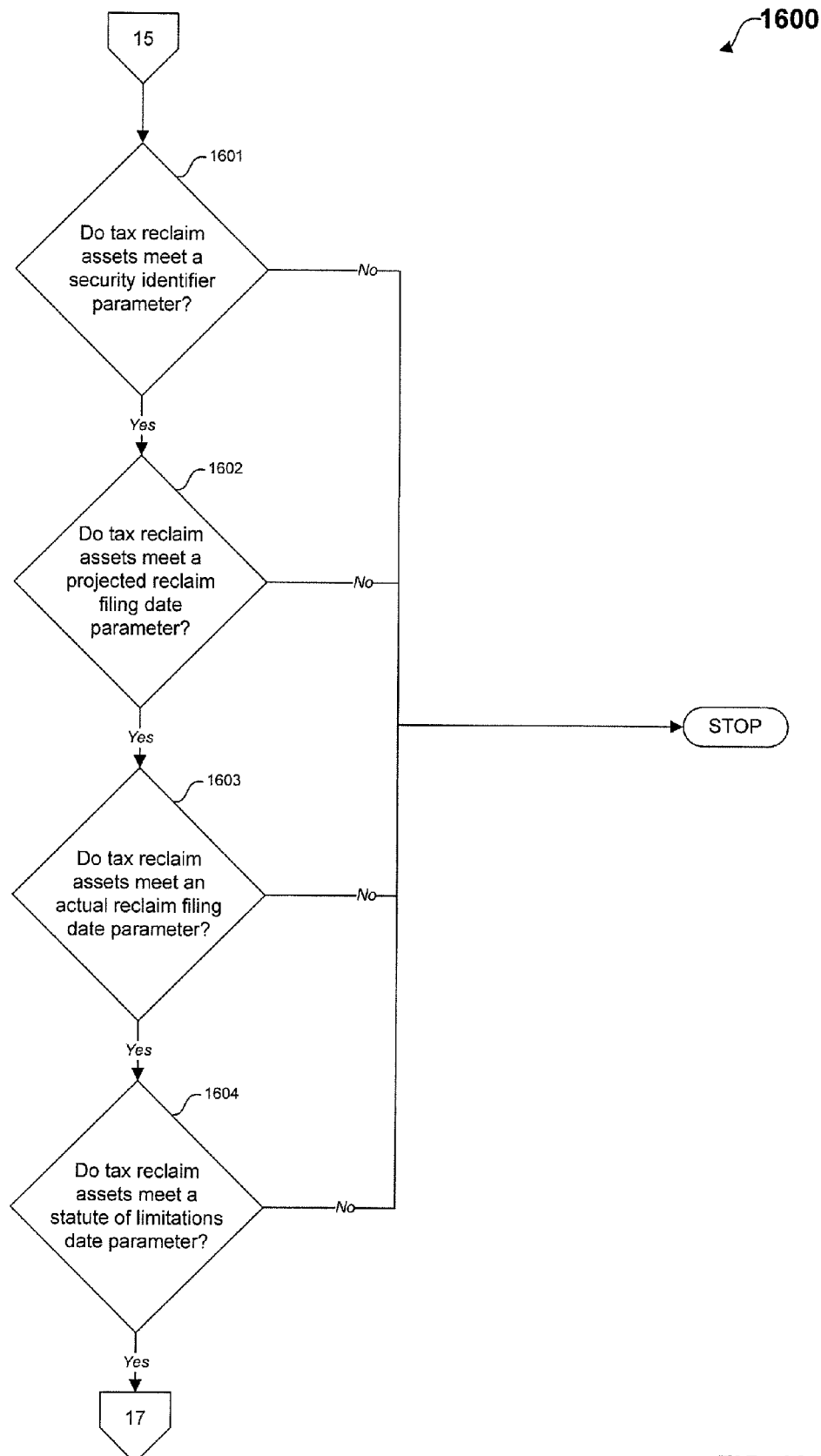

An exemplary tranche parameter check process continues, as illustrated in FIG. 16, with a check for a tranche's particular security identifiers in step 1601. With this parameter setting, certain securities may be selected for pooling, in accordance with some embodiments of the present invention. For step 1602, a projected reclaim filing date parameter may be checked; and for step 1603 an actual reclaim filing date may be checked. Continuing with step 1604, a stamp tranche's statute of limitations may be reviewed.

Figure 17:
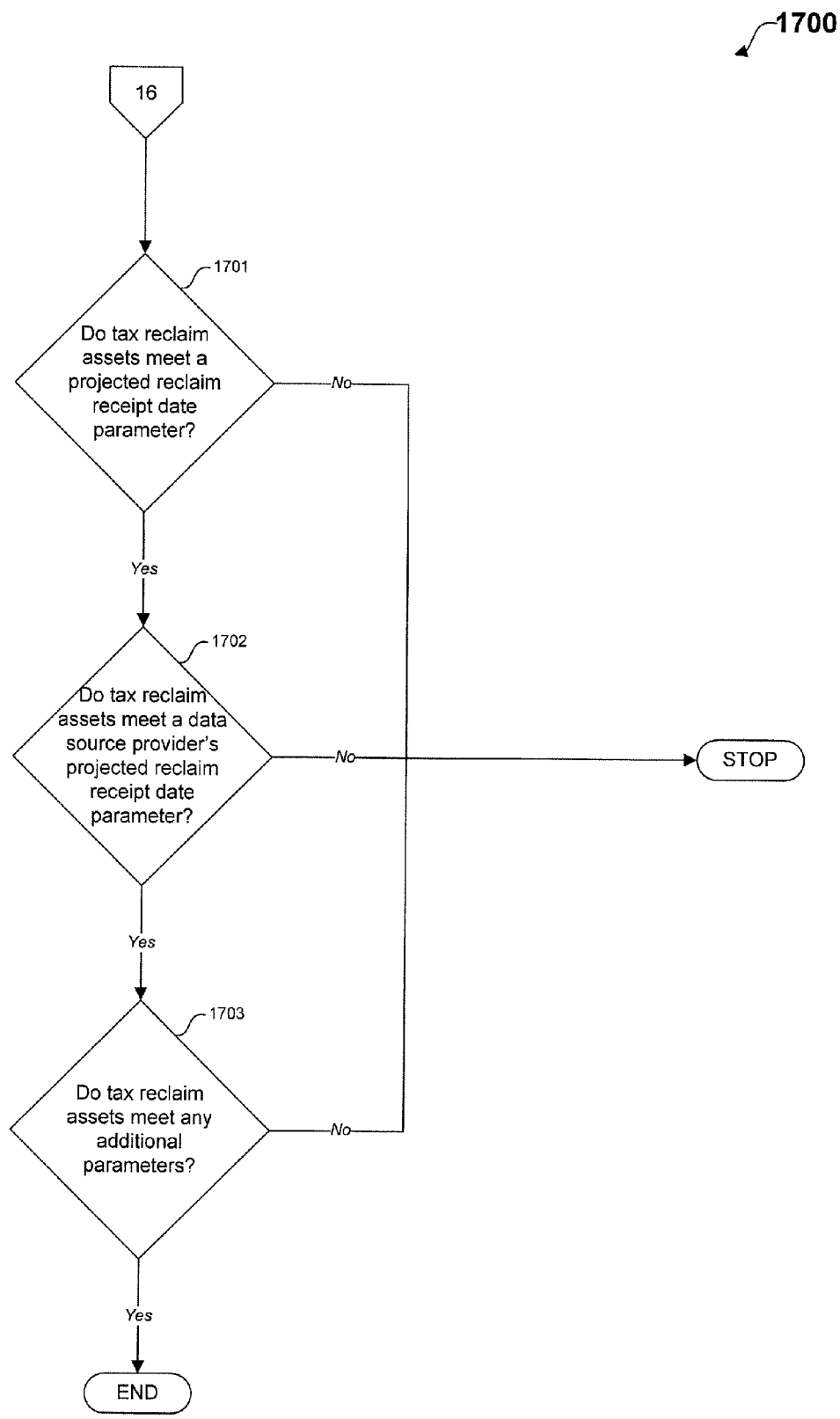

In step 1701, FIG. 17 tax reclaim assets may be checked to see if they meet the projected reclaim receipt date parameter of a tranche. In step 1702 tax reclaim assets of a particular data source provider's projected reclaim receipt date may pooled by a tranche. Step 1703 may check if tax reclaim assets meet any additional parameters of a defined tranche. If all tranche checks from FIG. 14-FIG. 17 are met, the respective stamp or secure tranche may be created.

Process Flow—ROSESeries ABS Structuring for Secure Tranche

FIG. 18 and FIG. 19 are exemplary diagrams of the continued securitization methodology from a stamp tranche creation in FIG. 13. A secure tranche definition from step 1801, FIG. 18 may be retrieved in step 1802 to make sure a stamp tranche's tax reclaim assets meet a secure tranche's requirements as noted in step 1803 such as reclaim countries of origin, security identifier type code, and global custodian bank, to name a few.

After passing a secure tranche's parameter checks in step 1803, an ABS definition database model from step 1804 may be queried in step 1805 to understand how ROSESeries ABS may be structured by an SPV. Step 1806 may represent the structuring of tax reclaim assets by an SPV into rated ROSESeries ABS. There may be a number of third-party organizations involved in structuring ROSESeries ABS in accordance with some embodiments of the present invention. By way of example and not limitation, steps 1807-1816 highlight a few of these third-party organizations. ABS structuring may involve an SPV originator (1807); a rating agency (1808); an underwriter (1809); a liquidity provider (1810); legal counsel (1811); a trustee (1812); a global custodian bank (1813); a servicer (1814); an accountant (1815); and a settlement location (1816). A step 1817 may be included for additional third-party organizations affiliated with an ABS structuring process, according to some embodiments of the present invention. In addition, some embodiments of the present invention may handle multiple third-party organizations of the same organization type, such as but not limited to, multiple rating agencies, liquidity providers, and accountants involved in a single ABS structuring deal.

Once tax reclaim assets have undergone ABS structuring, step 1901, FIG. 19 may obtain an investment rating for the tax reclaim assets from a credit rating agency (from step 1808, FIG. 18), which contributed to the structuring of rated ROSESeries ABS. In step 1902, information pertaining to issued ABS may be stored in an ABS issuance database model, which is illustrated in more detail in 4702, FIG. 47. In step 1903, a discounted value for the applicable investment rating from step 1901 may be assigned to tax reclaim assets. Next in step 1904, secure tranche values may be added to a tax reclaim active database model. As a result of ABS structuring, a secure tranche of tax reclaim assets may be created in step 1905. For step 1906, rated ROSESeries ABS become the property of an SPV trust and are available for sale in the capital market to investors.

Process Flow—Output Data Process

Figure 20:
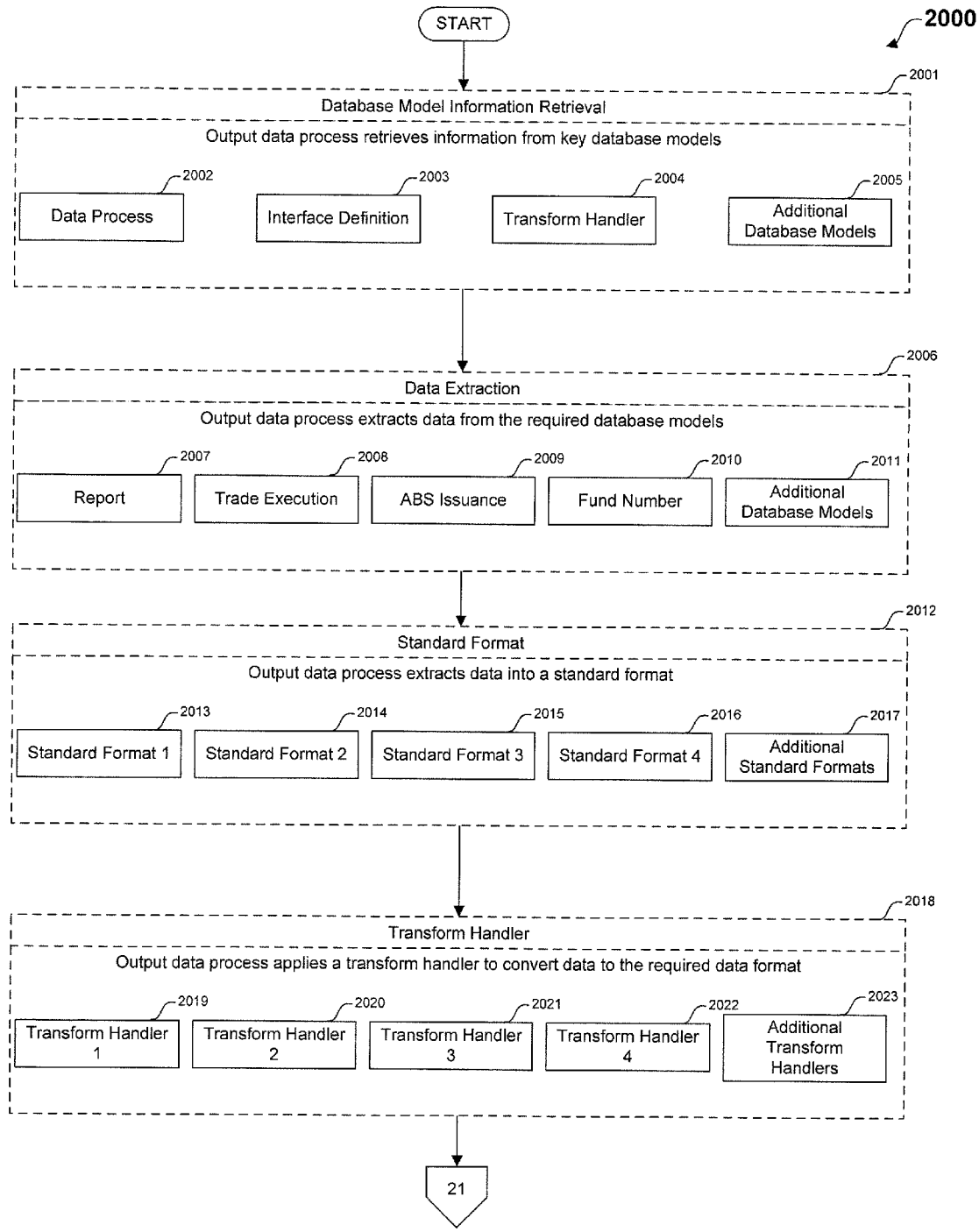
FIG. 20 and FIG. 21 are exemplary block diagrams that illustrate how, according to some embodiments of the present invention, an output data process may function in order to extract data from various database models associated with embodiments of the present invention.
Figure 21:
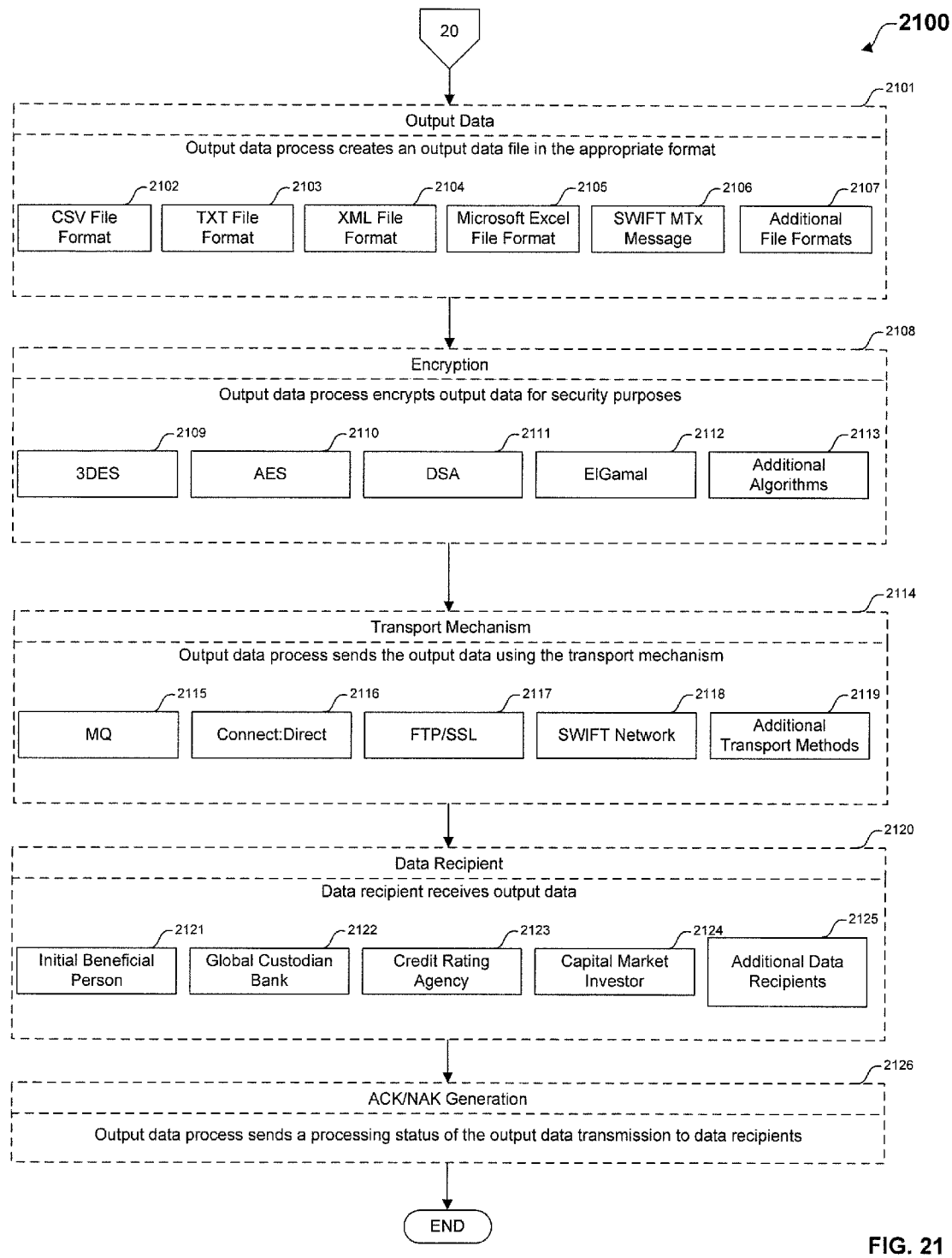

An exemplary output data process is the converse technology solution to an input data process (FIG. 8 and FIG. 9). Instead of loading data into various database models associated with some embodiments, an output data process extracts data from numerous database models. An output data process shares a number of exemplary characteristics with an input data process such as the adaptability to utilize multiple file formats and transport mechanisms; the use of a data process database model to store key processing rules; and the multi-threading and multitasking functionality to optimize performance. In addition, an output data process may utilize a language translation tool to generate output data in any language format, including but not limited to English, German, Spanish, French, and Italian. FIG. 20 and FIG. 21 illustrate an exemplary output data process as it relates to some embodiments.

To start an output data process, step 2001, FIG. 20 may retrieve pertinent information on how an output data process should function and which definitions may be required to extract data. An output data process may retrieve this information from database models including, but not limited to, data process, interface definition, and transform handler. In step 2002, output definitions for a data process database model are referenced in order to get the processing rules of an output data process. In step 2003, outbound interfaces, which may are assigned to an output data process, may be retrieved from an interface definition database model. This step may also retrieve the individual processing rules for each interface definition. In step 2004, transform handlers, which indicate how output data files may be formatted, may be derived from a transform handler database model. Step 2005 may be used to query additional database models related to an output data process.

In step 2006, an output data process may extract data from the various database models. Steps 2007-2010 illustrate how an output data process may extract data from multiple database models. Such database models include, but are not limited to a report (step 2007); trade execution (step 2008); ABS issuance (step 2009); and fund number (step 2010). An interface definition database model may indicate which database models are involved in the extraction of data. Step 2011 may be included for any additional database models required for data extraction in accordance with some embodiments.

In step 2012, an output data process may write extracted data into a standard file format. As noted earlier with an input data process, a standard file format serves to expedite data handling. With a standardized format used to write data to files, emphasis may be placed on unique transform handlers, which may be used to meet the particular file formatting mandates of a data recipient, such as an initial beneficial person, credit rating agency, or accountant. As noted in step 2012, there may be a multitude of standard format definitions associated with some embodiments of the present invention. Steps 2013-2016 are illustrate examples of standard formats utilized by an output data process. Step 2017 illustrates additional standard formats that may be associated with an output data process in accordance with some embodiments.

After extracted data is written to a standard format, a transform handler may be used to convert data to the required data format in step 2018. A transform handler may contain the data formatting rules that correspond to a data recipient's requirements for output data. Steps 2019-2022 are illustrative examples of various transform handlers that may be applied to a standard data format. Step 2023 may cover any additional transform handlers, according to some embodiments in order to convert data to the required data format.

Exemplary step 2101, FIG. 21 illustrates the resulting data file after data is transformed into the appropriate format by a transform handler. An output data file may include, but is not limited to, a CSV file in step 2102, TXT file in step 2103, XML file in step 2104, Microsoft Excel file format in step 2105, and SWIFT MTx message in step 2106. Additional file formats, as illustrated in step 2107, may be utilized to meet the requirements of data recipients.

An encryption algorithm, as noted in step 2108, may be used to secure the integrity of output data as it is transferred to a data recipient. Exemplary encryption algorithms may include, but are not limited to 3DES in step 2109, AES in step 2110, DSA in step 2111, ElGamal in step 2112, and any additional encryption algorithms that may provide security to outbound data in step 2113.

Data may be sent over any transport mechanism to a data recipient. In step 2114, various transport mechanisms may be utilized. By way of example, and not limitation, such transport mechanisms may include MQ in step 2115, Connect: Direct in step 2116, FTP/SSL in step 2117, and the SWIFT Network in step 2118. Additional transport methods may be employed in step 2119 in response to the requirements of a data recipient in accordance with some embodiments.

As mentioned earlier, output data may be sent to various data recipients affiliated with the system and methodology of some embodiments. Step 2120 is an illustrative example of such data recipients. One such organization may be an initial beneficial person (2121); global custodian bank (2122); credit rating agency (2123); and capital market investor (2124). Additional data recipients may receive data from an output data process, as illustrated at 2125.

An output data process may include an ACK/NAK process to notify certain data recipients of an output data's processing status. By way of example and not limitation, if an initial beneficial person requires an XML file with actual discounted values associated with its sold tax reclaim assets, this output file may be generated by an output data process and sent to an initial beneficial person's global custodian bank. In step 2126, an ACK/NAK message may be sent to an initial beneficial person to let it know an XML file was successfully generated and forwarded to its global custodian bank.

For step 2126, an ACK/NAK message may be generated, as illustrated in more detail in FIG. 10, and sent to the appropriate data recipients over any transport mechanism, as supported by some embodiments.

Process Flow—Cash and Position Management

The method and system for pooling, securitizing, and trading global dividend and interest tax reclaim assets in accordance with some embodiments of the present invention, may involve the management of countless cash and position transactions amid several third-party organizations. Some embodiments of the present invention may ensure that these cash and position transactions are tracked throughout the transactional life cycle and are reconciled as part of a cash and position management process. Reconciliations may occur at any programmable frequency, including but not restricted to daily, monthly, and annually. A cash and position management process may serve as a check-and-balance reporting instrument involving accounting and custody records in accordance with some embodiments.

A cash and position management reconciliatory tool may perform an array of cash and position reconciliations. One such reconciliation may include a global custodian bank's accounting record for an original tax reclaim asset (accounting data) versus a global custodian bank's Demand Deposit Account (DDA) cash record, also referred to as a global foreign cash balance, showing payment for that tax reclaim asset (custody data). This exemplary reconciliation may confirm custody and accounting records supplied by a global custodian bank and processed as input data by some embodiments match to identify exceptions as early as possible for subsequent investigations.

A second exemplary reconciliation is the accounting holding positions for tax reclaim assets (accounting data) stored in various database models used by some embodiments of the present invention to a third-party organization's custody positions for tax reclaim assets (custody data). This exemplary reconciliation may guarantee the known tax reclaim asset holdings for some embodiments are identical to the records of a third-party organization acting as a custodian.

A third exemplary reconciliation associated with some embodiments may encompass the cash accounting record used in some embodiments of the present invention (which may serve as accounting data) versus the DDA cash record (which may serve as custody data) of a third-party banking organization working on behalf of some embodiments. As a result, cash balances, which may be reported in some embodiments of the present invention, may be reconciled against the cash balances of a third-party banking organization to identify variances.

Figure 22:
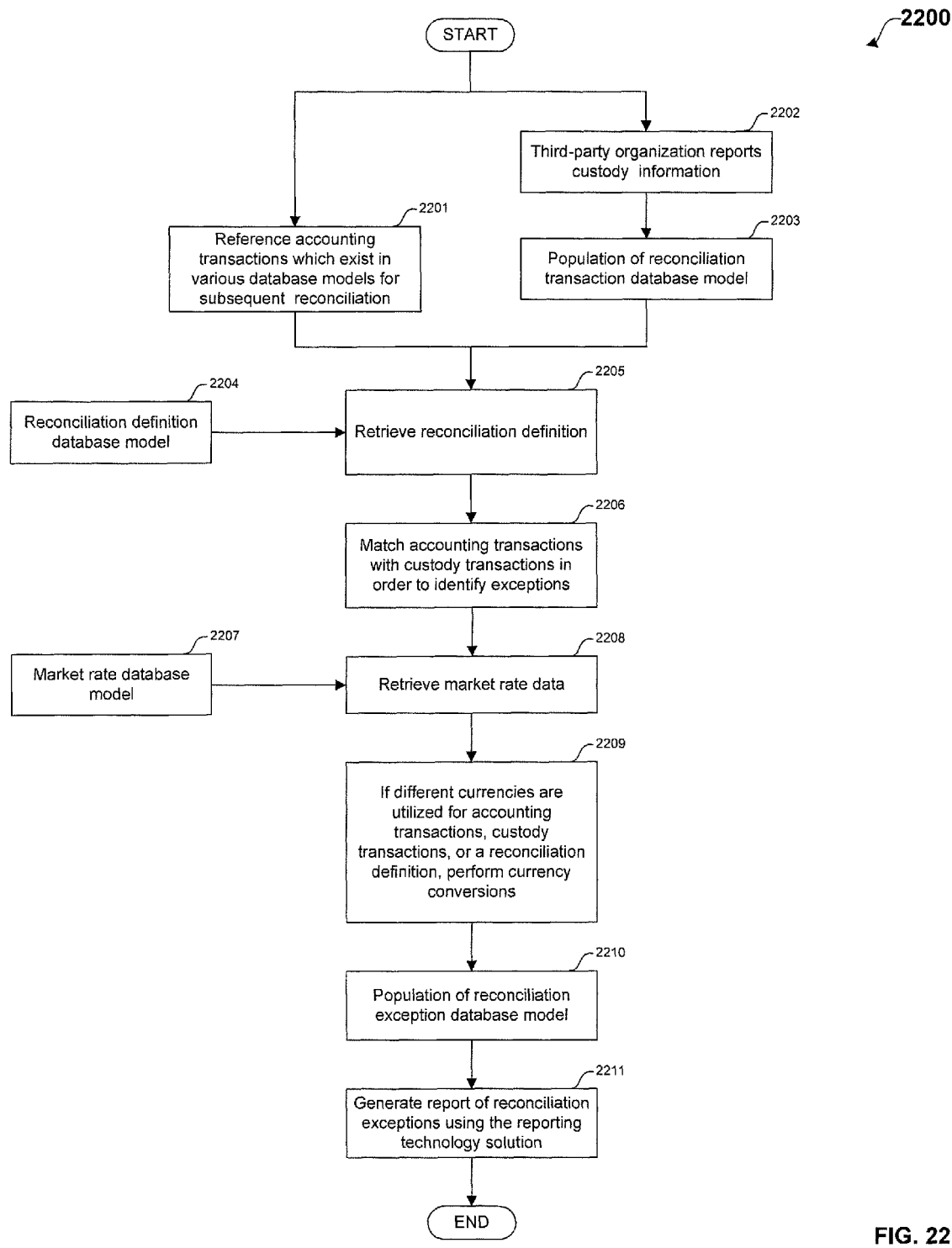
FIG. 22 is an illustrative example of a cash and position management technology solution, which may be used to reconcile accounting and custody transactions, according to some embodiments of the present invention.

FIG. 22 is an illustrative example of a cash and position management technology solution reconciliatory function. In step 2201, cash and position information residing in various database models, in accordance with some embodiments of the present invention, may serve as accounting transactions for a reconciliation function. Custody information may be reported by a third-party organization, such as but not limited to a global custodian bank, in step 2202 and may be used to populate a reconciliation transaction database model in step 2203. A cash and position management technology solution may accept custody information from various third-party organizations.

A reconciliation definition from step 2204 may be retrieved from a reconciliation definition database model in step 2205. In turn, parameters from a reconciliation definition may be employed to match accounting transactions from step 2201 to their respective custody transactions from step 2203. The matching criteria for a reconciliation, which may be configured within a reconciliation definition, depend on the type of cash or position transaction type involved. By way of example and not limitation, the matching criteria may include an initial beneficial person identifier, security identifier, initial beneficial person fund number, and cash account number.

In step 2208, market rate data in step 2207 may be retrieved for use in step 2209 to perform currency conversions. Since accounting and custody transactions may come from different data sources, there is a possibility that accounting transactions are reported in one currency and custody transactions are reported in second currency. To compound the issue, a reconciliation definition may define a third currency for which to report reconciliation results. No matter which local currencies, cross currencies, or base currency may be involved, a cash and position management process may perform the necessary currency conversions.

For step 2210, a reconciliation exception database model may be populated with the outcome of the reconciliation. Next, a financial report of exceptions may be generated for review in step 2211. A reconciliation financial report may be one of the many report types that may be generated by a reporting technology solution used in some embodiments. With this built-in technology, financial information may be presented in a consistent fashion that is recognized by numerous organizations involved in the financial, accounting, and regulatory industries.

Process Flow—Reporting

Figure 23:
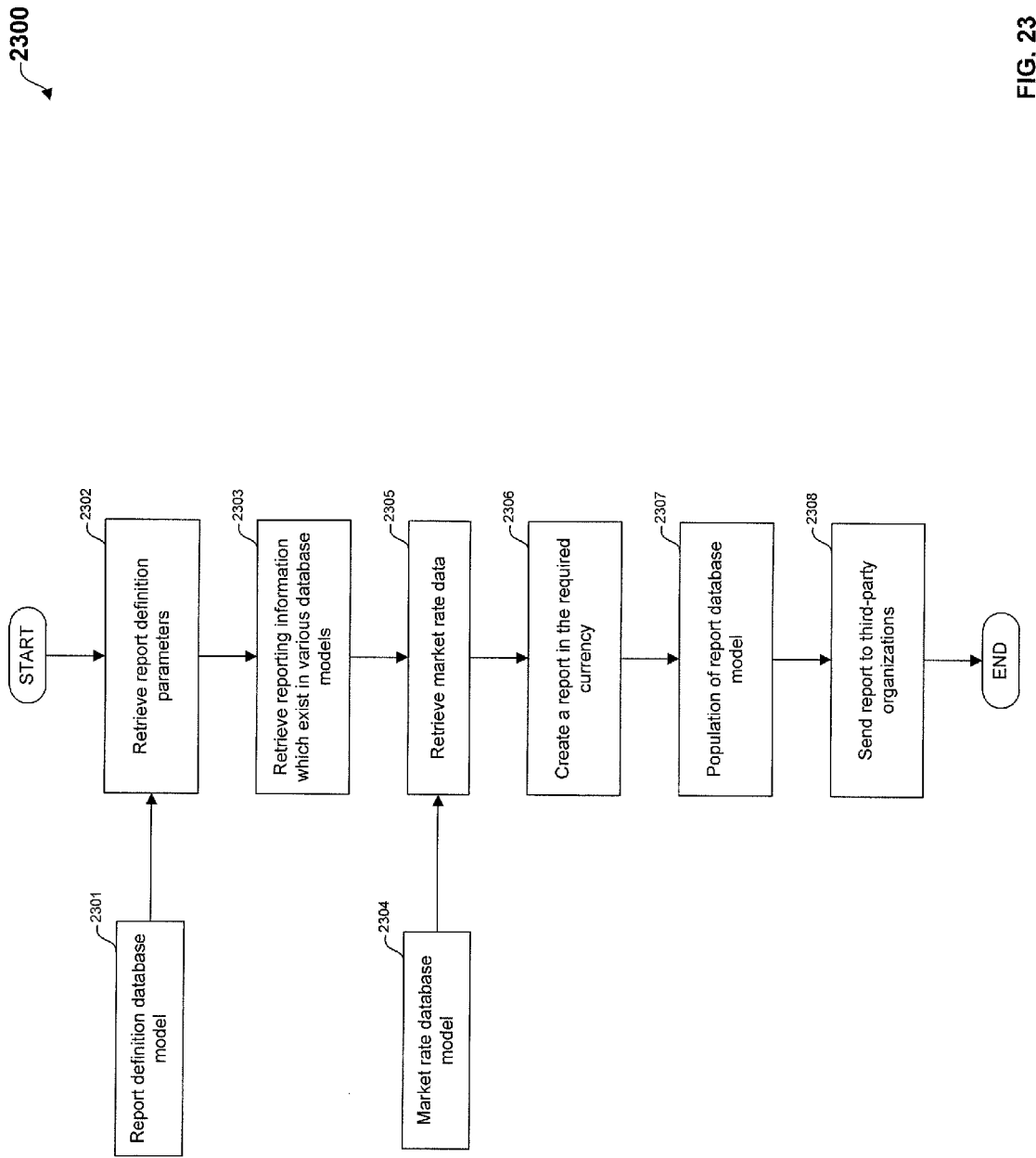
FIG. 23 is an illustrative example of a reporting technology solution that may be used to aggregate transactional information into a reporting format, according to some embodiments of the present invention.

A preferred component of some embodiments of a suitable system is a reporting technology solution, which may be used to aggregate transactional information into a reporting format. Some embodiments have the capability of utilizing other reporting tools such as, but not limited to, Actuate and Crystal. A resulting report may be distributed to third-party organizations in accordance with some embodiments of the present invention. Reporting formats may include, but are not limited to, trial balance statement, statement of cash flows, income statement, and statement of positions. FIG. 23 is an illustrative example of a reporting technology solution.

Before a report is created, a report definition, as illustrated in step 2301 may exist within a report definition database model. Parameters from a reporting definition may be retrieved in step 2302 and used to identify report attributes. Report attributes may include, but are not limited to, a report name, report file format, types of transactions reported, and which third-party organizations may receive a report. In step 2303, reporting information from various database models may be retrieved to create a report. Reporting information may originate from any database model, such as but not restricted to, tax reclaim active (4101, FIG. 41), fund number (4201, FIG. 42), ABS issuance (4702, FIG. 47), and swap deal receipt/payment (4903, FIG. 49).

Step 2305 may obtain market rate data from step 2304. Such market rate data may include, but is not limited to, foreign exchange rates to perform currency conversions as a part of a created report. A report definition may contain the required currency for a reporting statement.

In step 2306, a report may be created in accordance with some aspects of the present invention. In step 2307, a report may be stored in a report database model for subsequent review. If required, a report may be sent to various third-party organizations for review, as noted in step 2308. By way of example and not limitation, an output data process, according to some aspects, may be utilized to format, encrypt, and transfer a report to the required third-party organizations.

Process Flow—Interest Rate Swaps

To hedge interest rate risk, some embodiments may utilize interest rate swaps. A swap technology solution may be one of the many risk management tools for some embodiments of the present invention. An interest rate swap agreement allows some embodiments of the present invention and a designated swap dealer to exchange a fixed interest rate for a variable interest rate based on a negotiated notional principal amount. By receiving interest rate market data from various data sources and loading this data into the market rate database model of 4404, FIG. 44, interest rate activity may be monitored and tracked for future rate changes. A variety of graphical software tools may be used to present interest rate market data visually. Such software tools may include, but are not limited to, Microsoft Excel and Quantrix Modeler. An interest rate swap technology solution may process any interest rate type, including, but not restricted to, LIBOR and US Treasury rates.

Figure 24:
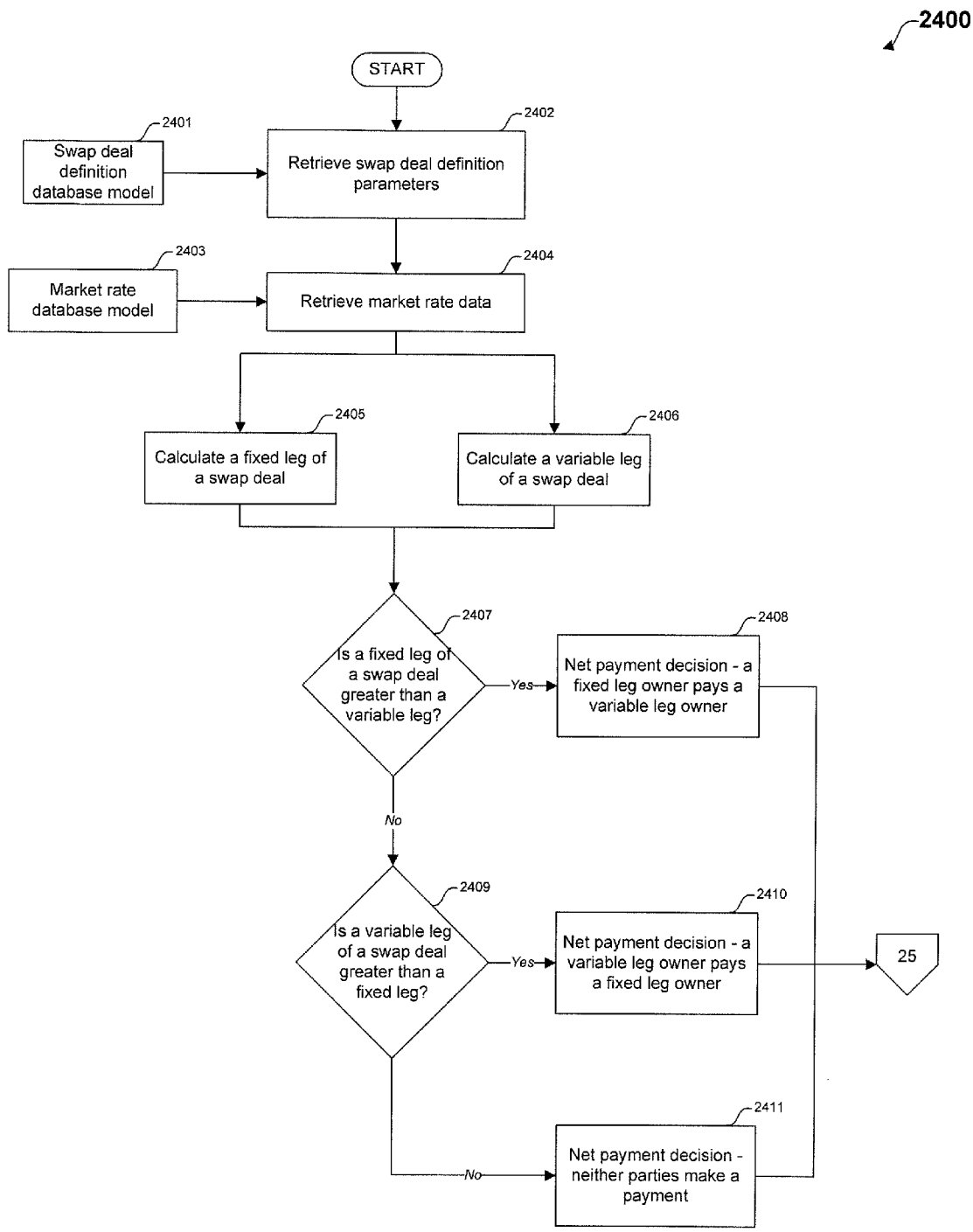
FIG. 24 and FIG. 25 are block diagrams illustrating an exemplary interest rate swap technology solution, which may be used to hedge interest rate risk, according to some embodiments of the present invention.

FIG. 24 is an illustrative example of a swap technology solution that may be used to limit exposure to fluctuations in interest rates, in accordance with some embodiments. A swap deal definition from step 2401 may be used in step 2402 to obtain the attributes of an interest rate swap agreement. Next, market rate data from step 2403 may be retrieved in step 2404 and used to obtain data such as, but not limited to interest rates.

As mentioned earlier, two key components of the swap deal are a fixed interest rate and a variable interest rate. These components may be referred to as fixed and variable legs of the swap agreement, respectively. In step 2405, a fixed leg of a swap deal may be calculated using a fixed interest rate and a negotiated notional principal amount for a swap deal. A variable leg, as noted in step 2406, may be calculated using a variable interest rate from market rate data retrieved in step 2404 and a notional principal amount of a swap deal.

Calculated fixed and variable swap legs may be compared to determine a net payment decision. This decision may correspond to which party, a fixed leg owner or a variable leg owner, makes a payment to the counterparty. Some embodiments of the present invention may serve as a fixed leg owner or a variable leg owner in a swap deal based on expectations for future interest rate activity. Step 2407 may determine if a calculated fixed interest rate leg of a swap deal is greater than a variable leg. If so, in step 2408 a net payment decision is for the fixed leg owner to pay the variable leg owner. A payment may correspond to a net payment value that is based on a swap deal's notional principal amount.

If the inquiry from step 2407 is not satisfied, a swap process may proceed to step 2409 to determine if a variable leg of a swap deal is greater than a fixed leg. If so, in step 2410 a variable leg owner pays a fixed leg owner as a net payment decision. If a fixed leg equals a variable leg, as noted in step 2411, neither parties have to make payments.

Figure 25:
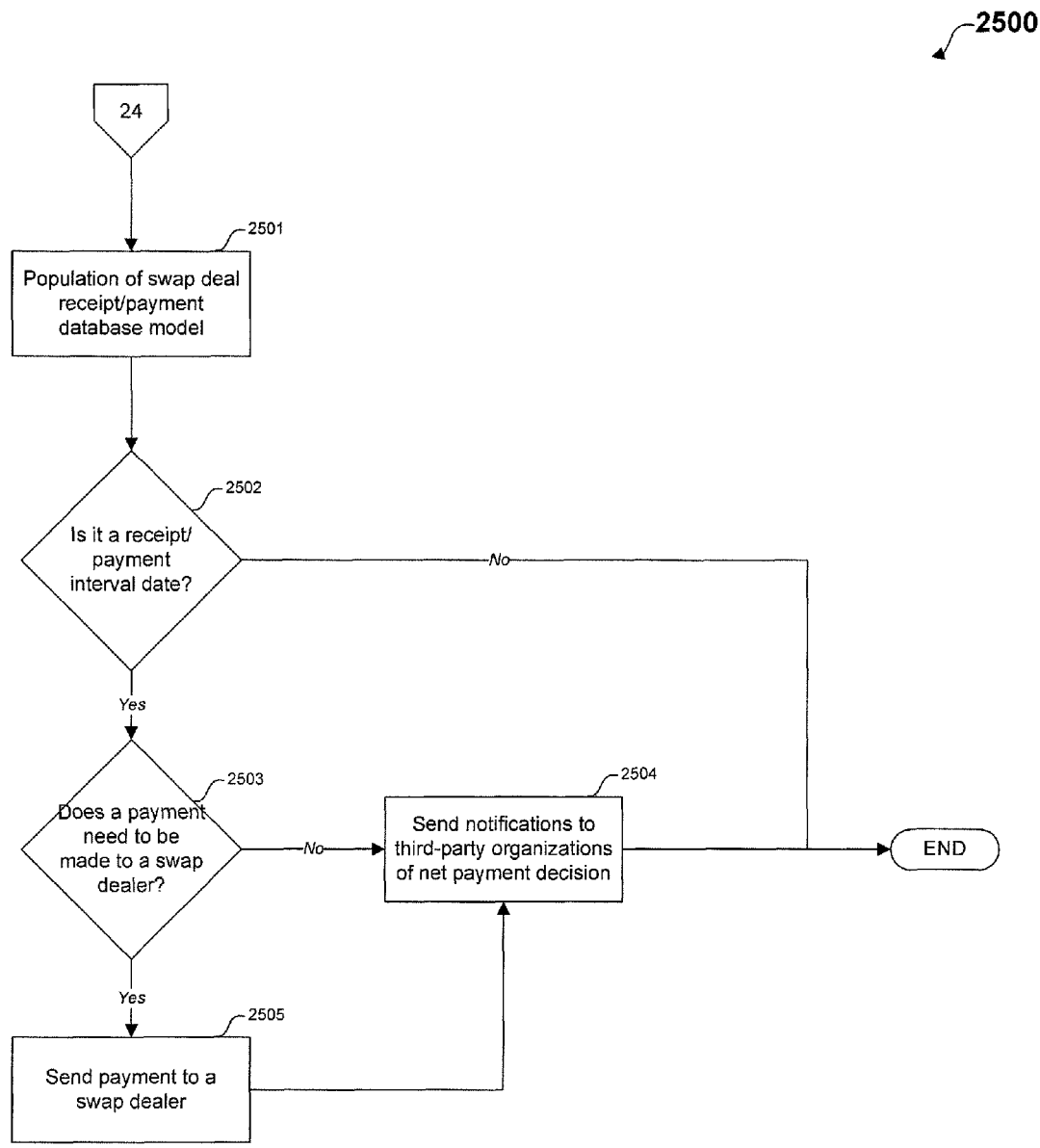

Calculated swap leg and net payment decision values may be used to populate a swap deal receipt/payment database model in step 2501, FIG. 25. Throughout the course of a swap deal, net payment decisions may be configured on a scheduled basis. By way of example and not limitation, a net payment interval schedule may be hourly, daily, or quarterly. Therefore, a swap deal receipt/payment database model may include multiple calculations for a single swap deal, of which only certain payment intervals may represent net payment decisions for a fixed leg owner or a variable leg owner. Intermediate net payment calculations may serve as additional opportunities to monitor interest rate fluctuations. A swap deal definition database model, as illustrated in detail below in 4901, FIG. 49, may store a swap deal's net payment interval schedule.

Step 2502 may check if a swap net payment decision corresponds to a payment interval date. If not, an interest rate swap process may end. If a swap net payment decision does correspond to a payment interval date, a interest rate swap process may check in step 2503 to see if a payment is to be made to a swap dealer based on a net payment decision from steps 2408, 2410, or 2411, FIG. 24. If not, notifications may be sent to third-party organizations in step 2504 to inform them of a net payment decision. Notified third-party organizations may include, but are not limited to, a global custodian bank that may serve as a custodian on behalf of some embodiments of the present invention; and a swap dealer.

If a payment is made to a swap dealer, a payment may be sent to a swap dealer in step 2505. Various methods may be used to make a swap deal payment including, but not limited to an output data process. An interest rate swap process may still send notifications to third-party organizations regarding a net payment decision in step 2504.

Process Flow—VaR

Figure 26:
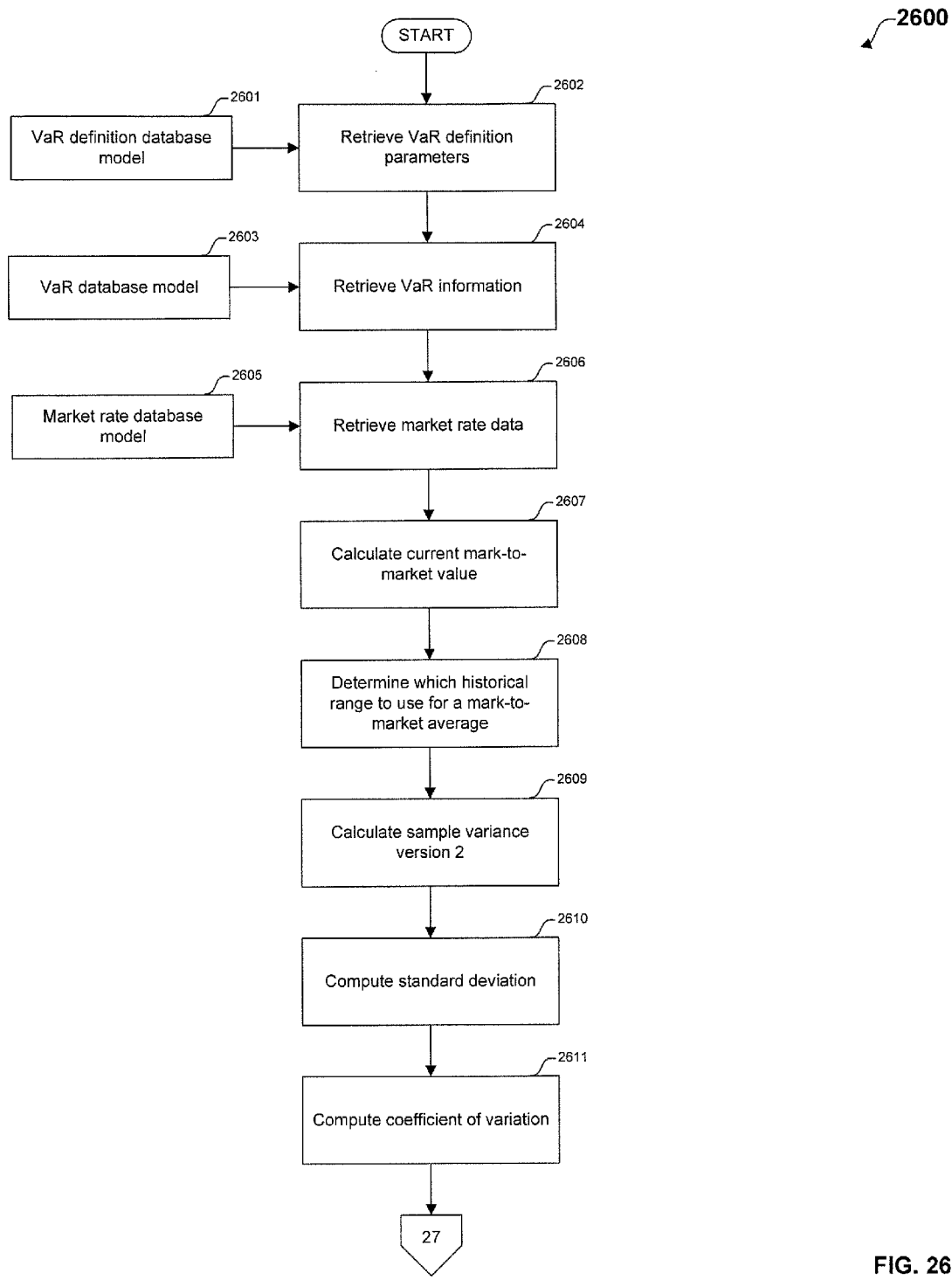
FIG. 26 and FIG. 27 are illustrative examples of how value at risk (VaR) may be calculated in order to identify total portfolio exposure to currency fluctuations, according to some embodiments of the present invention.
Figure 27:
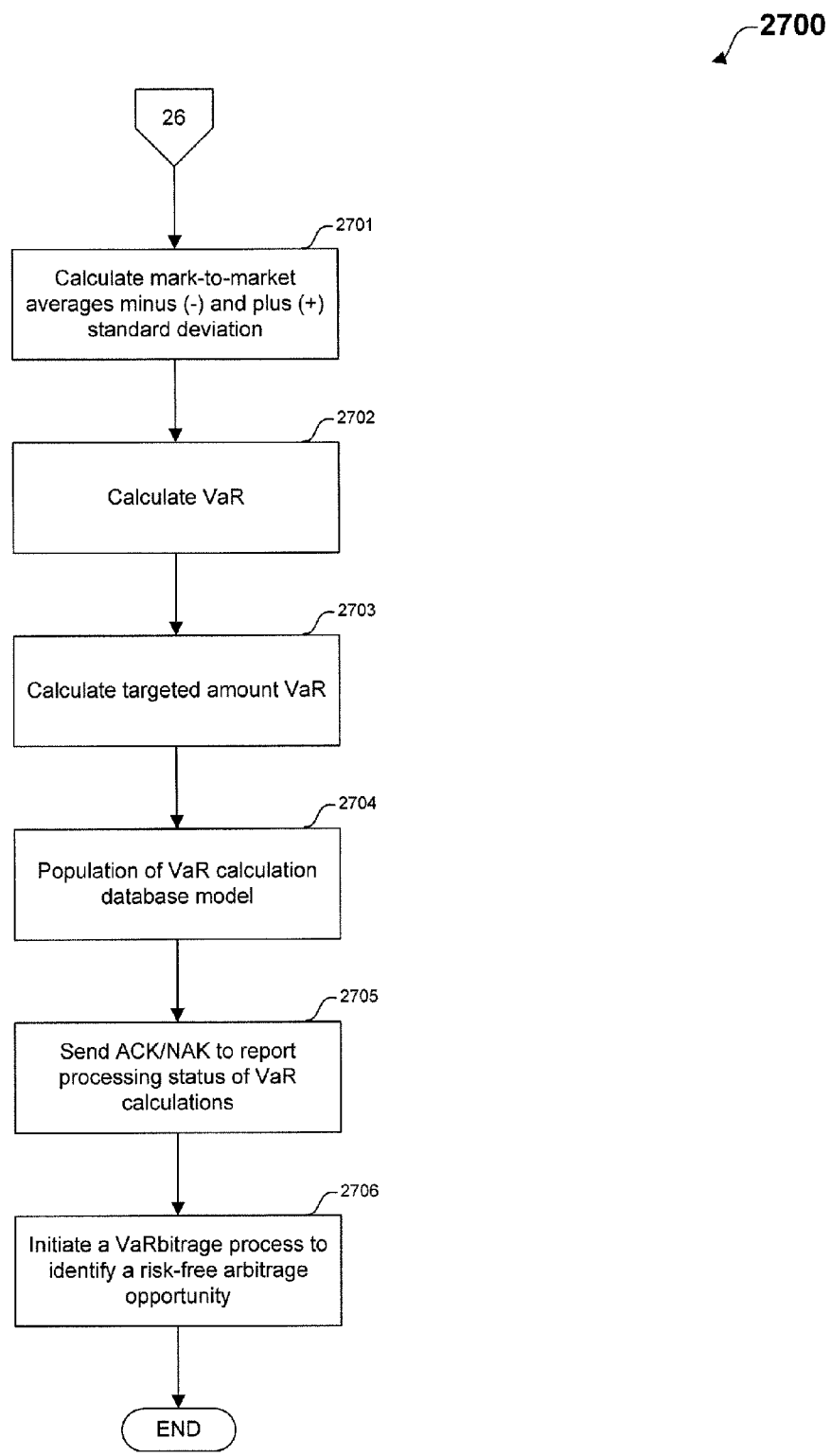

As mentioned earlier, a VaR technology solution may determine the value at risk exposure to fluctuations in foreign currencies. A VaR technology solution may utilize any local markets' currencies, cross currencies, and the base market's currency, in accordance with some embodiments of the present invention. FIG. 26 and FIG. 27 are illustrative examples of how value at risk is calculated. A VaR technology solution may identify value at risk at multiple times throughout the day.

To start a VaR process, VaR definition parameters from step 2601 may be retrieved from a VaR definition database model during step 2602. Information from a VaR database model in step 2603 may be retrieved during step 2604. A VaR database model may include, but is not limited to, a foreign exchange contract, deliver and receive currencies, historical range indicator, and running mark-to-market sum. Market rate data in step 2605 may be used to retrieve market data during step 2606 for subsequent VaR formulas. This market data may include, but is not restricted to foreign exchange rates and LIBOR rates.

For step 2607, a mark-to-market value may be calculated using the following exemplary formula:

$$\text{mark-to-market value} = \left[ (SpotRate_{DC}/SpotRate_{RC}) \times \frac{RC}{1 + r_{RC}\left(\frac{90}{360}\right)} \right] - \frac{DC}{1 + r_{DC}\left(\frac{90}{360}\right)}$$

r=interest rate
DC=deliver currency
RC=receive currency
where "SpotRate$_{DC}$" and "SpotRate$_{RC}$" may correspond to spot foreign exchange rates for deliver and receive currencies, respectively. "DC" may correspond to a VaR foreign exchange contract deliver amount; and "RC" may correspond to a VaR foreign exchange contract receive amount; "r$_{DC}$," and "r$_{RC}$" may equal interest rates for deliver and receive currencies, respectively.

Step 2608 may determine which historical range of LIBOR rates to use for a mark-to-market average. A VaR technology solution may apply various historical ranges including, but not limited to a specific historical range, as stipulated in a VaR database model from step 2603; or a VaR technology solution may determine which historical range to apply based on the most aggressive average. By way of example and not limitation, a VaR technology solution may include four historical range averages that may be utilized. One is an exemplary full historical range average that utilizes all mark-to-market calculations to date to determine an average. A second is an exemplary 30-day historical range average that utilizes mark-to-market values for the past 30 days. A third is an exemplary 5-day historical range average that pulls mark-to-market calculations for the past 5 days in order to compute a historical range average. A fourth is an exemplary intraday historical range average that retrieves hourly mark-to-market values for the current day and calculates an average.

Step 2609 may calculate a sample variance version 2 value. In order to derive this value, a VaR process may calculate a variance for the current day. This variance may be determined by squaring the difference between a current mark-to-market value (the result from step 2607) and a historical average (the result from step 2608).

Next, a VaR process may compute a sample variance version 2 based on the following exemplary formula:

$$\text{sample variance version 2} = \frac{\sum_{i=1}^{n}(x_i - \bar{x})^2}{n-1}$$

Step 2610 may compute the standard deviation for a VaR calculation. The following exemplary formula may be utilized for this step:

$$\text{standard deviation} = \sqrt{\frac{\sum_{i=1}^{n}(x_i - \bar{x})^2}{n-1}}$$

Step 2611 may compute a coefficient of variation using the following exemplary formula:

$$\text{coefficient of variation} = \frac{\sigma}{\text{mean}}$$

A VaR calculation process may compute mark-to-market averages minus (−) and plus (+) standard deviation in step 2701, FIG. 27. This step may allow VaR to be calculated at select confidence levels. These confidence levels may include, but are not limited to, 95% and 99% in accordance with some embodiments of the present invention. For 95% confidence, a mark-to-market value average from step 2608, FIG. 26 and standard deviation from step 2610, FIG. 26 may be used to determine the minus (−) and plus (+) 2 standard deviation using these exemplary formulas:

minus(−) 2 standard deviation=(calculated mark-to-market average−(2*the calculated standard deviation)

plus(+) 2 standard deviation=(calculated mark-to-market average+(2*the calculated standard deviation)

For 99% confidence, a mark-to-market average (step 2608, FIG. 26) and standard deviation calculation (step 2610, FIG. 26) may be used to determine the minus (−) and plus (+) 3 standard deviation using these two exemplary formulas:

minus(−) 3 standard deviation=(calculated mark-to-market average−(3*the calculated standard deviation)

plus(+) 3 standard deviation=(calculated mark-to-market average+(3*the calculated standard deviation)

Step 2702 may calculate VaR at 95% and 99% confidence levels. One exemplary property of a normal distribution is that outcomes less than or equal to 1.96 standard deviations below a mean occur only 5% of the time. If a probability of 5% may be used in determining VaR, then VaR may equal to 1.96 times standard deviation. Using this value, VaR at 95% confidence may be determined with this exemplary formula:

$$\text{VaR} = 1.96 * \sigma \text{portfolio}$$

For 99% confidence, one exemplary property of a normal distribution is that outcomes less than or equal to 2.576 standard deviations below a mean occur only 1% of the time. If a probability of 1% may be used in determining VaR, then VaR may equal to 2.576 times standard deviation. This exemplary formula calculates VaR at 99% confidence:

$$\text{VaR} = 2.576 * \sigma \text{portfolio}$$

Next, in step 2703, a targeted VaR amount may be calculated at 95% and 99% confidence levels. For 95% confidence, targeted VaR amount may be determined by adding a mark-to-market calculated average from step 2608, FIG. 26 and VaR at 95% confidence from step 2702. A similar addition may take place to determine a targeted VaR amount at 99% confidence by substituting VaR at 95% with VaR at 99% confidence from step 2702.

In step 2704, VaR calculations and intermediate calculations to determine VaR may be stored in a VaR calculation database model. This database model is illustrated in more detail in 5003, FIG. 50. For step 2705, the processing status for VaR calculations may be sent to third-party organizations in accordance with some embodiments. A VaRbitrage process, which is illustrated in detail in FIG. 28 and FIG. 29, may be initiated in step 2706 to identify a risk-free arbitrage opportunity.

Process Flow—VaRbitrage

Figure 28:
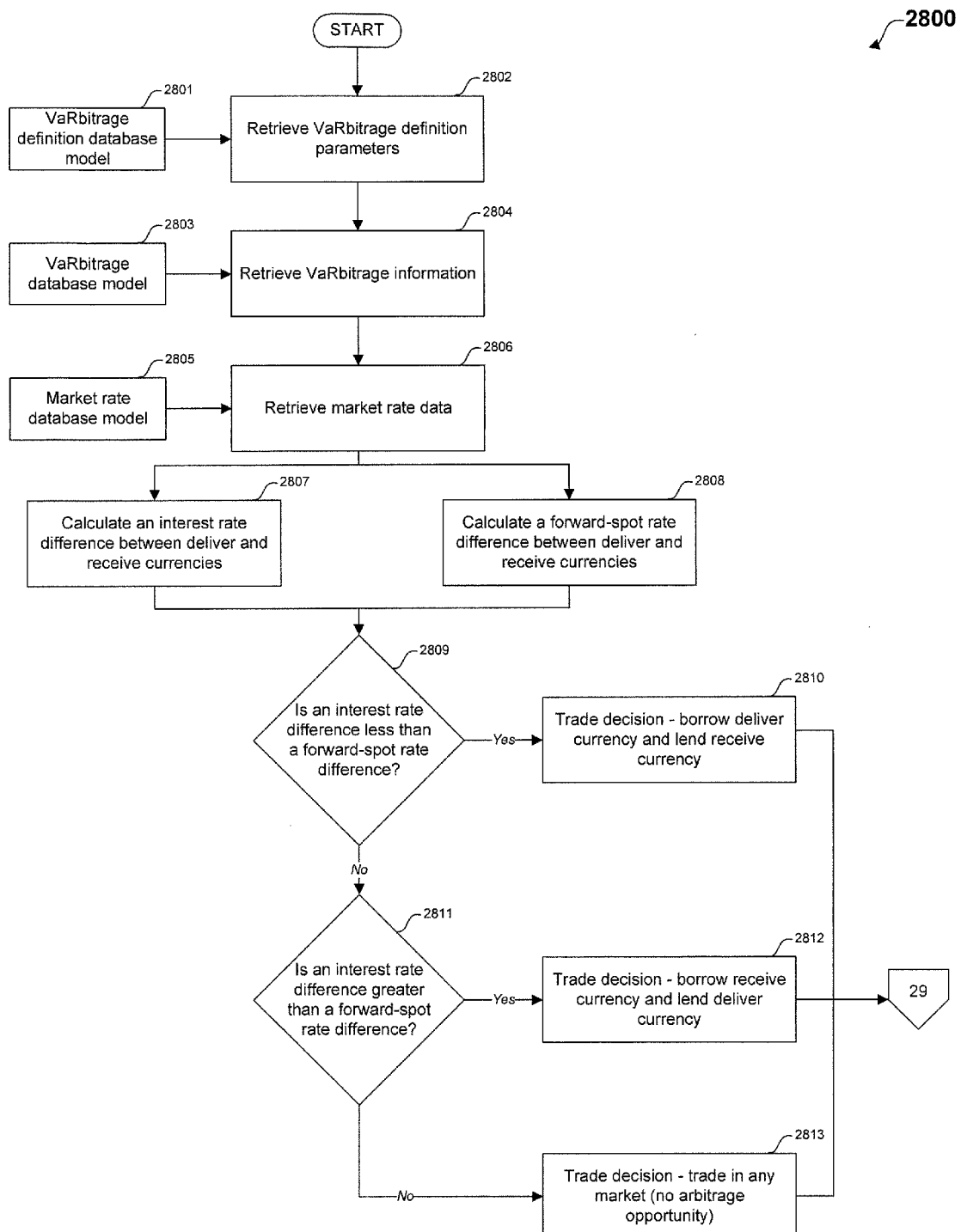
FIG. 28 and FIG. 29 are block diagrams of an exemplary VaRbitrage process that used to determine arbitrage trading limits in order to minimize exposure to global market currency rate fluctuations, according to some embodiments of the present invention.
Figure 29:
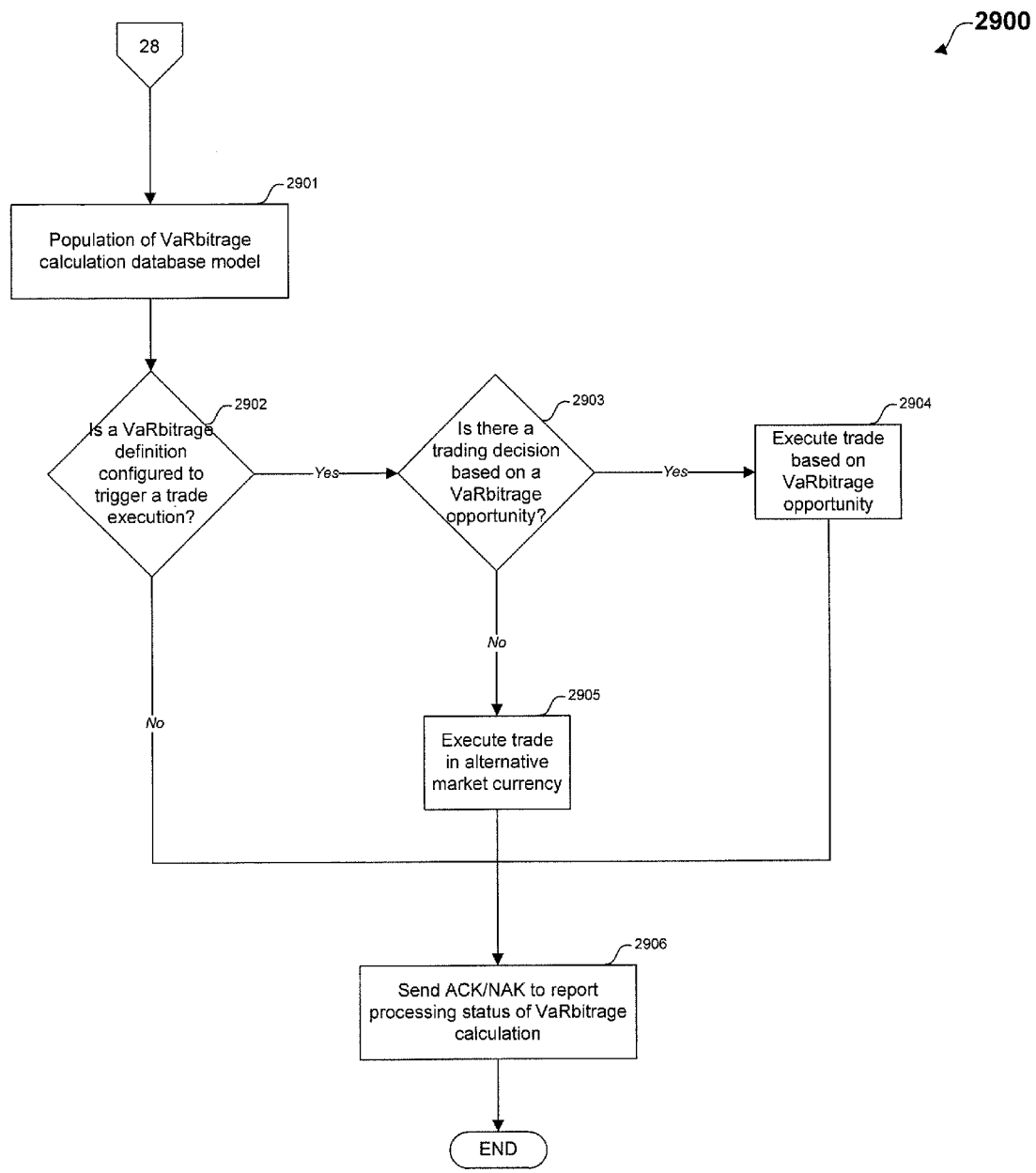

While a VaR process illustrated in FIG. 26 and FIG. 27 may be used to identify a targeted value at risk amount, a VaRbitrage process may utilize a targeted VaR amount to identify a risk-free arbitrage opportunity. FIG. 28 and FIG. 29 are illustrative examples of a VaRbitrage process in accordance with some embodiments.

In step 2801, a VaRbitrage definition may be used to retrieve VaRbitrage parameters during step 2802. These parameters may include, but are not limited to, an associated VaR definition indicating a targeted VaR amount for a VaRbitrage opportunity; and an interest rate system that may be used to calculate a trade activity limit. A VaRbitrage database model from step 2803 may be queried in step 2804 to obtain additional information about a VaRbitrage event, such as but not limited to, start and end dates.

Market rate data from step 2805 may retrieved during step 2806 for subsequent interest rate calculations. By way of example and not limitation, this market data may be used, to calculate an interest rate difference between deliver and receive currencies in step 2807; and to calculate a forward-spot rate difference between deliver and receive currencies in step 2808. Step 2807 uses the following exemplary formula to compute an interest rate difference:

$$\text{interest rate difference} = r_{DC} - r_{RC}$$

DC=deliver currency
RC=receive currency

Step 2808 uses the following exemplary formula to compute a forward-spot rate difference:

$$\text{forward-spot rate difference} = (\text{Forward}_{ask\ rate} - \text{Spot}_{ask\ rate}) / \text{Spot}_{ask\ rate}$$

where "Forward$_{ask\ rate}$" may correspond to a foreign exchange forward ask rate from a deliver currency to a receive currency; and "Spot$_{ask\ rate}$" may correspond to a foreign exchange spot asking rate from a deliver currency to a receive currency.

VaRbitrage exemplary unified formulas are as follows:

IF $r_{DC} - r_{RC} < (\text{Forward}_{ask\ rate} - \text{Spot}_{ask\ rate}) / \text{Spot}_{ask\ rate}$  1.

Then
Borrow a deliver currency and lend a receive currency

IF $r_{DC} - r_{RC} > (\text{Forward}_{ask\ rate} - \text{Spot}_{ask\ rate}) / \text{Spot}_{ask\ rate}$  2.

Then
Borrow a receive currency and lend a deliver currency

IF $r_{DC} - r_{RC} = (\text{Forward}_{ask\ rate} - \text{Spot}_{ask\ rate}) / \text{Spot}_{ask\ rate}$  3.

Then
Trade in any market—no arbitrage opportunity

Steps 2809-2813 may determine a trade decision—if an arbitrage opportunity favors borrowing a deliver currency and lending a receive currency; borrowing a receive currency and lending a deliver currency; or if no arbitrage opportunity could be determined based on current market activity. An arbitrage trading decision may take into account the cost of executing an arbitrage opportunity. In step 2809, if an interest rate difference from step 2807 is less than a forward-spot rate difference from step 2808, a trade decision in step 2810 may be to borrow a deliver currency and lend the a receive currency. If an interest rate difference is greater than a forward-spot rate difference, as evaluated in step 2811, a trade decision in step 2812 may to borrow a receive currency and lend a deliver currency. In step 2813, if two rate differences equal, a VaRbitrage process may initiate a trade in any local market or the base market, because no arbitrage opportunity exists at the specific time.

VaRbitrage calculations and trading decisions may be stored in a VaRbitrage calculation database model in step 2901, FIG. 29. Based on the results of a VaRbitrage trading decision, a VaRbitrage process may invoke one of two courses of actions based on the trade execution parameter of a VaRbitrage definition. A definition may stipulate if a trade is automatically executed by a VaRbitrage process, and if so, what type of trading decision exists. For example, one VaRbitrage definition may stipulate that VaRbitrage opportunities associated with lending a deliver currency and borrowing a receive currency can trigger an automated trade execution; while another VaRbitrage definition may stipulate the same trade decision is subject to manual review before a trade is executed outside of a VaRbitrage process.

In step 2902, a VaRbitrage process may check to see if a VaRbitrage definition is configured to trigger an automated trade execution. If so, a VaRbitrage process checks in step 2903 if there is a trading decision based on a VaRbitrage opportunity. If this check is verifiable as well, step 2904 may execute a trade based on a VaRbitrage opportunity decision. If an arbitrage opportunity is not revealed, but a VaRbitrage definition is still configured to execute a trade, action may be taken in step 2905 utilizing an alternative market currency. This alternative market currency may include any local markets' currencies, cross currencies, and the base market's currency, in accordance with some embodiments of the present invention.

In step 2906, an ACK/NAK notification may be sent to third-party organizations to report a processing status of a VaRbitrage calculation and trading decision. If a VaRbitrage definition is not configured to execute a trade automatically, as noted in step 2902, an ACK/NAK notification may include the details of a VaRbitrage trade, which may occur, based on manual review and approval. Otherwise, if a trade is executed automatically, an ACK/NAK notification from step 2906 may give the processing status of an executed trade.

Process Flow—Trade Execution

Figure 30:
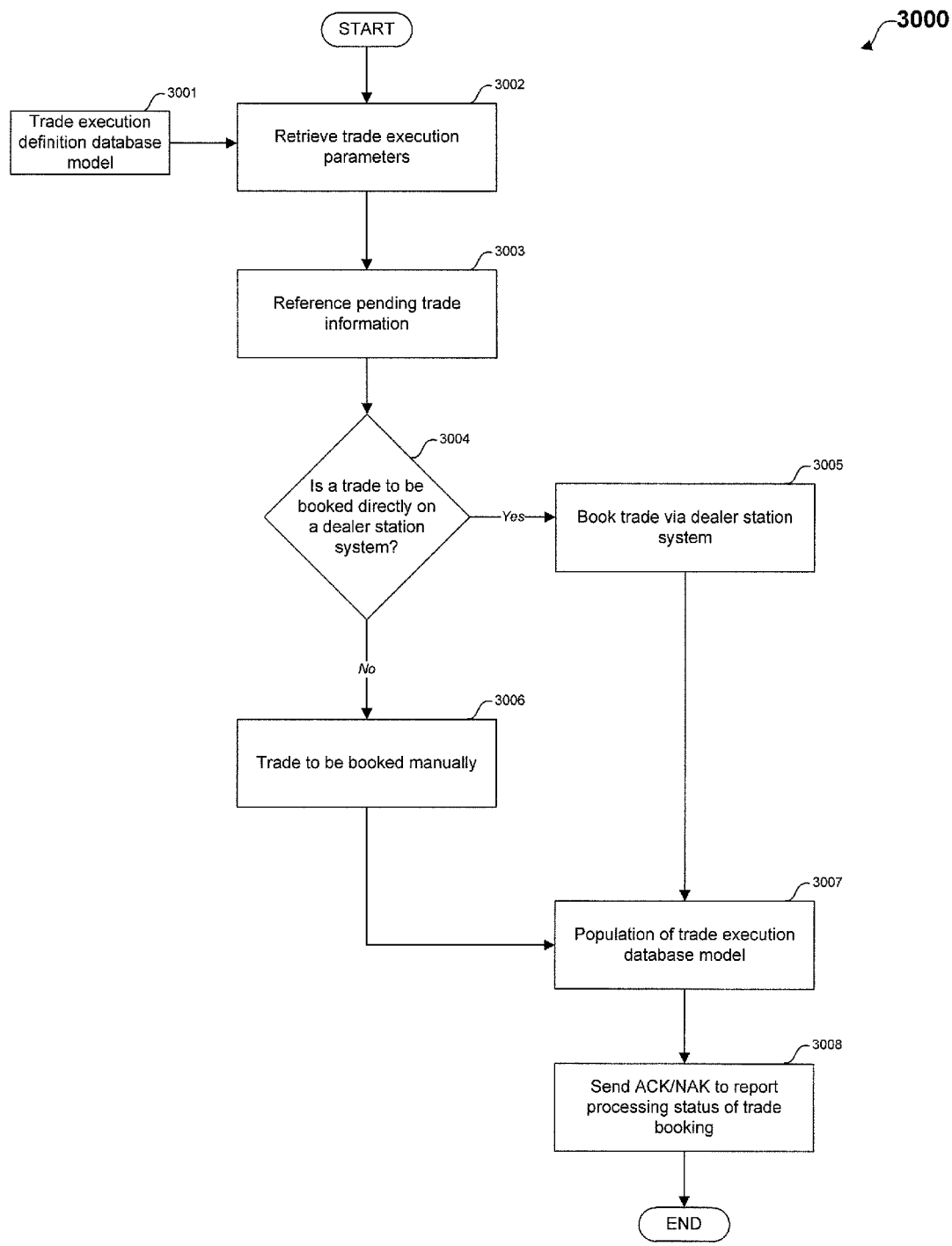
FIG. 30 is block diagram of an exemplary trade execution process in accordance with embodiments of the present invention.

Some embodiments of the present invention may execute trade orders with various dealers. The types of trades that may be executed may include, but are not limited to, arbitrage trading activity. FIG. 30 is an illustrative example of a trade execution technology solution.

In step 3001, a trade execution definition may be used to retrieve pertinent trade execution parameters during step 3002. These parameters may include, but are not limited to, a trade dealer identifier and the type of trades that may be executed for a particular trade dealer definition. Next, a trade execution process may reference pending trade information in step 3003. By way of example, and not restriction, this information may originate from another technology solution such as a VaRbitrage process in order to execute an arbitrage opportunity trading decision.

In step 3004, an exemplary trade execution process checks if the trade may be executed directly on a dealer station system. If so, trade information may be sent to a dealer station system in step 3005. For this step, a trade may be executed in real-time to avoid any bottlenecks in trade processing. The dynamics of a dealer station system may determine how step 3005 is executed. Some embodiments may send trade information using an output data process. If a trade may not to be executed directly through a dealer station system, a trade execution process may go to step 3006 in order to have a trade executed manually.

In step 3007, a trade execution database model may be populated with trade information. If a trade is outstanding because it may still need to be executed manually, as noted from step 3006, a trade execution database model may be updated accordingly. In step 3008, an ACK/NAK notification may be sent to third-party organizations to report a status of a trade—this may include, but is not limited to, the status of a pending trade and a real-time trade execution.

Process Flow—Pricing Model

Some embodiments may handle a pricing methodology, which may be useful to understand how best to structure and price ROSESeries ABS. Potential revenue sources include, but are not limited to, a pricing spread on a purchase and sale agreement; and deferred income from investment operations. Such pricing methodology may be guided by, but is not limited to, opportunity costs between global investors and an SPV. Under the current tax reclamation process, global investors wait for tax reclaims to be collected from foreign government tax authorities with no consideration for the effect of inflation or time value of money on their tax reclaim assets. Therefore, in order to overcome the opportunity costs that exist within the current methodology of tax reclaim collection, ROSES has estimated its pricing model may be guided by, but is not restricted to, the general market inflationary rate.

Figure 31:
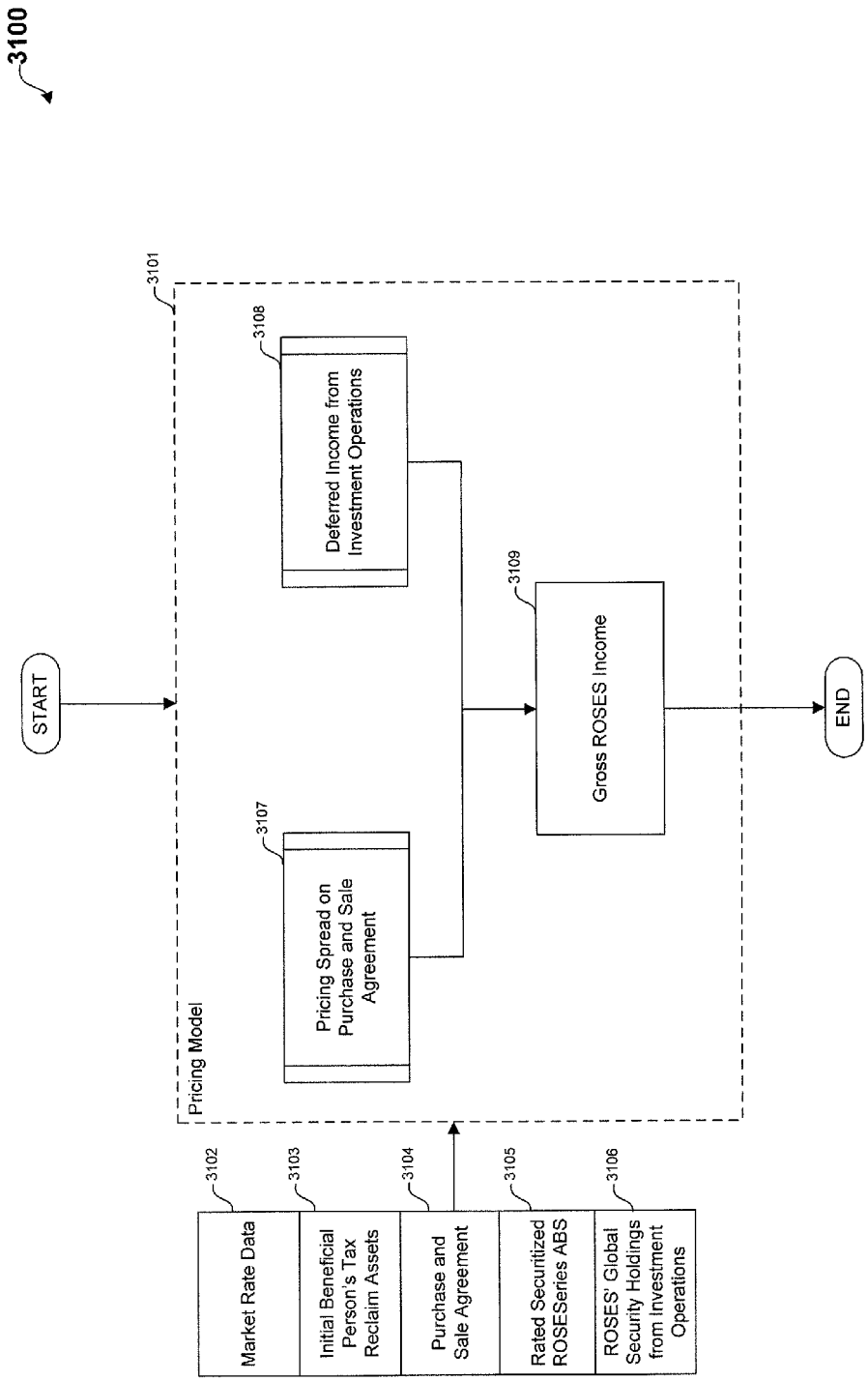
FIG. 31 is an exemplary block diagram of components comprising of a Pricing Model.

FIG. 31 is an illustrative example of a Pricing Model with its potential revenue sources and inputs in more detail. Step 3101 may represent a Pricing Model itself with inputs including, but not limited to, market rate data (step 3102); an initial beneficial person's tax reclaim assets (step 3103); a purchase and sale agreement between an initial beneficial person and an SPV (step 3104); rated securitized ROSESeries ABS (step 3105); and global security holdings from investment operations (step 3106). These inputs may support components of a Pricing Model, which may include, but are not restricted to, a pricing spread on a purchase and sale agreement (step 3107), which is illustrated in more detail in FIG. 32; and deferred income from investment operations (step 3108), which is illustrated in more detail in FIG. 33 and FIG. 34. Amounts from components of a Pricing Model may be summed in step 3109 to represent a gross ROSES income.

Process Flow—Pricing Spread on Purchase and Sale Agreement

A pricing spread revenue source may occur when an initial beneficial person sells its tax reclaim assets to an SPV, per the terms and conditions of a purchase and sale agreement, as illustrated in step 207, FIG. 2. During the negotiations of a purchase and sale agreement, current and historical market inflationary rates may act as guides for selecting a ROSES discounted rate for the purchase and sale agreement relative to current market conditions and other market indexes (i.e. US Treasury, libor, etc). A ROSES discounted rate may be used to price the sale of tax reclaim assets from an initial beneficial person to an SPV. A ROSES discounted rate may also be referred to as a purchase and sale agreement discounted rate. In addition, a purchase and sale agreement may establish floor and cap values for an agreed ROSES discounted rate.

Figure 32:
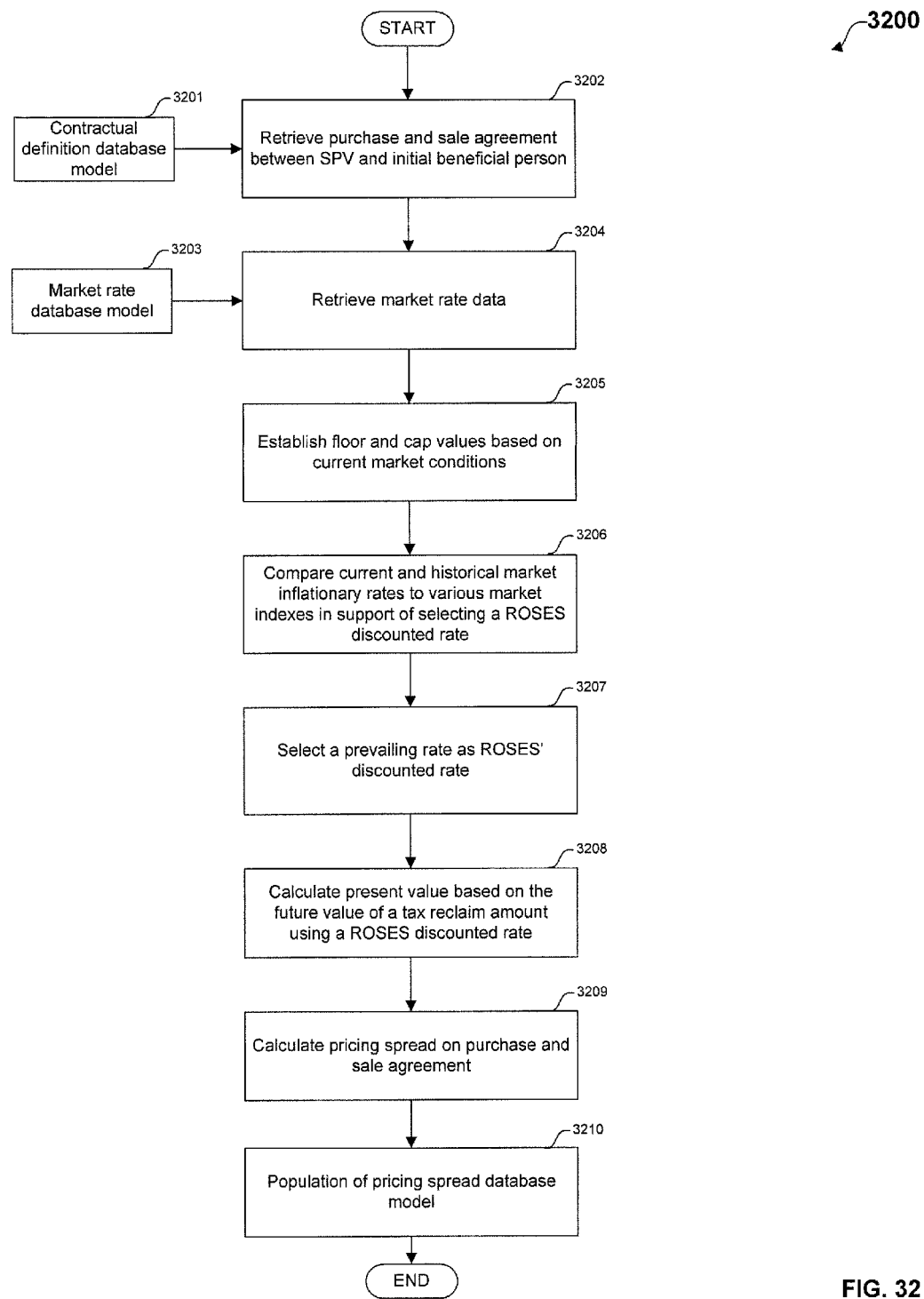
FIG. 32 is a block diagram of how a pricing spread on a purchase and sale agreement may be calculated.

FIG. 32 illustrates some embodiments of a pricing spread on a purchase and sale agreement. In step 3202, a purchase and sale agreement may be retrieved from a contractual database model (step 3201), where such a database model is illustrated in more detail in model 4001, FIG. 40. In step 3204, market rate data may be retrieved from its respective database model in step 3203. Information collected in steps 3202 and 3204 may be used to establish the current floor and cap values for an agreed ROSES discounted rate based on market conditions, as noted in step 3205. While floor and cap values are noted in a purchase and sale agreement, it's the current market conditions at each time when tax reclaims are purchased by an SPV from an initial beneficial person which may set the actual floor and cap values. The floor and cap values may be reset on a periodic basis and may only affect future tax reclaim purchases by an SPV. Examples of periodic basis values include, but are not limited to, weekly, monthly, quarterly, and annually.

Once current floor and cap values are established, the current and historical market inflationary rates may be compared against various market indexes in step 3206 to result in the selection of ROSES' discounted rate per step 3207.

In step 3208, a present value based on the future value of a tax reclaim amount may be calculated using a selected ROSES discounted rate and the following exemplary formula:

$$PV = \frac{FV}{(1+R)^N}$$

PV=present value in N period
FV=future value in N period
R=ROSES discounted rate
N=number of years or periods In step 3209, a pricing spread may be calculated using the following exemplary formula:

$$\text{Spread} = \frac{FV - PV}{m}$$

m=number of times in an N period

In step 3210, a pricing spread database model, as illustrated in more detail in model 5201, FIG. 52, may be populated.

Process Flow—Deferred Income from Investment Operations

Figure 33:
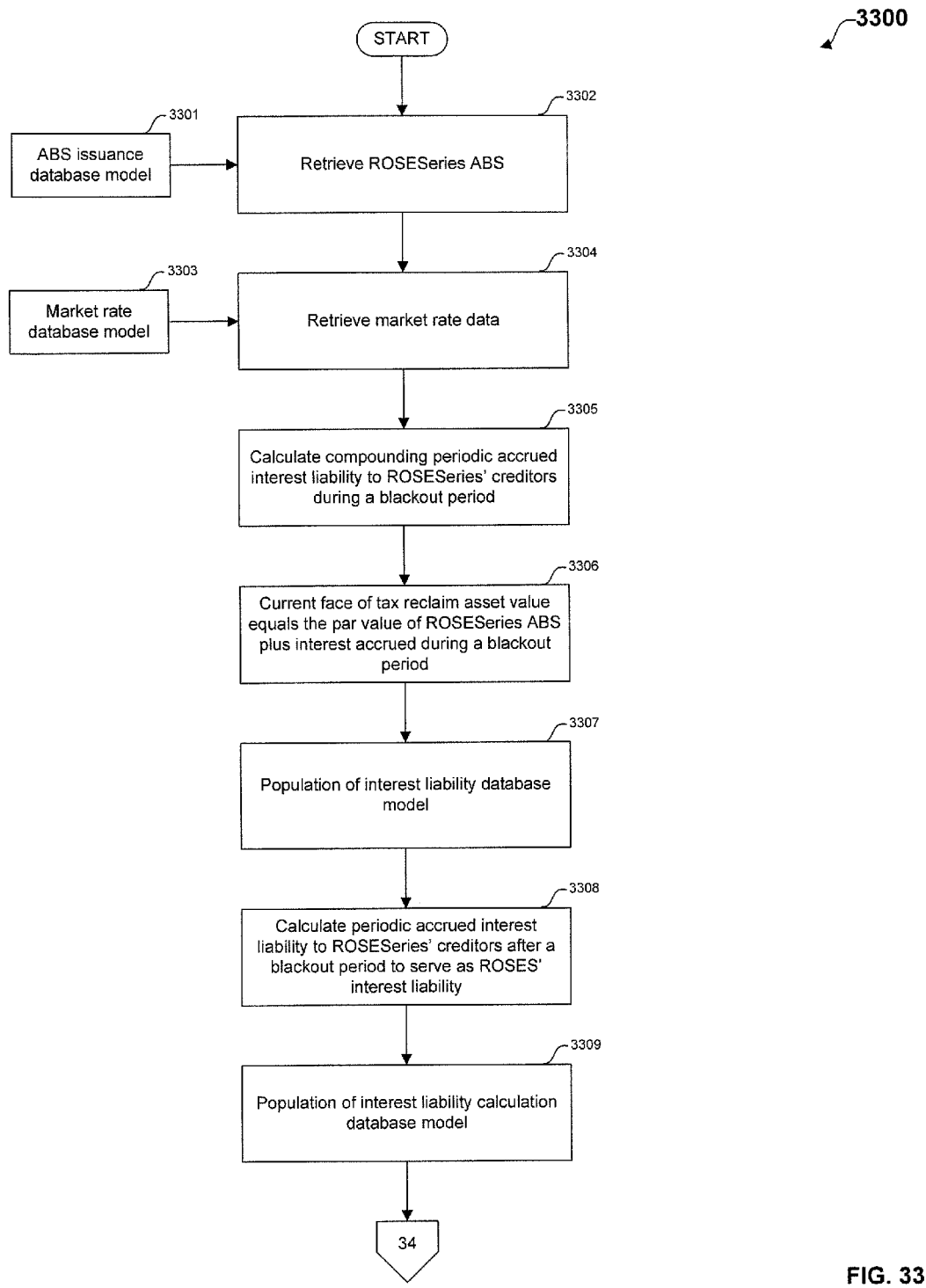
FIGS. 33 and 34 are illustrative examples of how deferred income from investment operations may be calculated as a component of a Pricing Model.
Figure 34:
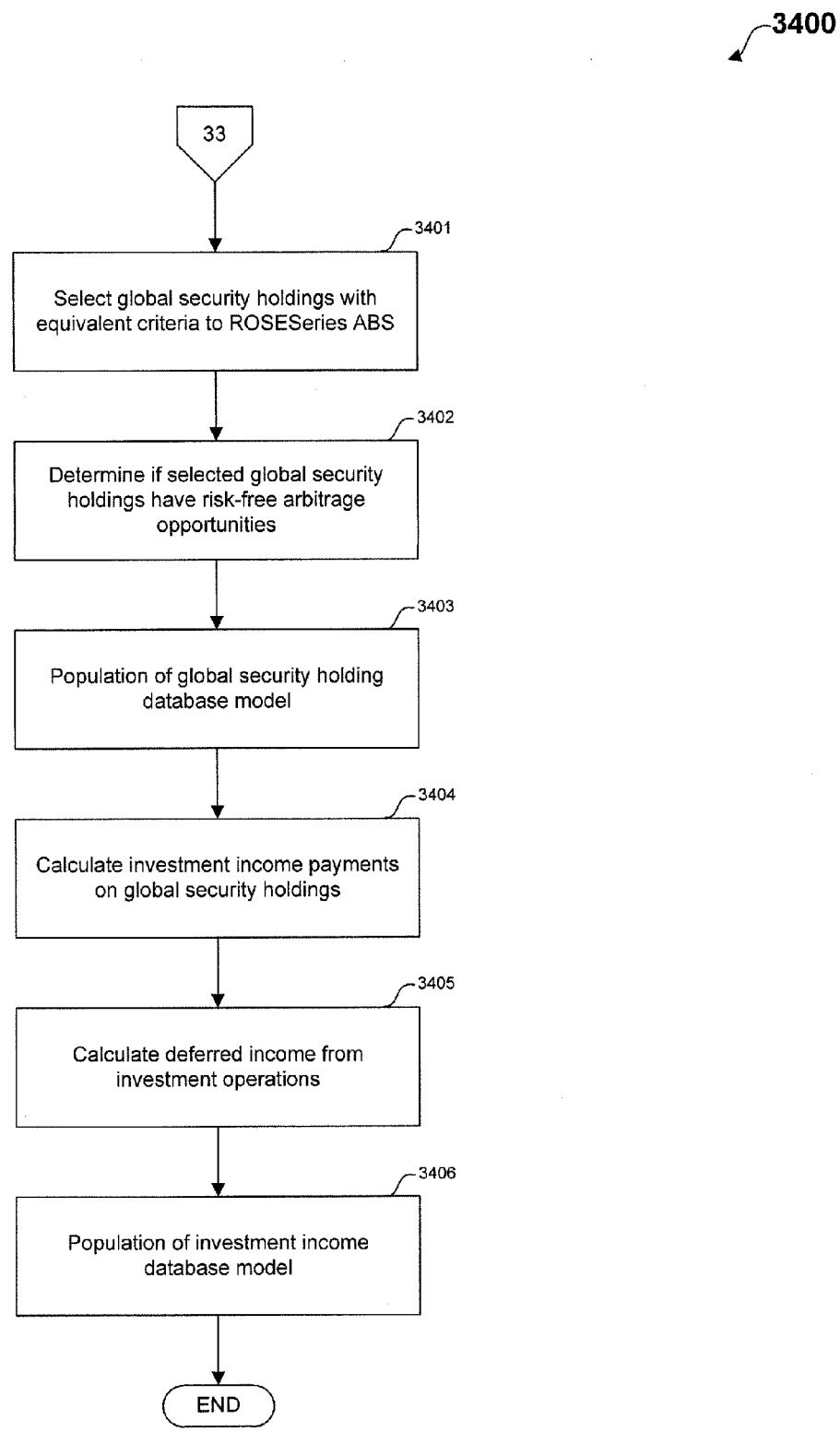

For some embodiments, deferred income may be closely aligned with the system's global investment performance and core investment operational modeling. Such investment operation modeling may be designed to take advantage of interest rate differentials that may exist within jurisdictional tax markets, including but not restricted to, North America, European Union, Greece, and Spain. Interest rate differentials may be executed using risk-free arbitrage opportunities in order to maximize profit and minimize risk with risk-free arbitrage trades. Arbitrage trades may be executed when the certainty of risk-free profits exist. FIG. 33 and FIG. 34 are illustrative examples of how deferred income from investment operations may be derived in support of a Pricing Model.

In step 3302, attributes of securitized ROSESeries ABS are retrieved from an ABS issuance database model in step 3301. An ABS issuance database model is illustrated in more detail in model 4702, FIG. 47. Such attributes include, but are not limited to, blackout period, investment rating, and maturity date. In step 3304, market rate data retrieved from step 3303 may be used to support interest rate differential calculations culminating to a deferred income from investment operations.

In step 3305, a blackout period may be one of the many inputs used to calculate a compounding periodic accrued interest liability, which may be owed to ROSESeries' creditors during a blackout period. A blackout period may be used to accommodate statutes of limitations outlined in various double taxation treaties, which govern time limits for filing tax reclaims with concerned foreign government tax authorities. In addition, a blackout period may be used to file and collect the assigned tax reclaim assets and potentially invest these assets in order to accrue and pay ROSESeries ABS coupon payments to creditors.

A compounding periodic accrued interest liability during a blackout period may be calculated using the following exemplary formula:

$$FV = PV * \left(1 + \frac{R}{m}\right)^{mN}$$

Interim compounding interest periods during a blackout period, include but are not limited to, monthly, quarterly, semiannually, or annually. Selection of an appropriate interim compounding interest period may be based on prevailing market conditions. After a blackout period, a new current face value of tax reclaim assets, as noted in step 3306, may be used for subsequent ROSES coupon payments until maturity. This current face value may equal the par value of ROSESeries ABS plus interest accrued during a blackout period. In step 3307, an interest liability database model, as illustrated in more detail in model 5202, FIG. 52, may be populated.

With a new current face value, a periodic accrued interest liability, representing a ROSES' interest liability, may be calculated in step 3308. This amount may not have a compounding interest component since it is after a blackout period. ROSES interest liability may be paid to ROSESeries creditors at periodic times including, but not limited to, monthly, quarterly, semiannually, or annually. ROSES interest liability may be calculated using the following exemplary formula, where "Basis" may equal, but is not restricted to, 30/360, 30/365, and Actual/Actual:

$$ROSES \text{ Interest Liability} = \frac{\text{Current Face} * \text{Rate}}{\text{Basis}} * \text{Number of Accrued Days}$$

Rate=ROSES coupon rate as stored in ABS issuance database model (model 4702, FIG. 47)

In step 3309, an interest liability calculation database model (5203, FIG. 52) may be populated with a ROSES interest liability value.

Step 3401, FIG. 34 covers some embodiments of the present invention's investment program based on interest rate differentials between ROSESeries coupon liability and investment activities in global security holdings. Global securities may be selected based on various criteria that may identify their equivalency to ROSESeries ABS' security attributes including, but not limited to, investment grade ratings, coupon rates, issuance and trading in major currencies, and maturity periods.

In step 3402, selected global securities may be reviewed to determine if they have risk-free arbitrage opportunities. The following exemplary formula may be used to determine if such opportunities exist:

1. IF $R_{BC} - R_{FC} < \dfrac{Forward_{ask\ rate} - Spot_{ask\ rate}}{Spot_{ask\ rate}}$ Borrow a base currency and lend a foreign currency $$2. \text{ IF } R_{BC} - R_{FC} < \frac{Forward_{ask\ rate} - Spot_{ask\ rate}}{Spot_{ask\ rate}}$$

Borrow a foreign currency and lend a base currency
$R_{BC}$=interest rate in base currency (includes, but not limited to, USD—ROSESeries coupon rate)
$R_{BC}$=interest rate in foreign currency (global security coupon rate)
$Forward_{ask\ rate}$=forward exchange rate between base currency and foreign currency
$Spot_{ask\ rate}$=spot exchange rate between base currency and foreign currency In step 3403, a global security holding database model (5204, FIG. 52) may be populated.

When risk-free arbitrage opportunities are identified, investment income payments on global security holdings may be calculated in step 3404 using the following exemplary formula, where "Basis" may equal, but is not restricted to, 30/360, 30/365, and Actual/Actual:

$$\text{Investment Income Payment} = \frac{Par * Rate}{Basis} * \text{Number of Accrued Days}$$

In step 3405, a deferred income from investment operations may be calculated by subtracting ROSES' interest liability, as calculated in step 3308, FIG. 33 from investment income payments on global security holdings, as calculated in step 3405. In step 3406, an investment income database model (5205, FIG. 52) may be populated.

Process Flow—Multilingual Processing

The technological solutions of some embodiments may handle multilingual processing for languages including, but not limited to, English, German, Spanish, French, and Italian. Technological solutions that may retrieve data for users, receive inbound data, and create outbound data may accept information in any language, translate to any required language, and store information in its original language character format within any exemplary database model. A language translator tool may be responsible for providing language-translating functionality, according to some aspects of the present invention. In addition, a third-party language translation tool may be used, according to some aspects of the invention.

Figure 35:
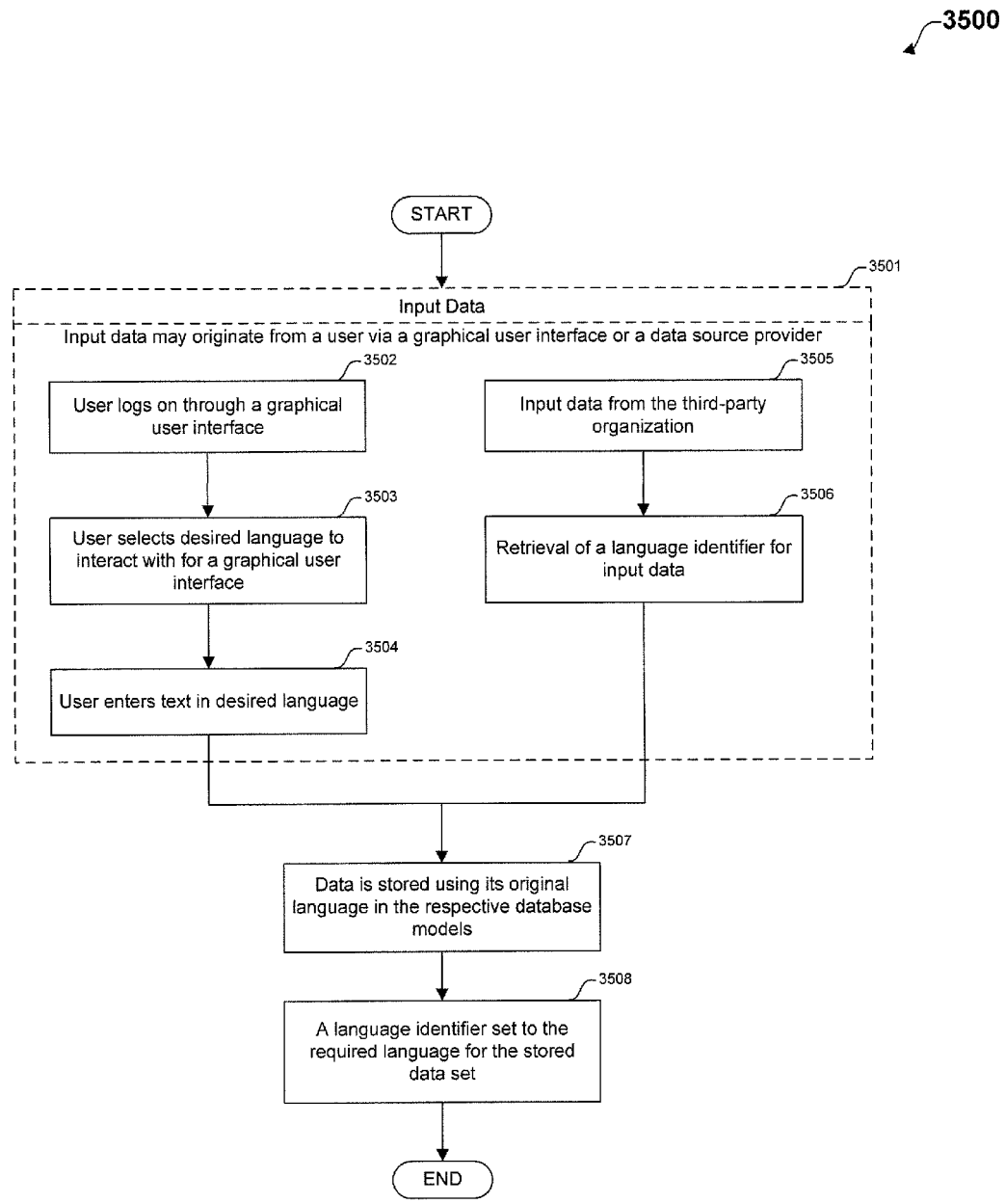
FIGS. 35 and 36 are illustrative examples of multilingual processing in accordance with some aspects of the present invention.
Figure 36:
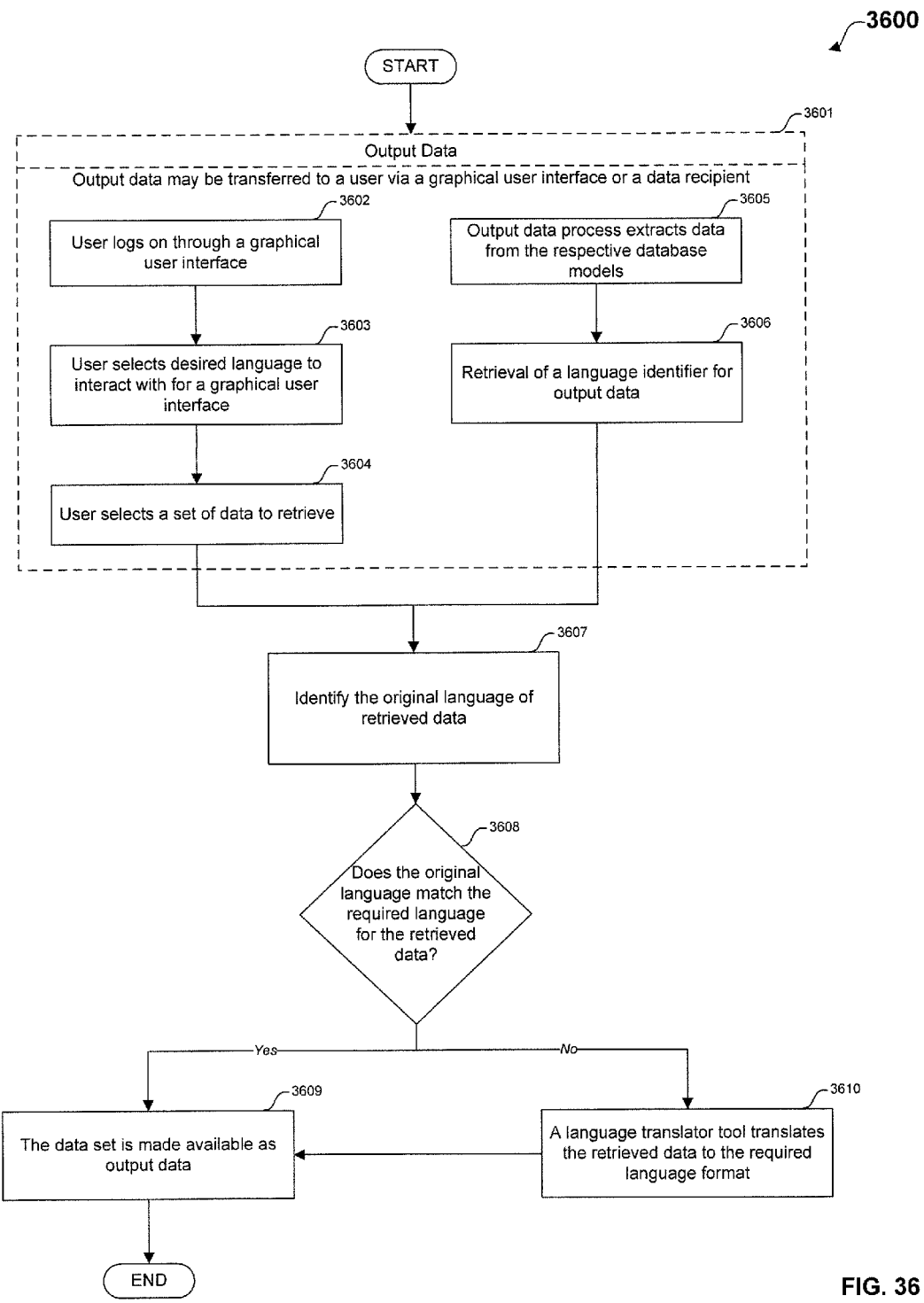

FIG. 35 and FIG. 36 are illustrative examples of the multilingual processing of some embodiments of the present invention. FIG. 35 illustrates how input data may be stored in its original language character format with a language identifier denoting which language the data represents. FIG. 36 is an illustrative example of how output data may be translated to the required language using a language translator tool.

Step 3501, FIG. 35 represents input data for some embodiments; and how this data may originate from a user via a graphical user interface of some embodiments; or a data source provider. With the former, a user may log onto a graphical user interface, as noted in step 3502. A user may select his/her desired language in step 3503 from a drop-down list of language options for some embodiments of the present invention. The permissible languages correspond to a list of languages in a language database model (4303, FIG. 43). In step 3504, a user may enter text in his/her desired language. Step 3505 may represents input data from a data source provider right before the data is inserted into database models.

Before input data may be inserted into various database models, a language identifier for the input data, as stored in an interface definition data model (3802, FIG. 38) may be retrieved to denote the language of input data. An inbound language identifier may be retrieved in step 3506 from the interface definition database model.

In step 3507, the data set may be stored in the respective database models using the data set's original language. The original language may correspond to a user's desired language (step 3503) or a language identifier (step 3506), depending on the source of the input data. Next, in step 3508, a language identifier may be set to correspond to the original language selection. This identifier may be used by some embodiments to identify which language to translate from when the time comes to extract the data set.

Multilingual processing for outbound data may work in a similar way as described above for inbound data, according to some aspects of the present invention. In step 3601, FIG. 36 output data may be retrieved from various database models. To identify what data to retrieve, a user may log onto a graphical user interface of some embodiments of the present invention, as noted in step 3602; or an output data process may be used to extract data, as noted in step 3605.

With the former method in step 3602, a user may log onto a graphical user interface of some embodiments of the present invention; and in step 3603 a user may select his/her desired language from a drop-down list of language options for some embodiments of the present invention. In step 3604, a user may select a set of data to retrieve from various database models. In step 3605, an output data process may extract data from various database models, as illustrated earlier in step 2006, FIG. 20. Next in step 3606, the language identifier of an output data's corresponding interface definition may be retrieved from an interface definition database model to denote the required language to translate output data.

In step 3607, the original language of retrieved data may be identified. In step 3608, the original language may be compared to the required language to determine if a language translation is necessary. If the two languages match, no translation is required and the retrieved data set may be made available as output data in step 3609. Otherwise, a language translator tool of some embodiments of the present invention may translate the retrieved data from its original language to the required language format in step 3610.

Process Flow—Network Topology

Figure 37:
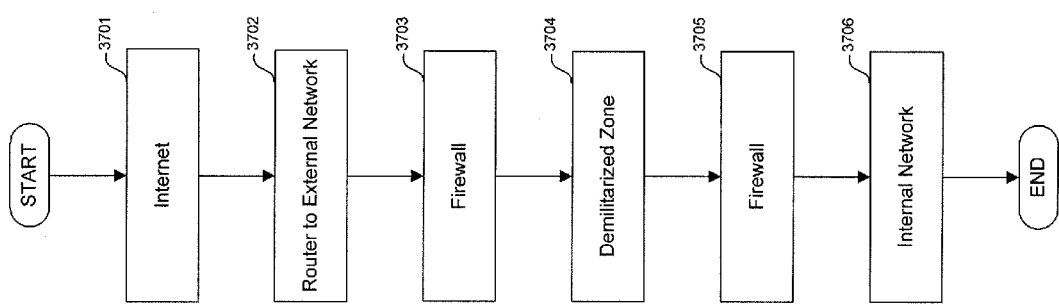
FIG. 37 is an exemplary block diagram of a network topology for the technology comprising embodiments of the present invention.

Technological solutions of some embodiments may be designed to send and receive information through the Internet or another network(s). FIG. 37 is an illustrative example of a network topology for some embodiments. This network topology may be utilized to ensure communications through various technological transport mechanisms are done in a secure and efficient manner.

In step 3701, data may be sent through the Internet and received by a router, as noted in step 3702. A router may be used as a bridge between an external network and an internal network in accordance with some embodiments. A router may also be used to determine the best path to transfer information to and from an external network to an internal network, according to some aspects of the present invention. In step 3703, a firewall may be used by some embodiments to prevent unauthorized access to and from an internal network. Some embodiments may utilize a hardware and/or software firewall to provide extended security. In step 3704, some embodiments may utilize a Demilitarized Zone (DMZ) to act as an additional protective buffer between external and internal networks. Servers in the DMZ may include, but are not limited to web servers, reverse proxy servers, Domain Name System (DNS), and email servers. An exemplary DMZ ensures Internet-facing devices that process direct Internet traffic are separated from devices that do not process direct Internet traffic. For an extra layer of network security, a second firewall may be established in step 3705 to segregate a DMZ from an internal network.

An internal network, as illustrated in step 3706, may contain various computer devices, which may be used to support some embodiments of the present invention. These devices may include, but are not limited to, employee PCs, printers, faxes, copiers, file servers, and internal web servers used for a local Intranet. An internal network may also contain various application and database servers, which may be used as hardware components that may house the technological solutions for some embodiments of the present invention. Some embodiments of the present invention may include multiple server regions, but are not restricted to, development, user acceptance testing, client user acceptance testing, performance, production, high availability, and disaster recovery. The latter two regions, high availability and disaster recovery, may be established to guarantee the 24-hour/7-days a week uptime of the technological solutions of some embodiments of the present invention.

Steps 3701-3706 may be reversed to represent the process flow of data from an internal network to the Internet, in accordance with some embodiments of the present invention.

Database Model—Data Process

Database model 3801, FIG. 38 is an illustrative example highlighting the storage of data process information. This database model may be utilized by input and output data processes to determine how to handle inbound and outbound data, respectively.

For a data process database model, a field 3801.1 may be used to store the unique identifier of a data process, which may be used by various technology solutions for referential purposes. A field 3801.2 may be provided to store the full name of a data process; a field 3801.3 for the description of a data process entry; and a field 3801.4 to distinguish inbound and outbound data processes. Field 3801.5 may be used to store additional information related to a data process database model.

Database Model—Interface Definition

In addition to some system/method embodiments having the capability to launch multiple instances of a data process, a single data process may be configured to process multiple data files. Each data file may be treated as a single interface definition. For some embodiments of the present invention, a term "interface definition" may be used to distinguish a unique inbound or outbound data file. Database model 3802, FIG. 38 illustrates exemplary fields associated with an interface definition database model.

For an interface definition database model, a field 3802.1 may be provided for the unique identifier reference for an interface definition. An interface definition database model may include a field 3802.2 to identify which data process is responsible for loading or extracting data for an interface definition. A foreign key relationship (FK1) may exist to link multiple interface definitions to a single data process identifier within database model 3801, FIG. 38. An interface definition database model may also include a field 3802.3 for the full name of an interface definition; and a field 3802.4 for an interface definition description.

An interface definition database model may provide a field 3802.5 to identify the transport mechanism (e.g. MQ, Connect:Direct, SFTP, SWIFT Network, etc.) for a particular definition; and a field 3802.6 for a transport location, such as, but not limited to, a queue name for MQ or a file system directory. A field 3802.7 may be provided to connect an interface definition with its transform handler identifier. A foreign key relationship (FK2) may exist to link an interface definition to a transform handler, which is defined in a transform handler database model (3803, FIG. 38). A transform handler may contain specific data processing instructions for inbound and outbound data. A field 3802.8 may exist in an interface definition database model to identify which encryption algorithm may be used to encrypt or decrypt data, depending on the inbound or outbound direction of an interface definition.

A field 3802.9 may be used to identify a third-party organization responsible for creating or receiving the data. An interface definition database model may include a field 3802.10 to identify the language of the data. A field 3802.11 represents additional fields that may be included in an interface definition database model for more information.

Database Model—Transform Handler

Step 907, FIG. 9 introduced the concept and exemplary usage of a transform handler. Database model 3803, FIG. 38 illustrates a transform handler database model that may be referenced during the transform function of an input or output data process. A transform handler database model may include a field 3803.1 for a transform handler's unique identifier; a field 3803.2 for the full name of a transform handler; a field 3803.3 for a transform handler description; a field 3803.4 for a transform handler's file name; and a field 3803.5 for additional information that may be housed in a transform handler database model, according to some embodiments. Embodiments of the present invention may leverage any file format to define transform handlers including, but not limited to, CSV, TXT, and XML.

Database Model—Rule

Technology solutions associated with some embodiments may include various processing rules that may be applied during runtime, including, but not restricted to input data processes, output data processes, and interface definitions. Such rules may include, but are not limited to, start and stop times, threshold settings, directory locations, and instructions for error handling. A rule database model (3804, FIG. 38) may be used to store various processing rules. A field 3804.1 may be used to link a rule to its respective technology solution. For example, if a rule is linked to a data process, the value in field 3804.1 may correspond to data process unique identifier from field 3801.1, FIG. 38.

Fields 3804.2-3804.6 may define unique characteristics of a rule. Field 3804.2 gives the full name of a rule; and field 3804.3 gives a description of a rule. Since multiple rules may be associated with a particular technology solution, field 3804.4 may state in what order a rule is applied. A rule's keyword and value may be stored in fields 3804.5 and 3804.6, respectively. By way of example and not restriction, a rule may state a particular data process runs every day at 7:00 amEST. For this example, the rule's keyword would be "start_time" and the rule's value would be "7:00 amEST". Field 3804.7 may be used to store additional information in conjunction with a rule database model.

Database Model—Initial Beneficial Person

Database model 3805, FIG. 38 is an illustrative example of an initial beneficial person database model, according to some implementations. In turn, this database model may serve as a master inventory of all initial beneficial persons that take advantage of the system and method of pooling, securitizing, and trading tax reclaim assets, in accordance with some embodiments.

By way of example and not limitation, an initial beneficial person database model may include a field 3805.1 for the unique identifier of an initial beneficial person; a field 3805.2 for the full name of an initial beneficial person; a field 3805.3 for the description of an initial beneficial person; a field 3805.4 for the unique identifier of an initial beneficial person's global custodian bank; a field 3805.5 for an initial beneficial person's country of residence; and a field 3805.6 for an initial beneficial person type code. An initial beneficial person type code may represent what type of entity an initial beneficial person is such as, but not limited to, a pension fund, non-profit organization, individual, or corporate entity. FK3 may represent a foreign key relationship that may link an initial beneficial person type code from an initial beneficial person database model to the details of a type code in an initial beneficial person type database model (3806, FIG. 38).

Some embodiments may use a contact information database model (3902, FIG. 39) to store the contact information of initial beneficial persons and third-party organizations. An initial beneficial person database model may include a field 3805.7 to identify the contact information for an initial beneficial person's point of contact. FK4 may represent a foreign key relationship between exemplary contact information and initial beneficial person database models.

An initial beneficial person database model may also include a field 3805.8 to identify an initial beneficial person's contract for using the system and methodology of some embodiments of the present invention. FK5 may be used as a foreign key relationship linking an initial beneficial person's contract identifier to a contract's details within a contractual definition database model (4001, FIG. 40).

For some embodiments, data from multiple languages may be stored in database models. To identify the language of data record, a language identifier may be added as a field to a database model. Field 3805.9 is an example of a language identifier stored in an initial beneficial person database model. A field 3805.10 may be used to store additional initial beneficial person information that may be required in accordance with some embodiments.

Database Model—Initial Beneficial Person Type

As mentioned above, an initial beneficial person type may denote the structure of an initial beneficial person's organization. Each data source provider, such as but not limited to an initial beneficial person, global custodian bank, and credit rating agency, may have different classifications of organization structures. An exemplary initial beneficial person type database model may be used to match the organization structure classifications of a data source provider with defined organization structures of some embodiments. Consequently, tax reclaim assets from various data source providers may be subjected to consistent consideration for an organization structure, in accordance with some embodiments.

An initial beneficial person type database model may include a field 3806.1 for an initial beneficial person type code; a field 3806.2 for the full name of an initial beneficial person type code; and a field 3806.3 for a corresponding description of an initial beneficial person type code. An initial beneficial person type database model may also include a field 3806.4 for additional information.

Database Model—Third-Party Organization Initial Beneficial Person Type

Different data source providers including, but not limited to, initial beneficial persons and global custodian banks, may categorize initial beneficial person entities in different ways. For example, two data source providers may use different categorizations for initial beneficial persons who are non-profit organizations. One data source provider may break down non-profit organizations into separate categories such as "charity", "foundation", and "religious organizations".

Another data source provider may not take such a granular approach, instead opting to group all such entities into one "non-profit organization" category. Implementation of some aspects of the disclosed system and method concepts may request initial beneficial person type information from data source providers in order to treat different initial beneficial persons in a consistent manner across different organizations.

A third-party organization initial beneficial person type database model (3901, FIG. 39) may be used to store initial beneficial person categorizations for various data source providers. Such a database model may include a field 3901.1 for a third-party organization's initial beneficial person type code; and field 3901.2 identifying the third-party organization that supplied an initial beneficial person type code. This third-party organization may be an initial beneficial person, as identified in an initial beneficial person database model (3805, FIG. 38), or a third-party organization, as identified in a third-party organization database model (3903, FIG. 39).

A third-party organization initial beneficial person type database model may also include a field 3901.3 indicating which initial beneficial person type code, as categorized by some embodiments of the present invention, match the initial beneficial person type code of a third-party organization. FK6 may serve as a foreign key relationship linking a third-party organization initial beneficial person type database model with an initial beneficial person type code database model (3806, FIG. 38).

A third-party organization initial beneficial person type database model may provide a field 3901.4 for the full name of an initial beneficial person type code; a field 3901.5 for a description of the type code; a field 3901.6 to indicate which language a data record is; and a field 3901.7 for any additional information related to a third-party organization's initial beneficial person types.

Database Model—Contact Information

As mentioned in earlier text, a contact information database model, 3902, FIG. 39, may be used to store the contact details of an initial beneficial person and third-party organization. Such details include, but are not limited to phone number and email address.

A contact information database model may provide a field 3902.1 to distinguish unique data records. This may be used by other database models to identify a particular contact. A contact information database model may also provide a field 3902.2 for a contact's organization type (e.g. initial beneficial person or third-party organization); and a field 3902.3 to link the contact to an organization identifier. In addition, a contract information database model may include a field 3902.4 for a contact's full name; a field 3902.5 for a contact's phone number; a field 3902.6 for an email address; and a field 3902.7 for a contact's mailing address. A field 3902.8 may also be provided for any additional contact information.

Database Model—Third-Party Organization

Third-party organization data may be stored in an exemplary third-party organization database model (3903, FIG. 39), in accordance with some embodiments. A third-party organization database model may give the details of a third-party organization, including its full name, organizational type, and contract reference. The types of third-party organizations stored in this database model may include, but are not limited to, global custodian banks, underwriters, legal counsel, credit rating agencies, and trade dealers.

The corresponding database model may include a field 3903.1 for the unique identifier of a third-party organization, which may be used as a point of reference throughout some embodiments of the present invention; a field 3903.2 for a third-party organization's full name; a field 3903.3 for a description of the third-party organization; and a field 3903.4 for a third-party organization type code. A foreign key relationship, as noted by FK7, may be used to link field 3903.4 to type code details in a third-party organization type database model (3904, FIG. 39).

A field 3903.5 may be used to store a third-party organization's contact identifier. FK8 may represent a foreign key relationship linking a third-party organization's contact identifier to a contact information database model. A field 3903.6 may also be provided to reference a contract negotiated with a third-party organization. FK9 may be provided to link a unique contract identifier for a third-party organization with a contract's details in database model 4001, FIG. 40. A third-party organization database model may also include a field 3903.7 for any additional information pertaining to a third-party organization.

Database Model—Third-Party Organization Type

With so many third-party organizations involved in the system and methodology of pooling, securitizing, and trading tax reclaim assets, in accordance with some embodiments, a third-party organization type database model may be required to distinguish a third-party organization's role as it relates to those embodiments. While an exemplary third-party organization database model (illustrated in 3903, FIG. 39) stores the details of all third-parties, an accompanying third-party organization type database model may link a third-party name to its organization type (i.e. global custodian bank, underwriter, legal counsel, etc.).

FIG. 39 includes an illustrative example of a third-party organization type database model (3904). This database model may include, but is not limited to, a field 3904.1 for a unique type code identifier; a field 3904.2 for the full name of a third-party organization type; a field 3904.3 for a description; and a field 3904.4 for any additional information pertaining to a third-party organization type as it relates to some embodiments.

Database Model—Contractual Definition

For pooling, securitizing, and trading global and interest tax reclaim assets in accordance with the system and methodology of some embodiments of the present invention, various contractual agreements may be negotiated with numerous parties including, but not limited to, initial beneficial persons, global custodian banks, data source providers for market rate data, rating agencies, and underwriters. A contractual definition database model, as illustrated in 4001, FIG. 40, may be used by some embodiments of the present invention to obtain information about specific contracts.

A contractual definition database model may include a field 4001.1 for a contract unique identifier; a field 4001.2 for the full name of a contract; a field 4001.3 for the description of a contractual definition; a field 4001.4 for a contract's start date; a field 4001.5 for a contract's end date; and a field 4001.6 for an identifier of the counterparty for which a contractual agreement is negotiated with. For example, a counterparty may be an initial beneficial person (as detailed in database model 3805, FIG. 38) or a third-party organization (as detailed in database model 3903, FIG. 39). A contractual definition database model may include a field 4001.7 for a contractual type code, which may distinguish different types of contracts stored in this database model. Such a contractual type code may be defined in a type code database model, as illustrated in 4304, FIG. 43. A field 4001.8 may be used in a contractual definition database model to store any additional contractual information that may be required for some embodiments.

Database Model—Contractual Term

While a contractual definition database model may provide high-level information pertaining to a contract, a contractual term database model (4002, FIG. 40) may contain the detailed terms and conditions of a contract. FK10 is a foreign key relationship that may be used to link a contract, as noted by a contractual definition database model (4001, FIG. 40), to its detailed terms and conditions in a contractual term database model.

A contractual term database model may include a field 4002.1 to link contract terms to a particular contract. A contractual term database model may also include a field 4002.2 for a term sort identifier to identify which order a contractual agreement's terms should be applied. In addition, A contractual term database model may provide a field 4002.3 for a contract term's keyword; and a field 4002.4 for a contract term's value. A field 4002.5 may be provided for additional contractual information.

Database Model—Tax Reclaim History

As noted in earlier text, some embodiments may use historical tax reclaim records to understand an initial beneficial person's historical tax reclaim activity. Historical tax reclaim records may be stored in a tax reclaim history database model (4003, FIG. 40).

By way of example and not limitation, some embodiments of such a database model for historical tax reclaim assets may include a field 4003.1 for a tax reclaim asset's unique identifier; a field 4003.2 for a reclaim country of origin, which may reflect any local market; and a field 4003.3 for a fund number. FK11 may used as a foreign key to ensure fund numbers stored in the tax reclaim history database model exist in a fund number database model (4201, FIG. 42). A tax reclaim history database model may provide a field 4003.4 for an initial beneficial person identifier. A foreign key relationship FK12 may be used to link an initial beneficial person identifier field within a tax reclaim history database model to the details of that initial beneficial person within an initial beneficial person database model (3805, FIG. 38). To store information pertaining to an asset's security identifier, a tax reclaim history database model may include a field 4003.5 for a security identifier; and a field 4003.6 to identify the data source of a security identifier.

A tax reclaim history database model may include a field 4003.7 to track the reclaim filing status of an asset. A foreign key, as noted by FK13, may be used to reference the particulars of a reclaim filing status value in a reclaim filing status master database model (4401, FIG. 44). As noted in step 1206, FIG. 12, some embodiments of the present invention may recalculate reclaim amounts in order to verify original tax reclaim data before securitization. In order to store findings of a recalculation process, a tax reclaim history database model may provide a field 4003.8 for a reclaim calculation verified status; and a field 4003.9 for the date a recalculation was performed.

A tax reclaim history database model may include a field 4003.10 for an asset's share quantity amount; and a field 4003.11 for a dividend and interest rate. A field 4003.12 may be included for a gross dividend and interest amount; a field 4003.13 for a net dividend and interest amount; a field 4003.14 for a dividend and interest currency; and a field 4003.15 for a dividend and interest payment date. A field 4003.16 may be provided for a reclaim entitlement amount; a field 4003.17 for the reclaim entitlement currency; a field 4003.18 for a foreign tax amount; a field 4003.19 for a tax withholding rate; a field 4003.20 for a tax treaty rate; a field 4003.21 for a tax reclaim rate; and a field 4003.22 for a tax credit rate. Another field 4003.23 may be provided for an ex-dividend date; a field 4003.24 for a statute of limitations date; a field 4003.25 for a reclaim filing date; and a field 4003.26 for a record date. A tax reclaim history database model may provide a field 4003.27 for a projected reclaim receipt date based on a statistical analysis of an initial beneficial person's historical tax reclaim activity; and a field 4003.28 for a third-party organization's projected reclaim receipt date.

A tax reclaim history database model may be used to store receipt and collected reclaim accounts. Reclaim receipt fields (4003.29-4003.31) may represent receipt information from a foreign tax authority to a global custodian bank. Reclaim collected fields (4003.32-4003.34) may represent how much of a reclaim amount was actually collected by an initial beneficial person from its global custodian bank. In turn, a tax reclaim history database model may provide a field 4003.29 for a reclaim receipt amount; a field 4003.30 for a reclaim receipt currency; and a field 4003.31 for a reclaim receipt date. A tax reclaim history database model may also include a field 4003.32 for a reclaim collected amount; a field 4003.33 for a reclaim collected currency; and a field 4003.34 for a reclaim collected date.

To identify the language used to store a historical tax reclaim record, a field 4003.35 may be used. A tax reclaim history database model may also use a field 4003.36 to store any additional information pertaining to historical tax reclaims.

Database Model—Tax Reclaim Active

While historical tax reclaims may be stored in a tax reclaim history database model (4003, FIG. 40) active tax reclaims, which are candidates for pooling, securitization, and trading in accordance with some aspects of the present invention, may be stored in a separate database model referred to as tax reclaim active (4101, FIG. 41). Storing these two types of tax reclaim assets in separate database models may help to ensure tax reclaims that have already been collected are not pooled for securitization.

A tax reclaim active database model may include many of the same fields as a tax reclaim history database model. A tax reclaim active database model may provide a field 4101.1 to distinguish unique tax reclaims; a field 4101.2 for a reclaim country of origin, a field 4101.3 for a fund number, which is linked to a fund number database model (4201, FIG. 42) through a foreign key relationship FK14; and a field 4101.4 for an initial beneficial person identifier, which is linked to an initial beneficial person database model (3805, FIG. 38) through a foreign key relationship FK15.

A tax reclaim active database model may also include a field 4101.5 for the security identifier of an asset; and a field 4101.6 to denote the data provider for a security. A field 4101.7 may be provided to track the reclaim filing status of an asset. This field may be linked to a reclaim filing status master database model (4401, FIG. 44) through a foreign key FK16. If a tax reclaim's calculated values are verified during a tentative portfolio pooling process, as noted in step 1206, FIG. 12, a verification status may be stored in field 4101.8 and a verification date may be stored in field 4101.9. If a reclaim is identified as a candidate for a pooling phase (i.e. tentative portfolio, stamp tranche, and secure tranche), a field 4101.10 may be used to denote a reclaim securitization status. FK17 may be used as a foreign key to link a reclaim securitization status to its details, as stored in a reclaim securitization status database model (4403, FIG. 44).

A tax reclaim active database model may include a field 4101.11 for an asset's share quantity amount; and a field 4101.12 for a dividend and interest rate. A field 4101.13 may be included for a gross dividend and interest amount; a field 4101.14 for a net dividend and interest amount; a field 4101.15 for a dividend and interest currency; and a field 4101.16 for a dividend and interest payment date. A field 4101.17 may be provided in a tax reclaim active database model for a reclaim entitlement amount; a field 4101.18 for a reclaim entitlement currency; a field 4101.19 for a foreign tax amount; a field 4101.20 for a tax withholding rate; a field 4101.21 for a tax treaty rate; a field 4101.22 for a tax reclaim rate; and a field 4101.23 for a tax credit rate. A field 4101.24 may be provided within a tax reclaim active database model for an ex-dividend date; a field 4101.25 for a statute of limitations date; a field 4101.26 for a reclaim filing date; and a field 4101.27 for a record date. A tax reclaim active database model may provide a field 4101.28 for a projected reclaim receipt date based on an applied statistical analysis of an initial beneficial person's historical tax reclaim activity; and a field 4101.29 for a third-party organization's projected reclaim receipt date.

Reclaim receipt fields within a tax reclaim active database model (4101.30-4101.32) may represent receipt information from a foreign tax authority to a global custodian bank. Reclaim collected fields within a tax reclaim active database model (4101.33-4101.35) may represent how much of a reclaim amount was actually collected by an SPV trust from its global custodian bank. In turn a tax reclaim active database model may provide a field 4101.30 for a reclaim receipt amount; a field 4101.31 for a reclaim receipt currency; a field 4101.32 for a reclaim receipt date; a field 4101.33 for a reclaim collected amount; a field 4101.34 for a reclaim collected currency; and a field 4101.35 for a reclaim collected date.

A tax reclaim active database model may include fields 4101.36-4101.41 to track information related to various pooling phases, in accordance with some embodiments of the present invention. If a tax reclaim asset is pooled into a tentative portfolio (as previously illustrated in FIG. 12), a field 4101.36 may be used for a tentative portfolio identifier, as stored in detail in a tentative portfolio database model (4601, FIG. 46). FK18 may serve as a foreign key relationship linking a tentative portfolio identifier from a tax reclaim active database model to an identifier's details within a tentative portfolio database model. If a tax reclaim asset is pooled into a stamped tranche (as previously illustrated in FIG. 13), a field 4101.37 may be provided to store a stamp tranche identifier; and a field 4101.38 for a calculated preliminary discounted value, as noted in step 1306, FIG. 13. If a tax reclaim asset is pooled into a secure tranche (as illustrated in FIG. 18 and FIG. 19), a field 4101.39 may be included to store a secure tranche identifier; a field 4101.40 for an ABS issuance identifier; and a field 4101.41 for a discounted value.

A tax reclaim active database model may provide a field 4101.42 for a language identifier, to denote the language of a data record. A field 4101.43 may also be provided to store any additional information relating to an active tax reclaim asset.

Database Model—Fund Number

A fund number may serve as reference data for an initial beneficial person's investment activity. With a fund number, an organization (e.g. initial beneficial person, global custodian bank, etc.) may group certain assets based on factors such as, but not limited to, investment strategy, type of assets, and country of security issuance. Some embodiments of the present invention may use a fund number to group tax reclaim assets in a manner familiar to an organization such as, but not limited to, an initial beneficial person and global custodian bank. A fund number database model (4201, FIG. 42) may be provided to store fund number information.

Within a fund number database model, a field 4201.1 may be provided for a fund number. A field 4201.2 may also be provided for a portfolio identifier. A portfolio identifier may organize fund numbers into groups based on similarities. FK19 may serve as a foreign key linking a fund number to a portfolio in a portfolio database model (4202, FIG. 42). A fund number database model may also include a field 4201.3 to identify an initial beneficial person that may use a fund number for referential purposes. FK20 may be used as a foreign key relationship to link a fund number to an initial beneficial person identifier in an initial beneficial person database model (3805, FIG. 38). A fund number database model may provide a field 4201.4 for the full name of a fund number; a field 4201.5 for a fund description; a field 4201.6 to identify the language of a data record; and a field 4201.7 for additional information related to a fund number.

Database Model—Portfolio

As previously mentioned, a portfolio identifier may be used to group fund numbers in accordance with some embodiments. A portfolio database model, as noted in 4202, FIG. 42, may include a field 4202.1 for a portfolio's unique identifier; and a field 4202.2 to identify an initial beneficial person identifier, which may use a portfolio to group fund information. A foreign key FK21 may be used to link a portfolio to an initial beneficial person, as detailed in an initial beneficial person database model (3805, FIG. 38). A portfolio database model may include a field 4202.3 for the full name of a portfolio; a field 4202.4 for the description of a portfolio; and a field 4202.5 to identify the language of a data record. Within a portfolio database model, a field 4202.6 may represent additional information about a portfolio.

Database Model—Security Master Identifier

In the financial industry, numerous national and international security identification systems may be used by various organizations to identify a specific security. For example, in some countries such as the US and Canada, a CUSIP (as allocated by the Committee on Uniform Security Identification Procedures) may be the primary security identification system. In other countries, the primary security identification system may be ISIN (International Securities Identification Number as allocated by a country's respective National Numbering Agency). In order to identify a security, regardless of its assigned national or international identification, a security master identifier database model (4203, FIG. 42) may be used to store security identifiers and their related values across multiple identification systems.

A security master identifier database model may include a field 4203.1 for a unique security identifier, in accordance with some embodiments a field 4203.2 for the ISIN representation of a security; a field 4203.3 for the SEDOL (Stock Exchange Daily Official List) value of a security; a field 4203.4 for the CUSIP representation of a security; and a field 4203.5 for the CINS (CUSIP International Numbering System) value of a security. A security master identifier database model may also include a field 4203.6 for a security identifier's country of origin. A field 4203.7 may be provided for a security type code, as detailed in a security master type database model (4204, FIG. 42). A foreign key FK22 may be provided to link a security type code entry in a security master identifier database model to a security master type database model data entry.

A security master identifier database model may also include a field 4203.8 for a security's full name; a field 4203.9 for the description of a security; and a field 4203.10 to identify the data source provider of a security. A field 4203.11 may also be provided for any additional security identifier information that may be used in conjunction with some embodiments.

Database Model—Security Master Type

Similar to the multiple initial beneficial person types which may exist for initial beneficial persons and global custodian banks, disparate systems for classifying security types may exist. In order to establish a consistent classification of security types that is in accordance with some embodiments of the present invention, a security master type database model (4204, FIG. 42) may be used to identify security types consistently in accordance with some aspects of the present invention.

A security master type database model may include, but is not restricted to, a field 4204.1 for a security type code representing some embodiments of the present invention; a field 4204.2 for a security type code name; a field 4204.3 for a security type code description; and a field 4204.4 for additional information with respect to a security type.

Database Model—Third-Party Organization Security Identifier

If a third-party organization uses its own security identification system, a third-party organization security identifier database model (4205, FIG. 42) may be used to store such information. This database model may include a field 4205.1 for a third-party organization's security identifier; and a field 4205.2 for a security identifier which may be defined in a security master identifier database model (4203, FIG. 42). A foreign key relationship FK23 may be used to link a third-party organization's security identifier to other security identification systems, as stored in a security master identifier database model.

A third-party organization security identifier database model may also include a field 4205.3 to identify the third-party organization providing a security; a field 4205.4 for a security's country of origin; and a field 4205.5 to note a security type code, as defined by a third-party organization providing the data record. FK24 may serve as a foreign key relationship linking the security type code from a third-party organization security identifier database model to the details of that type code, as stored in a third-party organization security type database model (4206, FIG. 42).

A third-party organization security identifier database model may provide a field 4205.6 for the name of a security; a field 4205.7 for a description of the security; a field 4205.8 to determine the language of a data record; and a field 4205.9 for any additional information pertaining to a third-party organization's security identifier.

Database Model—Third-Party Organization Security Type

If a third-party organization uses different security type codes than those referenced by some embodiments of the present invention, a third-party organization security type database model (4206, FIG. 42) may be used to store a third-party organization's security type information. This database model may include a field 4206.1 for a third-party organization's security type code; and a field 4206.2 to identify the third-party organization that may have provided a security type. In order to link a security type code referenced by some embodiments of the present invention and a third-party organization's specific security type code, a field 4206.3 may be provided in a third-party organization security type database model. FK25 may serve as a foreign key relationship linking a security master type database model (4204, FIG. 42) with a third-party organization security type database model.

A third-party organization security type database model may also include a field 4206.4 for the name of a third-party organization security type; a field 4206.5 for a description of a third-party organization's security type; a field 4206.6 to identify the language of a data record; and a field 4206.7 for additional security type code information.

Database Model—Investment Rating

As mentioned earlier, ROSESeries ABS may receive investment rating qualifications (from step 305, FIG. 3) when securities undergo ABS structuring by an SPV (step 302, FIG. 3). An investment rating, also commonly referred to as an investment grade, may reflect the level of risk associated with ABS. Investment ratings may be provided by credit rating agencies such as, but not limited to, Standard and Poor's, Moody's, A.M. Best's, and Fitch Ratings. An SPV may select one or multiple credit rating agencies to supply investment ratings for a particular ABS deal structure. An investment rating database model (4301, FIG. 43) may store short-term and long-term credit ratings. Examples of short-term credit ratings include, but are not limited to, Fitch Ratings' "F1+", "F1", "F2", and "F3"; and A.M. Best's "AMB-1+", "AMB-1", "AMB-2", and "AMB-3". Examples of long-term credit ratings may include, but are not limited to, Standard & Poor's "AAA", "AA", "A", and "B" ratings; and Moody's "Aaa", "Aa1", "A1", and "Baa1" ratings.

In addition to investment ratings supplied by various credit rating agencies, a statistical analysis of initial beneficial persons' historical tax reclaim asset activity, performed in accordance with some embodiments of the present invention and illustrated in FIG. 11, may serve as another investment rating system. All investment rating information may be stored in an investment rating database model.

An investment rating database model may include a field 4301.1 for a unique investment rating code (e.g. "AAA", "F1+", "AMB-1+", etc.); a field 4301.2 for the name of a rating; a field 4301.3 for a description of the rating; a field 4301.4 to identify a rating's data source provider; a field 4301.5 to distinguish short-term and long-term ratings; and a field 4301.6 to distinguish investment and non-investment ratings. A field 4301.7 may also be provided in an investment rating database model to identify a data source provider's rating order for investment grades. Such rating orders may include, but are not limited to, "strongest", "outstanding", "satisfactory", "adequate", and "junk".

Fields 4301.8-4301.19 may be provided to understand the risk assignment for a particular investment rating based reclaim parameters such as, but not limited to, fund number, security identifier, and projected reclaim receipt date. An investment rating data source provider may determine which reclaim parameters to apply for a particular investment rating. An investment rating database model may be used to store reclaim parameters as implicit or explicit values. For example, an investment rating database model may include a field that identifies investment ratings based on reclaim countries of origin. One data source provider of investment rating data may assign a particular investment rating to all reclaims from European Union member states. Another data source provider may assign different investment ratings to specific member states of the European Union (i.e. Belgium, Germany, Italy, etc.). A reclaim county of origin parameter field within an investment rating database model may store such implicit and explicit country information.

For reclaim parameters, an investment rating database model may include a field 4301.8 for a reclaim country of origin parameter; a field 4301.9 for an initial beneficial person country of residence parameter; a field 4301.10 for an initial beneficial person identifier parameter; a field 4301.11 for a global custodian bank identifier parameter; and a field 4301.12 for a fund number parameter. Additional fields for an investment rating database model may include a field 4301.13 for an initial beneficial person type code parameter; a field 4301.14 for a security identifier type code parameter; a field 4301.15 for a security identifier parameter; a field 4301.16 for a reclaim filing date parameter formula; a field 4301.17 for a statute of limitations date parameter formula; a field 4301.18 for a projected reclaim receipt date parameter formula; and a field 4301.19 for a third-party organization's projected reclaim receipt date parameter formula.

An investment rating database model may also include a field 4301.20 to identify the language of a data record; and a field 4301.21 to represent additional information related to investment ratings, in accordance with some embodiments.

Database Model—Country

An exemplary country database model (4302, FIG. 43) is a master list of country information (e.g. names, currency codes, etc.). The source for country code information may include, but is not limited to, standardization groups such as the International Organization for Standardization (ISO) or third-party market data vendors.

A country database model may include a field 4302.1 for a country code, which is a unique identifier for a country; a field 4302.2 for the full name of a country; and a field 4302.3 for a country description. A country database model may also include a field 4302.4 for a unique currency code identifier; a field 4302.5 for the full name of a currency that may be used within a select country; and a field 4302.6 for a currency code description. In addition, a country database model may include a language identifier (field 4302.7) to denote the official language of a country. FK26 may represent a foreign key relationship linking a language identifier field from a country database model to defined language identifiers within a language database model (4303, FIG. 43). A field 4302.8 may be incorporated into a country database model to represent the potential use of additional information in conjunction with some embodiments.

Database Model—Language

Information pertaining to a particular language may be stored in a language database model (4303, FIG. 43). This database model may include a field 4303.1 for a unique language identifier; a field 4303.2 for the official name of a language; and a field 4303.3 for the description of a language. A field 4303.4 may be provided to indicate if some embodiments of the present invention provide translation to and from a particular language as part of multilingual processing (as illustrated in FIG. 35 and FIG. 36). Any additional information regarding a language may be stored in a field 4303.5.

Database Model—Type Code

Some embodiments of the present invention may support additional type code values, which may not be stored in dedicated database models such as initial beneficial person type and third-party organization security type. A type code database model (4304, FIG. 43) may be provided to store extraneous type codes that are referred across technology systems, in accordance with some aspects of the present invention.

A type code database model may include a field 4304.1 for a type code; and a field 4304.2 for the name of a type code category to group related type codes under a particular category. A type code database model may also include a field 4304.3 for a type code order, just in case a group of related type codes may have a particular ranking order. A type code database model may provide a field 4304.4 may store the identifier of a type code data source provider; a field 4304.5 for the full name of a type code; a field 4304.6 for the description of a type code; and a field 4304.7 for additional information related to a type code.

Database Model—Reclaim Filing Status Master

Some embodiments track filing statuses of tax reclaim assets in order to avoid securitization of ineligible tax reclaims. For example, if a foreign tax authority has already sent a reclaim payment to a global custodian bank for a tax reclaim asset, a paid asset may not be a candidate for securitization, in accordance with some embodiments. A reclaim filing status master database model (4401, FIG. 44) may be used to store the details for reclaim filing statuses, which are recognized by some embodiments. Examples of reclaim filing statuses are, but are not limited to, "filed" to acknowledge tax reclaim forms which were submitted to a foreign tax authority; "rejected" for tax reclaims which were returned by a foreign tax authority due to an error; and "paid" to acknowledge tax reclaim payments sent by a foreign tax authority.

A reclaim filing status master database model may include a field 4401.1 for a reclaim filing status; a field 4401.2 to acknowledge an applicable sequential order of filing statuses; a field 4401.3 for the full name of a filing status; and a field 4401.4 for a description of a status. A reclaim filing status master database model may also include a field 4401.5 for any additional filing status information.

Database Model—Third-Party Organization Reclaim Filing Status

As discussed above, a reclaim filing status master database model (4401, FIG. 44) may be used to track reclaim filing statuses in accordance with some embodiments. Other organizations including, but not limited to, an initial beneficial person or global custodian bank may have their own system to track reclaim filings. A third-party organization reclaim filing status database model (4402, FIG. 44) may be used to store various filing status defined by other organizations.

Such a database model may include a field 4402.1 for a reclaim filing status reference; and a field 4402.2 to associate a third-party organization's reclaim filing status to a status which is recognized by some embodiments of the present invention within a reclaim filing status master database model. A foreign key relationship FK27 may used to link master and third-party organization reclaim filing status database models.

A third-party organization reclaim filing status database model may also include a field 4402.3 for a sequential ordering of a third-party organization's filing statuses; a field 4402.4 for the name of a filing status; a field 4402.5 for the description of a status; a field 4402.6 to identify the language of a filing status data record; and a field 4402.7 for any additional filing status information.

Database Model—Reclaim Securitization Status

In addition to tracking filing statuses of tax reclaim assets, some embodiments of the present invention may track securitization statuses of eligible assets. A reclaim securitization status database model (4403, FIG. 44) may serve as a reference for various pooling and securitization statuses (i.e. tentative portfolio, stamp tranche, and secure tranche) which may be used by some embodiments.

A reclaim securitization status database model may include a field 4403.1 for a securitization status code; a field 4403.2 for the sequential ordering of securitization statuses; a field 4403.3 for a status' full name; a field 4403.4 for the description of a status; and a field 4403.5 for any additional information pertaining to reclaim securitization statuses.

Database Model—Market Rate Data

Various technology solutions connected to some embodiments of the present invention may utilize market rate information for certain calculations. For example, as illustrated earlier in step 1306, FIG. 13, market rate information may be used to calculate preliminary discounted values for tax reclaim assets during a stamp tranche pooling phase. A market rate database model (4404, FIG. 44) may be used by some embodiments of the present invention to store market rate data from various information vendors in any local markets' currencies, cross currencies, and the base market's currency. This market data may include, but is not limited to, LIBOR rates, US Treasury rates, and foreign exchange rates.

A market rate database model may include a field 4404.1 for a market rate type code to identify distinct market rate systems (i.e. libor rates, US Treasury rates, etc.); a field 4404.2 for the effective date of a rate; and a field 4404.3 for the numerical value of a rate. A market rate database model may also include a field 4404.4 for any additional rate information associated with some embodiments.

Database Model—Markets of Operation Master

To pool and securitize tax reclaim assets, some embodiments of the present invention may need to know which reclaim markets to consider. Such eligible reclaim markets of operation may be decided based on factors including, but not restricted to, their volume of cross border activity, established tax reclamation procedures, and known double taxation treaties. Identifying eligible reclaim markets of operation may allow some embodiments of the present invention to assign risk profiles to tax reclaim assets based on reclaim country information. A markets of operation master database model (4501, FIG. 45) may be used to identify eligible reclaim countries, according to some aspects of the present invention.

A markets of operation master database model may include a field 4501.1 for a reclaim market of operation; fields 4501.2 and 4501.3 to identify during which start and end dates tax reclaims may be securitized for a particular reclaim market, respectively; and a field 4501.4 for any additional information.

Database Model—Initial Beneficial Person Markets of Operation

While some embodiments of the present invention cover all local markets and the base market for pooling, securitizing, and trading global dividend and interest tax reclaim assets, each initial beneficial person may be assigned particular markets of operation based on a contractual agreement between an initial beneficial person and an SPV. For example, initial beneficial person A may submit tax reclaim assets from Germany and Switzerland, while initial beneficial person B may only submit tax reclaim assets from Great Britain, Netherlands, and Spain for pooling, securitizing, and trading in accordance with some embodiments of the present invention. An initial beneficial person markets of operation database model (4502, FIG. 45) is an illustrative example of how assigned markets of operation per initial beneficial person may be stored for referential purposes. This information may be used to make sure assets from particular markets are securitized only if an initial beneficial person has a signed contractual agreement with an SPV to sell tax reclaim assets from particular markets.

An initial beneficial person markets of operation database model may include a field 4502.1 to identify an initial beneficial person associated with a particular reclaim market. FK28 may serve as a foreign key relationship linking initial beneficial person identifiers in two database models—initial beneficial person markets of operation (4502, FIG. 45) and initial beneficial person (3805, FIG. 38).

An initial beneficial person markets of operation database model may also include a field 4502.2 for a market of operation country code, which represents a reclaim market eligible for securitization. This field may be linked to a country stored in a markets of operation master database model (4501, FIG. 45) through a foreign key relationship FK29.

An initial beneficial person markets of operation database model may track markets of operations for multiple initial beneficial persons. Each initial beneficial person may contractually sell tax reclaims from particular markets during specified periods of time. For example, initial beneficial person A may sell German tax reclaims Jul. 2, 2008-Jul. 2, 2009; while initial beneficial person B may have a different agreement to sell German tax reclaims Aug. 4, 2008-Dec. 31, 2011. Fields 4502.3 and 4502.4 may track the start and end dates of an initial beneficial person's contractual period to sell tax reclaims for a market, respectively.

An initial beneficial person markets of operation database model may also include a field 4502.5 for any additional information pertaining to markets of operation for initial beneficial persons as it relates to some embodiments.

Database Model—Statute of Limitations

An exemplary statute of limitations database model (4503, FIG. 45) may be used by some embodiments of the present invention to identify countries with double taxation treaties and the applicable statute of limitations. A statute of limitations database model may include, but is not limited to, a field 4503.1 for a reclaim country; and a field 4503.2 for an initial beneficial person country of residence. Fields 4503.1 and 4503.2 may represent two countries that have a negotiated double taxation treaty with each other.

A statue of limitations database model may also include a field 4503.3 for a statute of limitations date formula. The value within this field may depend on the nature of a double taxation treaty's statute of limitations. For example, a double taxation treaty may cite an explicit statute of limitations date for which tax reclaims must be filed by—if so the statute of limitations data formula field may store an explicit date. Another double taxation treaty may cite an implicit statute of limitations date, for example, all tax reclaims must be filed within 3 years from the assets' dividend and interest payment dates. Field 4503.3 may be dynamic enough to account for all potential statute of limitations entries, depending on the terms and conditions of a double taxation treaty.

A statue of initiations database model may also include a field 4503.4 for additional information pertaining to a statue of limitations in accordance with some embodiments for practicing aspects of the present invention.

Database Models—Tax Reclaim Treaty Rates

Tax reclaim treaty rate agreements between foreign governments may be defined on a security, fund number, or country level. Tax reclaim treaty rates may be stored within various tax reclaim treaty rate database models (4504-4506, FIG. 45) of some embodiments in order to perform certain checks including, but not limited to, a verification of calculated tax reclaim amounts, as noted in step 1206, FIG. 12.

As discussed in more detail below, there may be three illustrative examples for tax reclaim treaty rate database models that may be utilized by some embodiments—this includes 4504 for a tax reclaim treaty security rate database model; 4505 for a tax reclaim treaty fund number rate database model; and 4506 a tax reclaim treaty country rate database model. When determining the applicable tax reclaim treaty rate for a particular tax reclaim asset, exemplary tax reclaim treaty rate database models are queried to determine if a tax reclaim treaty rate for an asset is established on a security, fund number, or by default on a country level, sequentially.

FIG. 45 contains an exemplary tax reclaim treaty security rate database model (4504). This database model may provide a field 4504.1 for the security identifier identified in a tax reclaim treaty rate. A security identifier may be linked to a security master identifier database model (4203, FIG. 42) through a foreign key relationship (FK30). A tax reclaim treaty security rate database model may also include a field 4504.2 for a reclaim country of origin; and a field 4504.3 for an initial beneficial person's country of residence. Fields 4504.2 and 4504.3 may indicate which two governments that have a double taxation treaty agreement.

A tax reclaim treaty security rate database model may include a field 4504.4 for a tax reclaim treaty effective date; a field 4504.5 for a tax withholding rate; a field 4504.6 for a tax treaty rate; a field 4504.7 for a tax credit rate; a field 4504.8 for a tax reclaim rate; and a field 4504.9 for any additional information which may be related to a tax reclaim treaty security rate database model.

If a tax reclaim treaty rate is not defined on a security level, some embodiments may query a tax reclaim treaty fund number rate database model (4505). This database model may include a field 4505.1 for an initial beneficial person's fund number that has a tax reclaim treaty rate defined on a fund level. FK31 may be used as a foreign key relationship to link fund numbers listed in a tax reclaim treaty fund number rate database model to fund details in a fund number database model (4201, FIG. 42).

A tax reclaim treaty fund number rate database model may also include a field 4505.2 for a security type codes if a fund number tax reclaim treaty rate may apply to particular security types which are held by a fund; a field 4505.3 for a reclaim country of origin; and a field 4505.4 for an initial beneficial person's country of residence. In addition, a field 4505.5 may be included for a treaty effective date; a field 4505.6 for a tax withholding rate; a field 4505.7 for a tax treaty rate; a field 4505.8 for a tax credit rate; a field 4505.9 for a tax reclaim rate; and a field 4505.10 for any additional information pertaining to fund number tax reclaim treaty rates.

By default, if a tax reclaim treaty rate is not defined on a security or fund level, a treaty rate from a country level may be applied. A tax reclaim treaty country rate database model (4506) may include, but is not limited to, a field 4506.1 for an initial beneficial person type code; a field 4506.2 for a security type code; a field 4506.3 for a reclaim country of origin; a field 4506.4 for an initial beneficial person's country of residence; and a field 4506.5 for a tax reclaim treaty effective date. A tax reclaim treaty country rate database model may also provide a field 4506.6 for a tax withholding rate; a field 4506.7 for a tax treaty rate; a field 4506.8 for a tax credit rate; and a field 4506.9 for a tax reclaim rate. In addition, a field 4506.10 may be provided for supplementary information pertaining to a country tax reclaim treaty rate.

Database Model—Tentative Portfolio

As noted in FIG. 12, a tentative portfolio may be created after screening an initial beneficial person's aggregate portfolio of tax reclaim assets. A tentative portfolio database model (4601, FIG. 46) may be used to track the creation of tentative portfolios.

A tentative portfolio database mode may include a field 4601.1 for the unique identifier of a tentative portfolio; a field 4601.2 for the date a tentative portfolio was created; a field 4601.3 for the name of a tentative portfolio; a field 4601.4 for the description of a tentative portfolio; and a field 4601.5 for any additional information pertaining to a tentative portfolio.

Database Model—Tranche Definition

FIG. 46 contains an illustrative example of a tranche definition database model (4602, FIG. 46). Some embodiments of the present invention may use a tranche definition database model to store parameter checks for stamp and secure tranche definitions.

A tranche definition database model may include a field 4602.1 for a unique identifier; a field 4602.2 to distinguish stamp and secure tranches; a field 4602.3 for a stamp/secure tranche definition name; a field 4602.4 for the description of a definition; and a field 4602.5 for a contract identifier. FK32 is a foreign key relationship which may be used to link a contract identifier in a tranche definition database model with a contract's details in a contractual definition database model (4001, FIG. 40).

Fields 4602.6-4602.19 are examples of parameters that may be configured to pool tax reclaim assets into a stamp or secure tranche, as noted in steps 1303, FIGS. 13 and 1803, FIG. 18, respectively. Such fields may include, but are not limited to, a field 4602.6 for a tranche start date; a field 4602.7 for a tranche end date; a field 4602.8 for a reclaim county of origin parameter; a field 4602.9 for an initial beneficial person country of residence parameter; a field 4602.10 to identify initial beneficial person identifiers associated with a tranche; and a field 4602.11 to identify global custodian bank identifiers associated with a tranche. A tranche definition database model may also include a field 4602.12 for a fund number parameter; a field 4602.13 for an initial beneficial person type code parameter; a field 4602.14 for a security identifier type code parameter; and a field 4602.15 for a security identifier parameter.

For date-related parameters, a tranche definition database model may be configured to recognize parameter formulas that allow explicit (for example a specific date) and implicit (for example a date range) date values. Such parameter formulas include a field 4602.16 for a reclaim filing date parameter formula; a field 4602.17 for a statute of limitations parameter formula; a field 4602.18 for a projected receipt date parameter formula, according to some aspects of the present invention; a field 4602.19 for a third-party organization's projected reclaim receipt date parameter formula; and a field 4602.20 for additional information pertaining to a tranche definition in accordance with some embodiments.

Database Model—Tranche

While a tranche definition database model (4602, FIG. 46) may be used to store the parameters associated with stamp and secure tranche pooling, a tranche database model (4603, FIG. 46) may be used to record created stamp and secure tranches. Such a database model may include a field 4603.1 to identify a unique tranche event; and a field 4603.2 to identify the tranche definition associated with a created tranche. FK33 may be used as a foreign key relationship to link a tranche event to its detailed definition within a tranche definition database model.

A tranche database model may also include a field 4603.3 noting the creation date of a tranche; a field 4603.4 for the name of a tranche; a field 4603.5 for the description of a created tranche; and a field 4603.6 for additional information pertaining to a tranche.

Database Model—ABS Definition

When tax reclaim assets are pooled for ABS structuring, as noted in step 1806, FIG. 18, certain ABS structuring requirements may be needed before creating ROSESeries ABS. Such requirements may include, but are not limited to a country of issuance for a new security, credit rating agency responsible for assigning an investment rating to a new security; and an underwriter for a new security. An exemplary ABS definition database model (4701, FIG. 47) may be used to store ABS structuring requirements.

An ABS definition database model may include a field 4701.1 for the unique security identifier of ROSESeries ABS. This security identifier may be of any security identification system, including but not limited to ISIN, SEDOL, or CUSIP. FK34 may be used as a foreign key relationship to link an ABS security identifier to the details of that security in a security master identifier database model (4203, FIG. 42). An ABS definition database model may also include a field 4701.2 for the full name of ROSESeries ABS; a field 4701.3 for a ROSESeries ABS description; and a field 4701.4 for a securitization date.

In order to identify the start and end dates for which a security may be issued, a field 4701.5 may be included in an ABS definition database model to identify an issue start date; and a field 4701.6 to identify an issue end date. Additional fields for an ABS definition database model include a field 4701.7 for the country where an ABS is issued from; a field 4701.8 for an associated currency of issue; and a field 4701.9 for an investment rating assigned to ROSESeries ABS. FK35 may be used as a foreign key relationship to obtain the details for an investment rating for ROSESeries ABS in an investment rating database model (4301, FIG. 43).

An ABS definition database model may also include a field 4701.10 for a class series value if ABS are revolving or non-revolving; and a field 4701.11 for a contract identifier. FK36 may be used to link a contract identifier for an ABS definition to an entry in a contractual definition database model (4001, FIG. 40). Additional fields for an ABS definition database model may include a field 4701.12 for an ABS par value; a field 4701.13 for an issue amount; a field 4701.14 for a maturity date; and a field 4701.15 for a coupon rate.

In addition, an ABS definition database model may include a field to store an ABS' payment basis (e.g. 30/360, actual 360, actual/actual, etc.) and associated payment frequency (e.g. quarterly; semiannually, annually, etc.). Field 4701.16 may be used to store an ABS' payment basis and frequency together as one field in order to see an assigned payment option for a security. An ABS definition database model may also provide a field 4701.17 for a security's market amortization and accretion (i.e. straight line, scientific, etc.).

To identify any third-party organizations involved in structuring and purchasing ROSESeries ABS, fields 4701.18-4701.28 may be used. Third-party organization identifiers listed in these fields may correspond to unique identifiers in a third-party organization database model (3903, FIG. 39). In turn, an ABS definition database model may include a field 4701.18 for an ABS buyer identifier; a field 4701.19 for an SPV originator identifier; a field 4701.20 for a rating agency identifier; a field 4701.21 for an underwriter identifier; a field 4701.22 for a liquidity provider identifier; and a field 4701.23 for a legal counsel identifier. An ABS definition database model may provide a field 4701.24 for a trustee identifier; a field 4701.25 for a global custodian bank identifier; a field 4701.26 for a servicer identifier; a field 4701.27 for an accountant identifier; and a field 4701.28 for a settlement location identifier. Additional fields for an ABS definition database model may include 4701.29 for a blackout period; 4701.30 for a basis; and 4701.31 for any additional information provided in an ABS definition database model in accordance with some embodiments.

Database Model—ABS Issuance

An ABS issuance database model (4702, FIG. 47) may be used to track details and statuses of issued ROSESeries ABS. Such details include, but are not limited to an issued security's maturity date, par value, and identified buyer. Although an ABS issuance database model make look similar to an ABS definition database model (4701, FIG. 47), the two database models may store different information related to structured ABS. An ABS definition may be used to determine how to turn a secure tranche's tax reclaim assets into ROSESeries ABS. An ABS definition may include definition parameter such as, but not limited to, which country to issue ROSESeries ABS; what investment rating to assign ROSESeries ABS; and which third-party organization may be assigned the role of trustee for an ABS structuring process. An ABS issuance database model, on the other hand, may store the actual ABS definition parameters that were configured for issued ROSESeries ABS. As a result, one entry in an ABS definition database model may serve as a reference for the creation of multiple issued ROSESeries ABS.

An ABS issuance database model may include a field 4702.1 for a unique ABS issuance identifier; and a field 4702.2 for an ABS security identifier. FK37 may be used as a foreign key relationship to link an issued ABS to its definition, as noted in an ABS definition database model. An ABS issuance database model may also include a field 4702.3 to identify a secure tranche that pooled tax reclaim assets into an ABS issuance. A foreign key relationship FK38 may be used to link an issued ABS to the details of a secure tranche within a tranche database model (4603, FIG. 46).

An ABS issuance database model may also include a field 4702.4 for an ABS security name; a field 4702.5 for an ABS security description; a field 4702.6 for an issue date; a field 4702.7 for a country of issuance; a field 4702.8 for a currency of issuance; and a field 4702.9 to identify a contract which may be used for an ABS issuance. An ABS issuance database model may also provide a field 4702.10 for a security's par value; a field 4702.11 for an issue amount; a field 4702.12 for a maturity date; and a field 4702.13 for a coupon rate.

Fields 4702.14-4702.24 may be used to identify third-party organizations related to an ABS issuance. Details pertaining to third-party organizations may exist in a third-party organization database model (3903, FIG. 39). Fields in an ABS issuance database model may include an ABS buyer identifier (4702.14); SPV originator identifier (4702.15); rating agency identifier (4702.16); underwriter identifier (4702.17); liquidity provider identifier (4702.18); and legal counsel identifier (4702.19). Additional third-party organization fields may include a trustee identifier (4702.20); global custodian bank identifier (4702.21); servicer identifier (4702.22); accountant identifier (4702.23); and settlement location identifier (4702.24). A field 4702.25 may be provided in an ABS issuance database model for additional ABS information.

Database Model—ABS Receipt/Payment

FIG. 47 contains an illustrative example of an ABS receipt/payment database model (4703), which may be used to track ABS receipts and payments made between an SPV trust and capital market investors.

An ABS receipt/payment database model may provide a field 4703.1 to identify an issued ABS with its receipt or payment. FK39 may be used as a foreign key relationship to link an ABS receipt/payment data record to an issued ABS within an ABS issuance database model (4702, FIG. 47). An ABS receipt/payment database model may also include a field 4703.2 for an ABS security identifier; a field 4703.3 for an ABS calculation type code in order to distinguish receipt and payment data records; a field 4703.4 for a receipt/payment date; a field 4703.5 for a receipt/payment amount; and a field 4703.6 for a currency associated with an ABS amount. In addition, a field 4703.7 may be provided for supplementary information related to an ABS receipt/payment database model.

Database Model—Reconciliation Definition

As mentioned above in FIG. 22, a reconciliation definition may provide rules for how a reconciliation takes place within a cash and position management technology solution. By way of example, and not limitation, these rules may include accounting and custody transaction types, matching criteria, and threshold settings. A reconciliation may involve any local markets' currencies, cross currencies, and the base market's currency. A reconciliation definition database model (4801, FIG. 48) may be used to store the attributes of a reconciliation definition.

A reconciliation definition database model may include a field 4801.1 for a reconciliation definition's unique identifier; a field 4801.2 for the full name of a definition; a field 4801.3 for the description of a definition; and a field 4801.4 to distinguish cash and position reconciliations.

A reconciliation definition database model may also include fields 4801.5 and 4801.6 to identify which organizations serve as accounting and custody data providers, respectively. As noted in previous text, some embodiments of the present invention may serve as an accounting and/or custody data provider, depending on the purpose of a reconciliation. Additional fields for a reconciliation definition database model may include a reconciliation currency (4801.7); an accounting transaction currency (4801.8); and a custody transaction currency (4801.9).

A reconciliation definition database model may provide a field 4801.10 for a reconciliation threshold once an accounting and custody transaction are matched. In some reconciliation scenarios, a numerical exception between two transactions may be as minute as a one US penny. Such exceptions may represent sustainable compliance and may not require an investigation. To identify these situations, a reconciliation threshold may be set to a maximum acceptable exception between accounting and custody transactions.

Additional fields in a reconciliation definition database model may include a reconciliation language identifier (4801.11) to denote which language to report reconciliation exception results; and an additional information field (4801.12).

Database Model—Reconciliation

A reconciliation database model (4802, FIG. 48) may be used to store details regarding completed cash and position reconciliations. This database model may include a field 4802.1 for a unique reconciliation identifier; and a field 4802.2 for a reconciliation definition identifier. A foreign key relationship FK40 may be used to link multiple reconciliation events (individually identified through a reconciliation unique identifier field 4802) to a particular reconciliation definition within a reconciliation definition database model (4801, FIG. 48). A reconciliation database model may also include a field 4802.3 to a reconciliation completion date; and a field 4802.4 for any additional information pertaining to a reconciliation.

Database Model—Reconciliation Transaction

A reconciliation transaction database model (4803, FIG. 48) may be used to store accounting and custody transactions once data records have been received from various accounting and custody data sources. These transactions may be used to reconcile cash and position activities with transactions that already exist in numerous database models, according to some embodiments of the present invention. Information from third-party organizations or data already stored in various database models of some embodiments may serve as accounting or custody sources for a particular reconciliation.

A reconciliation transaction database model may include, but is not limited to, a field 4803.1 for the unique identifier of a transaction; and a field 4803.2 for a reconciliation identifier to identify associative data in an entry within a reconciliation database model (4802, FIG. 48). FK41 may be used to establish a link between field 4803.2 and its details within a reconciliation database model.

A reconciliation transaction database model may also include a field 4803.3 for the full name of a transaction; a field 4803.4 for the description of a transaction; and a field 4803.5 to denote a third-party organization serving as a data source for a reconciliation transaction. This field may also be used to store an initial beneficial person identifier (as detailed in 3805, FIG. 38), if an initial beneficial person supplies reconciliatory transactions as a data source provider.

A reconciliation transaction database model may provide a field 4803.6 for a transaction date; a field 4803.7 to store an cash or position transactional value; a field 4803.8 to identify the language of a transaction; and a field 4803.9 for any additional information that may be required in accordance with some embodiments for a reconciliation transaction database model.

Database Model—Reconciliation Exception

The outcome of reconciliations from FIG. 22 may be stored in a reconciliation exception database model (4804, FIG. 48) for further investigation in order to explain exceptions. This database model may include, but is not limited to, a field 4804.1 for the unique identifier of a reconciliation exception; and a field 4804.2 to identify a reconciliation event. A foreign key relationship FK42 may be used to link exception data records to their respective reconciliation event within a reconciliation database model (4802, FIG. 48).

A reconciliation exception database model may also include a field 4804.3 for an exception value; and fields 4804.4 and 4804.5 identifying related accounting and custody unique identifiers, respectively, which may be matched to identify an exception. These unique identifiers may correspond to transaction identifiers within a reconciliation transaction database model (4803, FIG. 48) or other database models, according to some aspects of the present invention.

Once reconciliation exceptions are made available for review, comments related to an investigation of exceptions may be stored in a field 4804.6 within a reconciliation exception database model. A field 4804.7 may also be provided in a reconciliation exception database model to store additional information related to reconciliation exceptions.

Database Model—Report Definition

As mentioned earlier, a report definition may be utilized by a reporting technology solution (illustrated in FIG. 23) to identify report attributes. These attributes may be stored in a report definition database model (4805, FIG. 48). A report definition database model may include, but is not limited to, a field 4805.1 for a unique report definition identifier; a field 4805.2 for the full name of a report; a field 4805.3 for a report description; and a field 4805.4 for a reporting currency.

A report definition database model may also include a field 4805.5 to identify which language a report reflects; and a field 4805.6 for additional information regarding a report definition.

Database Model—Report

Aggregated report calculations and transactions may be stored in a report database model (4806, FIG. 48). A report database model may be used to take a snapshot at a specific point in time for a report's underlying transactions. While changes are consistently being made to a transaction's primary database model, a report database model may record the state of a transaction at a particular time. This database model may utilize various relational database management systems designed for data warehousing. Such systems may include, but are not limited to, IBM DB2 Data Warehouse, Microsoft SQL Server 2005 for data warehousing, and Oracle 11g Warehouse Builder, in accordance with some aspects of the present invention.

A report database model may include a field 4806.1 for a unique report identifier; and a field 4806.2 to identify a report definition associated with a created report.

A foreign key relationship FK43 may be used to link a created report to a report's definition within a report definition database model (4805, FIG. 48).

A report database model may also include a field 4806.3 for a report's creation. Fields 4806.4 and 4806.5 may identify attributes and numerical values associated with a report's structure, respectively. A report rule identifier field (4806.4) may be included in a report database model to note names of report attributes such as, but not limited to, "assets", "liabilities", "income", and "expenses" for an exemplary trial balance report. A foreign key relationship FK44 may be used to link a rule identifier from a report database model to a rule's details within a rule database model (3804, FIG. 38). A field 4806.5 may be used to store numeric transactional values. In addition, a report database model may include a field 4806.6 for supplementary information related to a generated report.

Database Model—Swap Deal Definition

A swap deal definition database model (4901, FIG. 49) may be used to store key terms and conditions of interest rate swap deals. These terms and conditions may include, but are not limited to, identities of fixed and variable leg owners, a notional principal amount, and an interest rate type. Multiple swap deals may be managed at the same time by an interest rate swap technology solution (illustrated in FIG. 24 and FIG. 25), in accordance with some embodiments.

A swap deal definition database model may provide a field 4901.1 to identify a unique swap deal definition; a field 4901.2 for the full name of a definition; a field 4901.3 for a definition's description; and a field 4901.4 for a security identifier. A foreign key relationship FK45 may be used to link a swap deal definition to a security's details within a security master identifier database model (4203, FIG. 42). A security identifier field within a swap deal definition database model may represent the underlying security for a swap deal.

A swap deal definition database model may also provide a field 4901.5 for a swap dealer's unique identifier; and a field 4901.6 for a swap contract identifier. FK46 may serve as a foreign key relationship linking a swap deal definition to its contract within a contractual definition database model (4001, FIG. 40).

A swap deal definition database model may include a field 4901.7 to store the notional principal amount of a swap deal definition which may equate to a negotiated dollar amount on which exchanged interest rate payments are based on. A field 4901.8 may also be provided to identify the interest rate type used for a swap deal definition, for example libor or US Treasury. A field 4901.9 may be included in a swap deal definition database model to identify a fixed interest leg owner; and a field 4901.10 may be included for a fixed interest rate amount. For the variable leg of a swap deal, a swap deal definition database model may include a field 4901.11 to identify a variable interest leg owner; and a field 4901.12 for a variable interest rate amount. To identify payment interval dates, a field 4901.13 may be provided to indicate the swap payment interval basis and frequency for a net payment decision. If additional information may be required for a swap deal definition database model, a field 4901.14 may be provided.

Database Model—Swap Deal

A swap deal database model (4902, FIG. 49) may be used to record when swap deals start and end, in accordance with some embodiments of the present invention. While a swap deal definition database model (4901, FIG. 49) may be used to store the details of a swap deal, multiple swap deals may occur based on a single swap deal definition.

A swap deal database model may include a field 4902.1 for a unique swap deal identifier; and a field 4902.2 for an associated swap deal definition identifier. A foreign key relationship FK47 may be used to link a swap deal to its definition details in a swap deal definition database model. A swap deal database model may also include a field 4902.3 to denote the start date of a swap; a field 4902.4 for a swap deal end date; and a field 4902.5 for any additional swap deal information.

Database Model—Swap Deal Receipt/Payment

Net payment decisions from an interest rate swap technology solution, as illustrated in FIG. 24 and FIG. 25, may be stored in a swap deal receipt/payment database model (4903, FIG. 49). A swap deal receipt/payment database model may include, but is not limited to, a field 4903.1 for a unique identifier of a swap receipt/payment event; and a field 4903.2 to identify which swap deal is associated with a swap receipt/payment event. A foreign key relationship FK48 may be used to link a receipt/payment event to a swap deal within a swap deal database model (4902, FIG. 49).

A swap deal receipt/payment database model may also include a field 4903.3 to indicate if a receipt/payment event correlates to a receipt/payment interval. A swap deal definition may be configured to calculate a swap net receipt/payment decision for any date/time including, but not limited to, intraday, daily, and monthly. A receipt/payment interval indicator may be used to determine which swap net receipt/payment decision requires a fixed or variable interest leg owner to make a payment to the other party.

As noted in earlier text, some embodiments of the present invention may serve as a fixed or variable interest leg owner for a swap deal. Fields 4903.4-4903.7 may be used to track calculated net receipt/payment values, such as but not limited to a net receipt/payment amount (4903.4); a net receipt/payment currency (4903.5); a net receipt/payment date (4903.6); and an accrued interest amount (4903.7). If a swap dealer is to make a payment, fields 4903.8-4903.10 may be used to track the details of collected values, which represent receipts for some embodiments of the present invention. These fields may include, but are not limited to, a collected amount (4903.8); a collected currency (4903.9); and a collected date (4903.10). A field 4903.11 may be included in a swap deal receipt/payment database model in case additional information is required in accordance with some embodiments.

Database Model—VaR Definition

A VaR definition database model (5001, FIG. 50), may be used to store attributes of a VaR definition used in some embodiments of the present invention. Multiple VaR definitions may occur at the same time in accordance with some embodiments of the present invention. A VaR definition database model may provide a field 5001.1 for a definition's unique identifier; a field 5001.2 for the full name of a definition; a field 5001.3 for the description of a VaR definition; and a field 5001.4 for a contract identifier. A foreign key relationship FK49 may be used to link a VaR definition to the details of a VaR contract, which may exist in a contractual definition database model (4001, FIG. 40).

A VaR definition database model may also include a field 5001.5 for an interest rate type; a field 5001.6 for a portfolio asset description; and a field 5001.7 for a primary currency identifier. VaR calculations may be performed using different currencies in order to identify asset exposure per currency. A primary currency field within a VaR definition database model may identify which currency to use for VaR calculations. Some embodiments of the present invention allow VaR calculations to be performed in all local markets' currencies, cross currencies, and in the base market's currency. A VaR calculation database model (5003, FIG. 50) may be used to store VaR calculations based on different currencies.

A field 5001.8 may be included in a VaR definition database model for any additional information, which may be required for some embodiments.

Database Model—VaR

A VaR database model (5002, FIG. 50) may be used to store running totals of VaR events based on instructions from a VaR definition database model (5001, FIG. 50). A VaR database model may provide a field 5002.1 for a unique VaR identifier; and a field 5002.2 to identify a VaR definition associated with a VaR event. A foreign key FK50 may be used to link a VaR entry to its VaR definition details within a VaR definition database model.

A VaR database model may also provide a field 5002.3 for a VaR start date; a field 5002.4 for a VaR end date; a field 5002.5 for a deliver amount; a field 5002.6 for a deliver currency; a field 5002.7 for a receive amount; and a field 5002.8 for a receive currency.

To record running historical values, a VaR database model may include a field 5002.9 for a historical range indicator to identify which exemplary historical range (i.e. full, 30-day, 5-day, intra-day, or system-determined, etc.) may be used for subsequent VaR calculations. A field 5002.10 may be provided in a VaR database model to record the number of historical calculated days, representing the number of days within a full historical average for a VaR event. A field 5002.11 may also be provided for the number of historical calculations. With multiple intraday VaR calculations, an exemplary full historical average is based on the total number of historical calculations including intraday calculations. Field 5002.12 may store a mark-to-market total sum; and a field 5002.13 may be provided for a variance sum. In addition, a field 5002.14 may be included in a VaR database model for any additional information, which may be required for some embodiments.

Database Model—VaR Calculation

A VaR calculation database model (5003, FIG. 50), may be used to store VaR calculations from an exemplary VaR process (as illustrated in FIG. 26 and FIG. 27). This database model may include a field 5003.1 for a unique VaR calculation identifier. A single VaR definition may have multiple records in a VaR calculation database model based on an applied historical range. A field 5003.2 may be provided to identify a VaR entry, behind multiple calculations. FK51 is a foreign key relationship which may link VaR calculations to their respective VaR event within a VaR database model (5002, FIG. 50). A VaR calculation database model may also provide a field 5003.3 to identify VaR calculations for various currencies; a field 5003.4 for a calculated VaR amount at 95% confidence level; a field 5003.5 for a calculated target VaR amount at 95% confidence level; a field 5003.6 for a calculated VaR amount at 99% confidence level; and a field 5003.7 for a calculated target VaR amount at 99% confidence level.

A VaR calculation database model may consist of additional fields for calculations including, but not limited to, a field 5003.8 for a mark-to-market value; a field 5003.9 for an applied historical range; a field 5003.10 for a historical average amount; a field 5003.11 for a variance value; a field 5003.12 for a standard deviation value; and a field 5003.13 for a coefficient of variation value.

A VaR calculation database model may also consist of four fields to store normal distribution values. These fields may include a field 5003.14 for a normal distribution minus (−) 2 standard deviation of the mean value; a field 5003.15 for a normal distribution plus (+) 2 standard deviation; a field 5003.16 for a normal distribution minus (−) 3 standard deviation of the mean value; and a field 5003.17 for a normal distribution plus (+) 3 standard deviation. A field 5003.18 may also be provided for additional VaR calculation information.

Database Model—VaRbitrage Definition

FIG. 51 contains an illustrative example of a VaRbitrage definition database model (5101, FIG. 51), which may include parameters for VaRbitrage opportunity trading decisions. A VaRbitrage definition database model may include, but is not limited to, a field 5101.1 for the unique identifier of a VaRbitrage definition; and a field 5101.2 for an associated VaR identifier. By way of example and not limitation, a VaR identifier may provide key attributes to a VaRbitrage process such as deliver and receive currencies and applied historical ranges. A foreign key relationship FK52 may be used to link a VaRbitrage definition to a VaR identifier, which is detailed in a VaR database model (5002, FIG. 50).

A VaRbitrage definition database model may also include a field 5101.3 for the full name of a definition; a field 5101.4 for the description of a definition; and a field 5101.5 to identify a contract associated with a VaRbitrage definition. A foreign key FK53 may be used to link a VaRbitrage definition to its contract details within a contractual definition database model (4001, FIG. 40).

A VaRbitrage definition database model may also provide a field 5101.6 to indicate whether a VaRbitrage definition may trigger the automatic execution of a trade decision. A foreign key relationship FK54 may be used to reference a definition's trade execution details within a trade execution definition database model (5104, FIG. 51). A field 5101.7 may be provided in a VaRbitrage definition database model for any additional information that may be required in accordance with some embodiments.

Database Model—VaRbitrage

A VaRbitrage database model (5102, FIG. 51) may be used to track VaRbitrage events, in accordance with some aspects of the present invention. VaRbitrage events may correspond to instances of a VaRbitrage definition, which were executed in order to identify risk-free arbitrage opportunities.

A VaRbitrage database model may include a field 5102.1 to identify a unique VaRbitrage event; and a field 5102.2 to identify a VaRbitrage definition associated with a VaRbitrage event. FK55 may serve as an exemplary foreign key relationship linking a VaRbitrage event to its VaRbitrage definition within a VaRbitrage definition database model (5101, FIG. 51). Additional fields for a VaRbitrage database model may include a VaRbitrage start date (5102.3); VaRbitrage end date (5102.4); and supplementary VaRbitrage information (5102.5).

Database Model—VaRbitrage Calculation

Computed VaRbitrage results and trading decisions from a VaRbitrage calculation process (as illustrated in FIG. 28 and FIG. 29) may be stored in an exemplary VaRbitrage calculation database model (5103, FIG. 51). This calculation database model may include a field 5103.1 that uniquely identifies a calculation entry; and a field 5103.2 for an associated VaRbitrage identifier for the calculation. A foreign key relationship FK56 may be used to link a VaRbitrage calculation to its detailed VaRbitrage entry in a VaRbitrage database model (5102, FIG. 51).

A VaRbitrage calculation database model may also include a field 5103.3 for a calculated interest rate difference between deliver and receive currencies from step 2807, FIG. 28; a field 5103.4 for a calculated forward-spot rate difference from step 2808, FIG. 28; and a field 5103.5 for additional information that may be included in a VaRbitrage calculation database model.

Database Model—Trade Execution Definition

FIG. 51 contains an illustrative example of a trade execution definition (5104), which may be used to store instructions of how trades are executed. This database model may provide, but is not limited to, a field 5104.1 for the unique identifier for a definition; a field 5104.2 for the full name of a trade execution definition; a field 5104.3 for a description of the trade execution definition; and a field 5104.4 to identify a contractual agreement allowing the execution of a trade. FK57 may serve as a foreign key relationship linking a trade execution definition to a contract referenced in a contractual definition database model (4001, FIG. 40).

A trade execution definition database model may also include a field 5104.5 for the identifier of a trade dealer; and a field 5104.6 for a trade execution type. This latter field may indicate if trades associated with a trade definition may be executed real-time through a trade dealer's station system or if trades may be executed manually. A field 5104.7 may also be provided for any additional information pertaining to a trade execution definition.

Database Model—Trade Execution

A trade execution database model (5105, FIG. 51) may contain trades that have been executed or are pending automatic or manual execution. This database model may track statuses of all trades that are in accordance with some embodiments of the present invention. A trade execution database model may include, but is not limited to, a field 5105.1 for the unique identifier for a trade; and a field 5105.2 for a trade execution definition identifier. FK58 may be used to link a trade execution entry to its trade execution definition within a trade execution database model (5104, FIG. 51).

A trade execution database model may provide a field 5105.3 for a trade execution date; and a field 5105.4 for a trade execution status. Trade execution status types may include, but are not restricted to "pending", for trades that have yet to be executed officially; and "executed", for trades that have been officially executed with a trade dealer. Additional fields for a trade execution database model include a trade execution value (5105.5), which may note a trade execution's details; a field to report trade execution fees (5105.6); and a field for additional information (5105.7) pertaining trade execution.

Database Model—Pricing Spread

A pricing spread database model (5201, FIG. 52) may be used to store pricing spread calculations on purchase and sale agreements as noted step 3209, FIG. 32. Pricing spread calculations are in correspondence to a Pricing Model (FIG. 31) in accordance with some aspects of the present invention.

A pricing spread database model may include a field 5201.1 to identify a unique pricing spread calculation; a field 5201.2 to store a pricing spread calculation date; and a field 5201.3 to identify a contractual definition associated with a pricing spread calculation. FK59 may serve as an exemplary foreign key relationship linking a pricing spread calculation to its purchase and sale agreement, as stored in a contractual definition database model (4001, FIG. 40). A field 5201.4 may be provided in a pricing spread database model to identify a unique ABS issuance associated with a pricing spread calculation. FK60 may serve as an exemplary foreign key relationship linking a pricing spread calculation to its ABS issuance, as stored in an ABS issuance database model (4702, FIG. 47).

A pricing spread database model may also provide a field 5201.5 for an established floor value; a field 5201.6 for an established cap value; a field 5201.7 for a ROSES discounted rate; a field 5201.8 for a present value amount; and a field 5201.9 for a calculated pricing spread amount. A field

5201.10 may also be provided for any additional information pertaining to a pricing spread calculation.

Database Model—Interest Liability

FIG. 52 contains an illustrative example of an interest liability database model (5202), which may be used to store interest liability events associated with a deferred income from investments calculation. This database model may provide, but is not limited to, a field 5202.1 for the unique identifier for an interest liability event; a field 5202.2 for an ABS issuance identifier, which may be linked through a foreign key relationship (FK61) to an ABS issuance database model (4702, FIG. 47); a field 5202.3 for a blackout period start date; and a field 5202.4 for a blackout period end date.

A field 5202.5 may be provided to store a current face amount after a blackout period; a field 5202.6 for a current face date to acknowledge the date when a current face amount was calculated; and a field 5202.7 for additional information pertaining to an interest liability event.

Database Model—Interest Liability Calculation

An interest liability calculation database model (5203, FIG. 52) may be used to store individual interest liability calculations associated with a Pricing Model, as illustrated in FIG. 31. Such a database model may include a field 5203.1 to identify a unique interest liability calculation; and a field 5203.2 to link a calculation to its parent interest liability event. A foreign key relationship FK62 may be used to link an interest liability calculation to an interest liability event within an interest liability database model (5202, FIG. 52).

An interest liability calculation database model may also include a field 5203.3 for a date when an interest liability calculation is performed; a field 5203.4 for a calculated amount; and a field 5203.5 for a flag indicating if an interest liability calculation is within a blackout period or not. If additional information may be required for an interest liability calculation database model, a field 5203.6 may be provided.

Database Model—Global Security Holding

A global security holding database model (5204, FIG. 52) may be used to store details of securities, which have been identified as risk-free arbitrage opportunities in support of generating deferred income from investment operations, as illustrated in FIG. 33 and FIG. 34.

For a global security holding database model, a field 5204.1 may be provided for a security identifier of a global security. A foreign key FK63 may be used to link a global security to additional security information stored in a security master identifier database model (4203, FIG. 42). A global security holding database model may also include a field 5204.2 for an investment rating, as linked to an investment rating database model (4301, FIG. 43) through a foreign key relationship (FK64). A global security holding database model may also include a field 5204.3 for a security currency; a field 5204.4 for a maturity date; a field 5204.5 for a coupon rate; and a field 5204.6 for a coupon frequency.

Additional fields within a global security holding database model may include, but are not restricted to, a field 5204.7 for an interest accrual date; a field 5204.8 for a first coupon date; a field 5204.9 for a basis, and a field 5204.10 for a price. For risk-free arbitrage opportunities, a field 5204.11 may be used to flag a global security as a risk-free arbitrage opportunity as indicated in step 3402, FIG. 34. A field 5204.12 may be used to store the date when a risk-free arbitrage opportunity is identified. For an executed trade associated with a global security, a field 5204.13 may be used to link a global security to a unique trade execution identifier, as illustrated in a trade execution database model (5105, FIG. 51). A foreign key relationship (FK65) may be used to illustrate such a link between a global security database model and a trade execution database model. Field 5204.14 may be used to store additional information in conjunction with a global security holding database model.

Database Model—Investment Income Calculation

Computed investment income results from a deferred income from investment operations (as illustrated in FIG. 33 and FIG. 34) may be stored in an exemplary investment income calculation database model (5205, FIG. 52). This calculation database model may include a field 5205.1 that uniquely identifies a calculation entry; and a field 5205.2 for an associated global security identifier for the calculation. A foreign key relationship FK66 may be used to link an investment income calculation to its detailed security entry in a global security holding database model (5204, FIG. 52).

An investment income calculation database model may also include a field 5205.3 for a calculated date; a field 5205.4 for a calculated investment income amount; and a field 5205.5 for additional information that may be included in an investment income calculation database model.

As explained above, various steps in the methods used to implement the tax asset reclamation processes as described herein are computer-implemented steps. It should be understood that computer systems for practicing such methods and steps thereof may include one or more computers, intercommunicating with each other and with external data sources or repositories via any one or more suitable networks. The networks may include, for example, private networks, the public Internet, telephone networks, wireless networks, optical networks, and so forth. Each computer may employ one or more processors along with one or more memory devices, and suitable input/output equipment to facilitate data exchange. Computers that might be employed include, without limitation, desktop computers, notebook computers, netbook computers, personal digital assistants and smartphones, mainframes, and just about any other programmable computing device. Instructions for causing such computers to execute the described operations/functions may be stored on any suitable computer-readable media. Operations may be parceled out among multiple computers in any way that allows the collectively required processing to occur. While the examples shown have generally relied upon the use of relational databases, their use is only shown for convenience, it being understood that other types of databases may be suitable in a given embodiment.

It will now be apparent that there have been shown a number of example embodiments of methods and systems useful in processing various aspects of tax asset reclamation activities. No single embodiment need practice all such aspects. Embodiments, unless otherwise apparent, are not intended to be mutually exclusive and in general may be practiced in a variety of combinations that will be apparent to those skilled in the art. Accordingly, any reference to an embodiment "of the invention" is inadvertent inasmuch as the invention is defined by the claims appended hereto and those claims may, for example, specify mutually exclusive features making it impossible, logically, for such an embodiment to practice all aspects and embodiments claimed. Likewise, aspects of the invention, however embodied, generally may be practiced alone or in combination with other aspects.

Further, it will be appreciated that the embodiments shown herein are intended to be exemplary only, and from their disclosure other embodiments will occur to those skilled in the art. Accordingly, the claims are not intended to be construed to cover only the embodiments expressly shown, but also other embodiments within the spirit and scope of the claims, and their equivalents.

What is claimed is:

1. A computer-implemented system for managing the private purchase and sale of global dividend and interest tax reclaim assets of a plurality of initial beneficial persons, comprising:
   a. a database configured for, and storing therein, records of purchases from each of the initial beneficial persons a right to claim a refund of a tax withheld by a foreign government on a dividend and/or interest distribution, and the payment made for purchasing said right;
   b. means for applying computerized models to assess the timing and collection risks attendant each refund claim to determine the pricing of securities comprising ownership interests to be sold in respect of associated tax refund claim rights;
   c. means for preparing the filing of a claim for each said refund with the appropriate governmental authority and for executing such steps as that authority requires to effect the refund;
   d. means for recording in computer-readable storage of a database management system ownership of the securities as they are sold, and the associated tax refund claim rights and; and
   e. means for reading from said storage and making an automated distribution of a portion of the collected refund to the associated security owners as refund payments are received and in accordance with the recorded ownership interests.

\* \* \* \* \*